(12) United States Patent
Murata et al.

(10) Patent No.: US 7,773,489 B2
(45) Date of Patent: Aug. 10, 2010

(54) LIQUID CRYSTAL LENS ELEMENT AND OPTICAL HEAD DEVICE

(75) Inventors: Kouichi Murata, Tokyo (JP); Takuji Nomura, Koriyama (JP); Mitsuo Oosawa, Koriyama (JP); Yoshiharu Ooi, Tokyo (JP); Yuzuru Tanabe, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 800 days.

(21) Appl. No.: 11/670,780

(22) Filed: Feb. 2, 2007

(65) Prior Publication Data
US 2007/0183293 A1    Aug. 9, 2007

Related U.S. Application Data

(63) Continuation of application No. PCT/JP2005/014227, filed on Aug. 3, 2005.

(30) Foreign Application Priority Data

Aug. 4, 2004  (JP)  .............. 2004-227613
Sep. 15, 2004 (JP)  .............. 2004-268142

(51) Int. Cl.
    *G11B 7/00* (2006.01)
(52) U.S. Cl. .............................. 369/112.02
(58) Field of Classification Search .......... 369/112.1, 369/112.01, 112.02, 112.03, 44.23, 44.24
    See application file for complete search history.

(56) References Cited

U.S. PATENT DOCUMENTS 5,416,757 A     5/1995  Luecke et al.
6,882,482 B2 *  4/2005  Ogasawara ............. 359/665
7,110,343 B2 *  9/2006  Ogasawara ............. 369/112.02
7,388,822 B2    6/2008  Ooi et al.

(Continued)

FOREIGN PATENT DOCUMENTS

EP    1011009 A1    6/2000

(Continued)

OTHER PUBLICATIONS

Hironobu Tanase et al., "Dual-Layer-Compatible Optical Head: Integration with a Liquid-Crystal Panel", XP-002330266, The Japan Society of Applied Physics, vol. 42, No. 2B, Feb. 2003, pp. 891-894.

(Continued)

*Primary Examiner*—Nabil Z Hindi
(74) *Attorney, Agent, or Firm*—Oblon, Spivak, McClelland, Maier & Neustadt, L.L.P.

(57) ABSTRACT

A liquid crystal lens element capable of finely adjusting focal length according to the magnitude of applied voltage, and an optical head device employing such a liquid crystal lens element, are provided.

On one surface of a transparent substrate 511, a transparent electrode 513 and a concave-convex portion 517 made of a transparent material having a cross section shape approximated by a saw-tooth shape, are formed so as to constitute a plurality of annular portions, and on one surface of a transparent substrate 512, a transparent electrode 514 is formed. The transparent electrodes 513 and 514 constitute annular divided electrode segments, and division positions of the annular electrode segments are made to be agree with division positions of annular portions of the saw-tooth-shaped concave-convex portion 517 of the transparent substrate 511.

15 Claims, 19 Drawing Sheets

U.S. PATENT DOCUMENTS

| | | |
|---|---|---|
| 2002/0105889 A1 | 8/2002 | Ogasawara |
| 2004/0100879 A1 | 5/2004 | Ogasawara |
| 2004/0105374 A1 | 6/2004 | Ogasawara et al. |
| 2004/0108984 A1 | 6/2004 | Ogasawara |
| 2005/0226122 A1 | 10/2005 | Ooi et al. |
| 2007/0146625 A1 | 6/2007 | Ooi et al. |
| 2007/0182915 A1 | 8/2007 | Osawa et al. |

FOREIGN PATENT DOCUMENTS

| | | |
|---|---|---|
| JP | 5-205282 | 8/1993 |
| JP | 9-189892 | 7/1997 |
| JP | 9-230300 | 9/1997 |
| JP | 11-039704 A | 2/1999 |
| JP | 2001-209966 A | 8/2001 |
| JP | 2002-237077 A | 8/2002 |
| JP | 2002-319172 A | 10/2002 |
| JP | 2002-352470 | 12/2002 |
| JP | 2003-067969 A | 3/2003 |
| JP | 2003-115127 | 4/2003 |
| JP | 2003-123304 A | 4/2003 |
| JP | 2004-101885 A | 4/2004 |
| JP | 2004-103058 A | 4/2004 |

OTHER PUBLICATIONS

U.S. Appl. No. 11/621,128, filed Jan. 9, 2007, Nomura, et al.
U.S. Appl. No. 11/625,005, filed Jan. 19, 2007, Ooi, et al.

* cited by examiner

Fig. 3
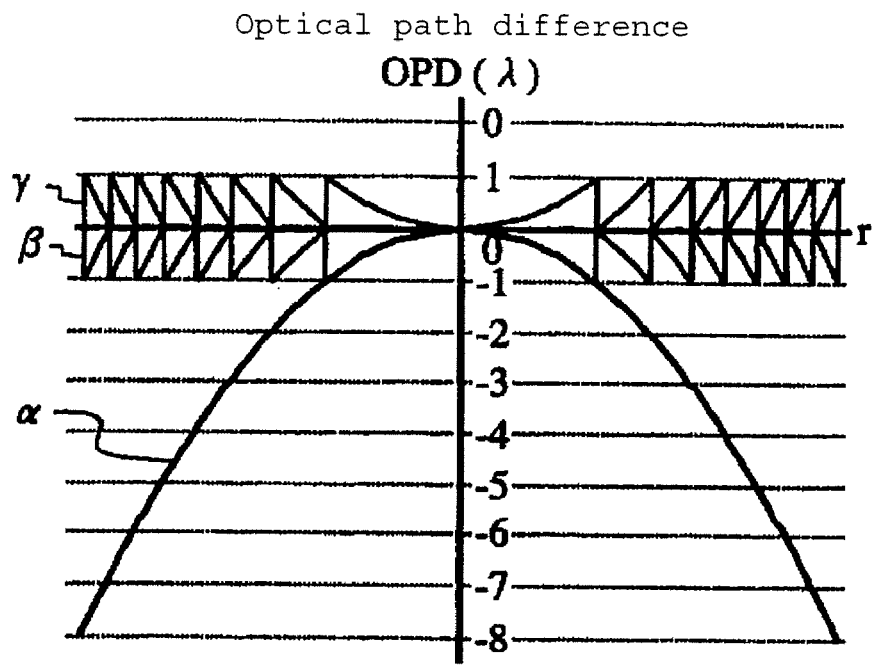
Fig. 4(A) $V_{+1}$  Fig. 4(B) $V_0$  Fig. 4(C) $V_{-1}$
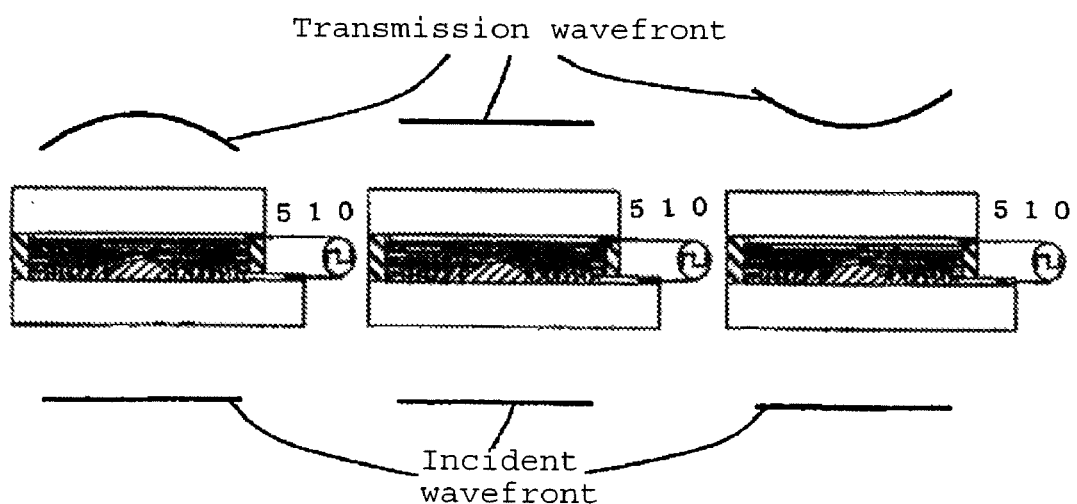

Fig. 19(A) V=V₊₁  Fig. 19(B) V=V₀  Fig. 19(C) V=V₋₁
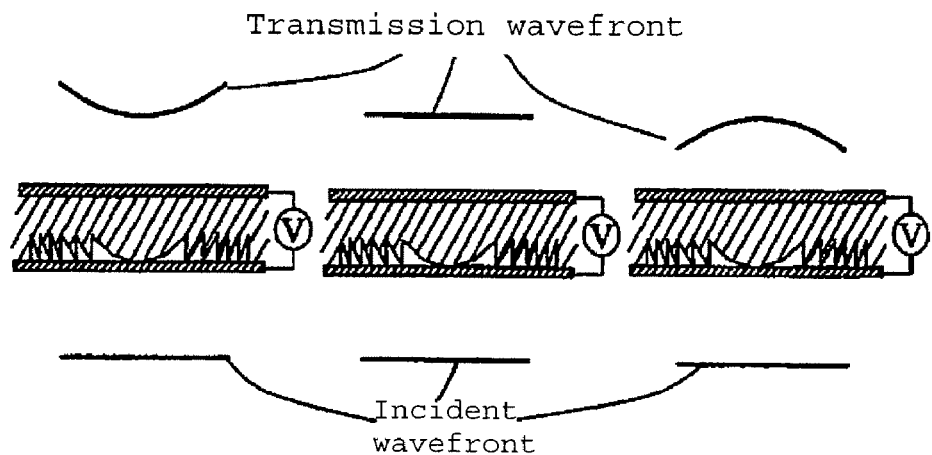
Fig. 20
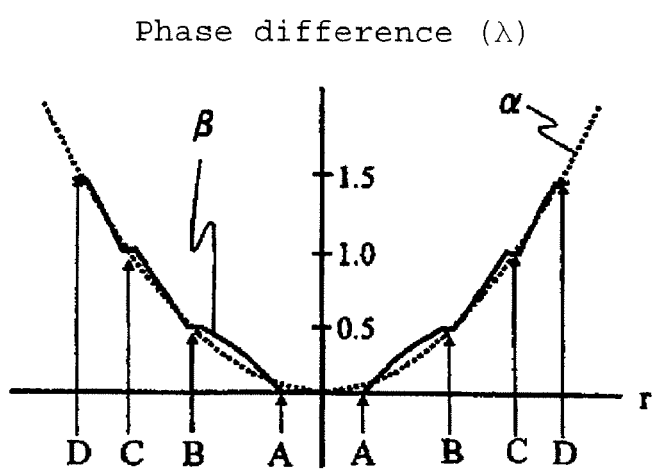

LIQUID CRYSTAL LENS ELEMENT AND OPTICAL HEAD DEVICE

TECHNICAL FIELD

The present invention relates to a liquid crystal lens element, in particular, to a liquid crystal lens element which can switch focal length according to switching or magnitude of applied voltage, and to an optical head device employing the liquid crystal lens element and to be used for writing and/or reading an information to/from an optical recording medium.

BACKGROUND ART

As a recording media for reading an information by an optical method, various types of optical recording media (hereinafter referred to as "optical disks") have been developed, each of which has an information recording layer formed on a light-incident side plane and a cover layer made of a transparent resin for covering the information recording layer. As these optical disks, e.g. CD optical disks or DVD optical disks have been known. Meanwhile, optical head devices for writing and/or reading (hereinafter referred to as "writing/reading") an information to/from such DVD optical disks, each of which has e.g. a laser diode as a light source for emitting light of 660 nm wavelength band and an objective lens having a NA (numerical aperture) of from 0.6 to 0.65.

Heretofore, as an optical disk for DVD, an optical disk (hereinafter referred to as "single layer DVD optical disk") having a single information recording layer with a cover thickness (thickness of cover layer) of 0.6 mm, and an optical disk (hereinafter referred to as "double layer DVD optical disk") having double information recording layers (read only type or readable and writable type) and the like have been developed. In such a double layer DVD optical disk, the distance between the information recording layers is 55±15 μm, and the information recording layers in the light-incident side are formed at positions where the cover thickness is is from 0.56 mm to 0.63 mm.

Accordingly, in a case of carrying out writing/reading to/from a double layer DVD optical disk by using an optical head device employing an objective lens optimally designed to make an aberration zero for a single layer DVD optical disk of cover thickness 0.6 mm, spherical aberration is generated according to the difference of cover thickness, which deteriorates convergence of incident light to the information recording layer. Particularly, for a write only type double layer DVD optical disk, deterioration of convergence causes lowering of convergent power density at a time of writing and causes writing error, such being problematic.

Further, in recent years, in order to improve recording density of an optical disk, an optical disk (hereinafter referred to as "single layer BD optical disk") having a cover thickness of 100 μm has been developed. Meanwhile, for an optical head device to be used for writing/reading such a single layer BD optical disk, e.g. a laser diode of blue light of wavelength 405 nm band as a light source and an objective lens having a NA of 0.85 are employed. In a case of writing/reading a single layer BD optical disk by using such an optical head device, if the cover thickness varies ±5 μm in a plane of single layer BD optical disk, a large spherical aberration of about 50 mλ in terms of RMS (Root Mean Square) wavefront aberration occurs, which deteriorates convergence of light incident into an information recording layer, such being problematic.

Further, a double layer optical disk of write-only type having cover thicknesses of 100 μm and 75 μm (hereinafter it is also referred to as "double layer BD optical disk") has also been developed, but in this double layer BD optical disk, a large spherical aberration corresponding to the difference between cover thicknesses causes writing error, such being problematic.

To cope with these problems, heretofore, as means for correcting a spherical aberration generated due to e.g. the difference of cover thicknesses of optical disks, methods using movable lens group or a liquid crystal lens as described in the following applications have been known.

(I) For example, JP-A-2003-115127 proposes, in order to correct spherical aberration by using a movable lens group, an optical head device 100 for writing/reading an optical disk D as shown in FIG. 29. This optical head device 100 has a light source 110, various types of optical system 120, a photo-receiving element 130, a control circuit 140, a modulation/demodulation circuit 150, and further, first and second movable lens groups 160 and 170. Further, in the first movable lens group 160, a concave lens 161, a convex lens 162 and an actuator 163 are provided. Accordingly, by moving the is convex lens 162 fixed on an actuator 163 in an optical axis direction, a focal length movable lens function is exhibited, in which the power of the movable lens group 160 continuously changes between positive (convex lens) and negative (concave lens). By disposing the movable lens group 160 in an optical path to the optical disk D, it is possible to adjust convergent point of incident light on information recording layers of optical disks D having different cover thicknesses, and thus, it becomes possible to correct a spherical aberration containing a power component.

(II) Further, JP-A-5-205282 proposes, in order to correct spherical aberration generated due to the difference of cover thickness between an optical disk for DVD and an optical disk for CD, an optical head device employing a liquid crystal lens 200 as shown in FIG. 30. The liquid crystal lens 200 comprises a substrate 230 having a flat surface on which a transparent electrode 210 and an alignment film 220 are formed, a substrate 260 having a curved surface symmetric about an axis and has a surface shape S(r) represented by formula (1) being a power series of radius r on which a transparent electrode 240 and an alignment film 250 are formed, and a nematic liquid crystal 270 sandwiched between these substrates.

$$S(r)=a_1 r^2+a_2 r^4+a_3 r^6 \tag{1}$$

wherein $a_1$, $a_2$, $a_3$; constant $$r^2=x^2+y^2$$

In the liquid crystal lens 200, when a voltage is applied between the transparent electrodes 210 and 240, alignment of molecules in the liquid crystal 270 changes and the refractive index changes. As a result, according to the refractive index difference between the substrate 260 and the liquid crystal 270, transmission wavefront of light incident into the liquid crystal lens 200 changes.

(III) Further, JP-A-9-230300 proposes, in order to exhibit substantial lens function of changing a power component corresponding to change of convergent point of incident light without increasing the thickness of a liquid crystal layer, an optical modulation element as a liquid crystal lens. Further, the reference proposes an optical head device employing such an optical modulation element to correct a spherical aberration generated due to the difference of cover thickness between an optical disk for DVD and an optical disk for CD. FIG. 31 shows a side view of the optical modulation element 300. The optical modulation element 300 comprises substantially parallel two transparent substrates 310 and 320 and a liquid crystal 330 sandwiched between them, and a liquid crystal side surface of the transparent substrate 310 has a concentric blaze shape 340, and on liquid crystal side surfaces of the two transparent substrates, electrodes 350 and alignment films 360 are formed. In the optical modulation element 300, alignment direction of the liquid crystal 330 is substantially in parallel with the transparent substrates at a time of no electric field application, and the alignment direction is substantially perpendicular to the transparent substrates at a time of electric field application.

(IV) Further, JP-A-9-189892 proposes, in order to exhibit substantial lens function of changing a power component corresponding to change of convergent point of incident light without increasing the thickness of a liquid crystal layer, a liquid crystal diffraction lens 400 as shown in FIG. 32.

In the liquid crystal diffraction lens 400, a substrate 410 has one surface on which a predetermined saw-tooth shaped relief is formed, a transparent electrode 420 is formed on the surface, and a liquid crystal layer 440 is sandwiched between the transparent electrode 420 and an opposing electrode 430. When a voltage is applied between these electrodes 420 and 430, substantial refractive index of the liquid crystal layer 440 for extraordinarily polarized light changes from extraordinary refractive index $n_e$ to ordinary refractive index $n_o$. Here, substantial refractive index means an average refractive index in the thickness direction of the liquid crystal layer.

Provided that the refractive index of the substrate 410 having a saw-tooth-shaped relief structure is $n_1$ and wavelength of incident light is $\lambda$, by forming the saw-tooth-shaped relief so that a depth d of a groove of the saw-tooth-shaped relief satisfies the relation of the following formula:

$$d=\lambda/(n_e-n_1),$$

maximum diffraction efficiency is obtained at a wavelength $\lambda$ at a time of no voltage application and a diffraction lens is constituted. Further, even if wavelength $\lambda$ of incident light changes, it is possible to adjust applied voltage so that maximum diffraction is obtained at the wavelength $\lambda$.

In the liquid crystal diffraction lens 400 having such a construction, since it is sufficient to fill the liquid crystal layer 440 with a liquid crystal so as to fill grooves of the saw-tooth-shaped relief, it is possible to reduce the thickness of the liquid crystal layer 440 as compared with the type of liquid crystal layer for correcting a spherical aberration containing a power component by constituting the above-mentioned liquid crystal lens 200 shown in FIG. 30.

DISCLOSURE OF THE INVENTION

Problems to be Solved by the Invention

However, in the means of (I) described in JP-A-2003-115127, when the movable lens group 160 is employed, a pair of lenses 161 and 162 and an actuator 163 are required, which causes problems that the size of the optical head device 100 increases and mechanical design for movable lens becomes complicated.

Further, in the means of (II) described in JP-A-5-205282, the refractive index of the substrate 260 equals to that of the liquid crystal 270 at a time of no voltage application. Accordingly, at the time of no voltage application, transmission wavefront of incident light does not change. On the other hand, when a voltage is applied between the transparent electrodes 210 and 240, a refractive index difference $\Delta n$ is produced between the substrate 260 and the liquid crystal 270 and, which causes a distribution of optical path difference of transmission light corresponding to $\Delta n \times S(r)$ (here, refer to formula (1) for S(r)). Accordingly, by fabricating the surface shape S(r) of the substrate 260 so as to correct a spherical aberration generated due to the difference of cover thickness of optical disks D and by adjusting the refractive index difference $\Delta n$ according to applied voltage, it is possible to correct the aberration.

However, in a case of the liquid crystal lens described in FIG. 30, since the refractive index change of the liquid crystal 270 in response to applied voltage is at most about 0.3, concave-convex difference of S(r) has to be increased to generate a large optical path difference distribution $\Delta n \times S(r)$ corresponding to a power component for changing convergent point of incident light. As a result, the thickness of the layer of the liquid crystal 270 increases, and response speed in response to voltage becomes slower. In particular, at a time of writing/reading a single layer or double layer DVD optical disk or a BD optical disk, a response of within 1 second is required for correction of wavefront aberration generated by a variation of cover thickness or switching of recording layers between single layer and double layer, and thus, slow response speed has been a problem.

To avoid this problem, when correction of only spherical aberration not containing a power component is conducted, aberration correction amount, namely optical path difference distribution, can be reduced, and thus, the thickness of the liquid crystal layer can be reduced, which is effective for high speed response. However, when the surface shape S(r) of the substrate 260 is fabricated to correct only such a spherical aberration, a coma aberration is generated when an optical axis of an objective lens for converging incident light on an information recording layer of an optical disk is misaligned to an optical axis of the liquid crystal lens. Particularly, at a time of tracking operation in which the objective lens moves about ±0.3 mm in a radial direction of the optical disk, a large aberration caused by misalignment of the objective lens to the liquid crystal lens is produced, which causes a problem that convergence to the information recording layer is deteriorated and writing/reading is prevented.

Further, in the means of (III) described in JP-A-9-230300, the construction is such that any one of ordinary refractive index $n_o$ and extraordinary refractive index $n_e$ of the liquid crystal is substantially equal to the refractive index of the blaze shape 340 of the transparent substrate, whereby the refractive index difference between the liquid crystal 330 and the blaze shape 340 changes between $\Delta n$ ($=n_e-n_o$) and zero between no electric field application and electric field application. Further, by forming the blaze shape of refractive index $n_o$ so that the depth of its concave-convex portion satisfies a formula $\Delta n \times$(depth of concave-convex portion)=(wavelength of light in vacuum) at a time of no voltage application, diffraction efficiency of approximately 100% can be obtained at a time of no-voltage application and the optical modulation element 300 functions as a Fresnel lens. On the other hand, at a time of voltage application, the refractive index of the liquid crystal 330 becomes $n_o$, the blaze shape does not function as a Fresnel lens, and light is entirely transmitted. As a result, by switching a voltage applied to an electrode 350 of the light modulation element 300, it is possible to switch the focal point between two focal points. By employing such an optical modulation element 300 in an optical head device, it is possible to improve convergence to information recording layers of optical disks for DVD and CD having different cover thicknesses. Accordingly, it is possible to carry out writing/reading optical disks for DVD and CD by using an objective lens for DVD. Accordingly, by employing such an optical modulation element 300, it is possible to switch a focal point between two focal points by switching applied voltage, such being preferred. For example, medium values of the standards of cover thicknesses of a double layer BD optical disk are 100 μm and 75 μm, and correction is possible with respect to these cover thicknesses.

However, fine adjustment of focal point of the optical modulation element has been difficult. For this reason, although the optical modulation element is effective for cover thicknesses of 100 μm and 75 μm, sufficient aberration reduction correction has not been possible for a cover thickness containing production-induced variation of an optical disk. Specifically, it has not been possible to reduce a spherical aberration of 50 mλrms generated when a cover thickness varies ±5 μm so that the cover thicknesses varies 100±5 μm and 75±5 μm from the respective medium thicknesses of the standard, or a large spherical aberration of 100 mλrms generated when a cover thickness varies ±10 μm. Thus, a large spherical aberration generated according to the difference of cover thickness can not be sufficiently corrected, which may cause writing error or reading error, and thus, an effective measure has been desired.

Further, in the means of (IV) described in JP-A-9-189892, in the liquid crystal diffraction lens 400, the refractive index difference between the saw-tooth-shaped relief structure and the liquid crystal changes according to applied voltage, and when a product obtained by multiplying the refractive index difference and the depth d of grooves of the saw-tooth-shaped relief becomes an integer times of wavelength λ, wavefronts are connected continuously to obtain a power component, and thus, the generated power can only be changed discretely according to voltage.

Meanwhile, a cover thickness of an optical disk is generally varies by production-induced error. Particularly, in an optical head device employing an objective lens having a NA of 0.85, since a spherical aberration generated due to the variation of cover thickness is proportional to a biquadrate of NA of the objective lens, it is necessary to appropriately correct spherical aberration caused by production-induced variation of cover thickness. Accordingly, it is difficult for the liquid crystal diffraction lens 400 which can only produce discrete power component, to appropriately correct production-induced variation of cover thickness.

Further, in liquid crystal lenses shown in FIGS. 30 to 32, since the liquid crystal is uniformly aligned, it is not possible to change transmission wavefront of polarized light for which the refractive index of the liquid crystal is ordinary refractive index, by applying a voltage. Since an optical head device to be used for writing/reading a DVD or a high-density optical disk, commonly employs a polarized optical system, there occurs a problem that spherical aberration of only one of outgoing light (light towards an optical disk) and returning light (light reflected by the optical disk) having perpendicular polarizations, can be corrected.

It is an object of the present invention to provide a liquid crystal lens element which can realize small sized element having no moving part, and which has a lens function capable of switching focal length among two or more focal lengths according to applied voltage.

Further, it is an object of the present invention to provide a liquid crystal lens element which has a liquid crystal lens element having thin liquid crystal layer, and which has a lens function capable of stably correcting a spherical aberration containing a power component corresponding to change of convergent point of incident light according to applied voltage.

Further, it is an object of the present invention to provide an optical head device which employs the above-mentioned liquid crystal lens element, which corrects a spherical aberration generated due to the difference of cover thickness of single layer and double layer optical disks, and which can carry out stable writing and/or reading.

Problems to be Solved by the Invention

The present invention discloses the following features.

1. A liquid crystal lens element comprising at least one liquid crystal layer and a first transparent substrate and a second transparent substrate disposed so as to oppose to each other to sandwich the liquid crystal layer, wherein the first transparent substrate includes a transparent electrode and a concave-convex portion made of a transparent material having a cross section of saw-tooth shape or a cross section of saw-tooth shape approximated by steps, and having rotational symmetry about an optical axis, and the second transparent substrate includes a transparent electrode.

2. An optical head device comprising a light source, an objective lens for converging light emitted from the light source on an optical recording medium, a photodetector for detecting light converged on the optical recording medium and reflected, and the liquid crystal lens element as defined in the above 1 disposed in an optical path between the light source and the objective lens.

3. A liquid crystal lens element which is a liquid crystal lens element comprising at least a first substrate and a second substrate disposed so as to be opposed to each other, and a liquid crystal layer sandwiched between the first and the second substrates, and which is configured to change focal point of light transmitted through the liquid crystal layer according to the magnitude of applied voltage to the liquid crystal layer, wherein in on one of the surfaces of the first substrate, a first transparent electrode and a concave-convex portion made of a transparent material and having a cross section of saw-tooth shape or a saw-tooth shape approximated by steps, is formed so as to form a plurality of annular shapes concentric around an optical axis of incident light, and on one of the surfaces of the second substrate, a second transparent electrode is formed, and at least one of the first and second transparent electrodes is divided into annular electrode segments, and the dividing position of the transparent electrode into annular electrode segments agree with dividing positions of the saw-tooth-shaped concave-convex portion of the first substrate into annular shapes.

4. The liquid crystal lens element according to the above 3, wherein the electrode segments are each electrically connected with adjacent electrode segments via a resistor.

5. The liquid crystal lens element according to the above 3 or 4, wherein based on a resistance between each of the electrode segments and an electrode segment adjacently outside of the electrode segment, a resistance between the electrode segment and an electrode segment adjacently inside of the electrode segment is twice as large.

The liquid crystal lens element according to any one of the above 3 to 5, wherein the depth of the concave-convex portion formed on the first substrate is equal to the distance between the second substrate and convex portions of the concave-convex portion.

6. An optical head device comprising a light source, an objective lens for converging light emitted from the light source on an optical recording medium, a beam splitter for splitting light converged by the objective lens and reflected by the optical recording medium, a photodetector for detecting the split light, and the liquid crystal lens element as defined in any one of the above 3 to 5 disposed in an optical path between the light source and the objective lens.

7. A liquid crystal lens element for changing focal point of light transmitted through the liquid crystal layer according to the magnitude of voltage applied to the liquid crystal layer, which comprises a first Fresnel lens portion, a second Fresnel lens portion and an electrode lens portion; wherein the first Fresnel lens portion comprises a pair of transparent substrates, a first liquid crystal layer sandwiched between the transparent substrates, a pair of electrodes formed on surfaces of the respective transparent substrates so as to be opposed to each other to apply voltage to the first liquid crystal layer, and a first concave-convex portion having rotational symmetry about an optical axis of light and having a cross section of saw-tooth shape or a cross section of saw-tooth shape approximated by steps, the first concave-convex portion being made of a transparent material and formed on an upper surface of at least one of the pair of electrodes opposed to each other; the second Fresnel lens portion comprises a pair of transparent substrates, a second liquid crystal layer sandwiched between the transparent substrates, a pair of electrodes formed on surfaces of the respective transparent substrates so as to be opposed to each other to apply voltage to the second liquid crystal layer, and a second concave-convex portion having a rotational symmetry about the optical axis of light and having a cross section of saw-tooth shape or a cross section of saw-tooth shape approximated by steps, the second concave-convex portion being made of a transparent material and formed on an upper surface of at least one of the pair of electrodes opposed to each other; the electrode lens portion comprises a pair of transparent substrates, a third liquid crystal layer sandwiched between the transparent substrates, and a pair of electrodes for applying voltage to the third liquid crystal layer and disposed on surfaces of the transparent substrates so as to be opposed to each other, wherein at least one of the electrodes is a complex electrode constituted by a low resistant electrode and a high resistant plane electrode; wherein the first, the second and the third liquid crystal layers are made of a nematic liquid crystal having a parallel alignment at a time of no voltage application or at a time of voltage application, an ordinary refractive index direction of the first liquid crystal layer and an extraordinary refractive index directions of the second liquid crystal layer and the third liquid crystal layer agree with each other.

8. The liquid crystal lens element according to the above 7, wherein both of the electrodes disposed in the electrode lens portion so as to be opposed to each other, are the complex electrodes, one of the complex electrodes comprises a high-resistance plane electrode and a plurality of low-resistance electrodes arranged in a stripe shape, the other one of the complex electrodes comprises the high-resistance plane electrode and a plurality of low-resistance electrodes arranged in a stripe shape so as to be perpendicular to the arrangement direction of the above low-resistance electrodes.

9. The liquid crystal lens element according to the above 7 or 8, wherein the refractive index of the transparent material forming the first and second concave-convex portions is equal to the ordinary refractive index of the first liquid crystal layer and the second liquid crystal layer.

The liquid crystal lens element according to any one of the above 7 to 9, wherein the first Fresnel lens portion, the second Fresnel lens portion and the electrode lens portion are laminated to be integrated, and the first, the second and the third liquid crystal layers are disposed respectively in three gaps formed by four transparent substrates opposed to one another.

10. The liquid crystal lens element according to any one of the above 7 to 9, which is integrated with a phase plate producing a phase difference of an odd number times of $\pi/2$ of the wavelength of the light.

11. The liquid crystal lens element according to the above 7, wherein the electrode lens portion of the liquid crystal lens element comprises a first electrode lens portion and a second electrode lens portion; the first electrode lens portion comprises a pair of transparent substrates, the third liquid crystal layer sandwiched between the transparent substrates, and electrodes disposed on surfaces of the transparent substrates so as to be opposed to each other to apply a voltage to the third liquid crystal layer, at least one of which is a complex electrode comprising a low-resistance electrode and a high-resistance plane electrode; the second electrode lens portion comprises a pair of transparent substrates, the fourth liquid crystal layer sandwiched between the transparent substrates, and electrodes disposed on surfaces of the transparent substrates so as is to be opposed to each other to apply a voltage to the fourth liquid crystal layer, at least one of which is a complex electrode comprising a low-resistance electrode and a high-resistance plane electrode; wherein the first, the second, the third and the fourth liquid crystal layers are each made of a nematic liquid crystal having a parallel alignment at a time of no voltage application or at a time of voltage application; and wherein an ordinary refractive index direction of the first liquid crystal layer, extraordinary refractive index directions of the second and the third liquid crystal layers and an ordinary refractive index direction of the fourth liquid crystal layer agree with one another.

12. The liquid crystal lens element according to the above 11, wherein one of the electrodes disposed in the electrode lens portion so as to be opposed to each other is the complex electrode, and the complex electrode comprises a high-resistance plane electrode and a plurality of low-resistance electrodes of concentric shape about an optical axis of the light.

13. The liquid crystal lens element according to the above 11, wherein both of the electrodes disposed in the electrode lens portion so as to be opposed each other, are the complex electrodes, and one of the complex electrodes comprises a high-resistance plane electrode and a plurality of low-resistance electrodes arranged in a stripe shape, and the other one of the complex electrodes comprises a high-resistance plane electrode and a plurality of low-resistance electrode arranged in a stripe shape so as to be perpendicular to the arrangement direction of the above low-resistance electrodes.

The liquid crystal lens element according to any one of the above 11 to 13, wherein the refractive index of the transparent material forming the first and second concave-convex portions, is equal to the ordinary refractive index of the first liquid crystal layer and the second liquid crystal layer.

The liquid crystal lens element according to any one of the above 11 to 13, wherein the first Fresnel lens portion and the second Fresnel lens portion are laminated to be integrated, and the first electrode lens portion and the second electrode lens portion are laminated to be integrated.

14. An optical head device comprising a light source, an objective lens for converging light emitted from the light source on an optical recording medium, a photodetector for detecting light converged on the optical recording medium and reflected, and the liquid crystal lens element as defined in any one of the above 7 to 13 disposed in an optical path between the light source and the objective lens.

The optical head device according to the above 14, wherein in an optical path from the light source towards the optical recording medium, polarization direction of light incident into the liquid crystal lens element form the light source agrees with an extraordinary refractive index direction of the third liquid crystal layer of the liquid crystal lens element.

An optical head device comprising a light source, an objective lens for converging light emitted from the light source on an optical recording medium, and the liquid crystal lens element as defined in any one of the above 7 to 13 disposed in an optical path between the light source and the objective lens.

15. An optical head device comprising a light source, an objective lens for converging light emitted from the light source on an information recording layer of an optical recording medium, a photodetector for receiving light reflected by the information recording layer, and a beam splitter for splitting a light flux in an outgoing path from the light source towards the optical recording medium and a light flux in a returning path in which light reflected by the information recording layer propagates towards the photodetector, which further comprises the liquid crystal lens element as defined in any one of the above 7 to 13 comprising a liquid crystal lens element for outgoing path, in which the first Fresnel lens portion and the second electrode lens portion are laminated and integrated, and a liquid crystal lens element for returning path, in which the second Fresnel lens portion and the first electrode lens portion are laminated and integrated, wherein the liquid crystal lens element for outgoing path is disposed in an optical path between the light source and the beam splitter, and the liquid crystal lens element for returning path is disposed in an optical path between the beam splitter and the photodetector.

EFFECTS OF THE INVENTION

According to the present invention, it becomes possible to realize a focal-length-continuous-variable liquid crystal lens which continuously changes transmission wavefront according to the magnitude of applied voltage.

Further, according to the present invention, by employing this liquid crystal lens in an optical head device, it is possible to correct an aberration generated the difference of cover thicknesses between optical disks. Further, since the number of input terminals into the element is as small as 3, it is possible to realize an optical head device excellent in controllability, small size and low cost.

Further, since in the first and second Fresnel lens portion provided in the liquid crystal lens element of the present invention, concave portions of the transparent material having a cross section of saw-tooth shape or a saw-tooth shape approximated by steps, are filled with a liquid crystal, although the element can is produce relatively large power component, the thickness of the liquid crystal layer can be reduced, which leads to low-voltage drive and high-speed response. Further, since extraordinary refractive index directions of the first and second liquid crystal layers are perpendicular to each other, stable spherical aberration correction can be realized without depending on direction of incident polarization. Further, according to the present invention, power component can be continuously changed by an electrode lens portion provided in the liquid crystal lens element.

Accordingly, in an optical head device provided with such a liquid crystal lens element, not only a spherical aberration generated due to the difference of cover thickness of a double layer optical disk but also a spherical aberration generated due to variation of cover thickness can be effectively corrected. Further, since deterioration of aberration is small even in a case where an objective lens is misaligned to the liquid crystal lens element at a time of tracking, an optical head device capable of stably carrying out writing and/or reading can be provided.

BRIEF EXPLANATION OF THE DRAWINGS

FIG. 2(A) is a plan view showing a saw-tooth-shaped annular portions constituting a concave-convex portion of a first substrate of the liquid crystal lens element shown in FIG. 1.

FIG. 3: Graphs showing an example of optical path difference of a transmission wavefront produced by the liquid crystal lens of the present invention, wherein $\alpha$ indicates a graph showing the optical path difference in a unit of a wavelength $\lambda$ in relation to radial position r in horizontal axis, $\beta$ indicates a graph of optical path difference of at least $-\lambda$ and at most 0 obtained by subtracting an integer times of wavelength $\lambda$ from the graph of $\alpha$, and $\gamma$ indicates a graph showing an optical path difference symmetric from the graph $\beta$ with respect to the surface of optical path difference zero.

FIGS. 4(A) to 4(C): Side views showing functions of the liquid crystal lens element at different applied voltages to the liquid crystal lens element, wherein FIG. 4(A) shows a convergent transmission wavefront at an applied voltage $V_{+1}$, FIG. 4(B) shows a transmission wavefront having no wavefront change at an applied voltage $V_0$, and FIG. 4(C) shows a divergent transmission wavefront at an applied voltage $V_{-1}$.

FIGS. 19(A) to 19(c): Cross sectional views showing functions of the liquid crystal lens element of the present invention at different applied voltages to the Fresnel lens portion of the liquid crystal lens element, wherein FIG. 19(A) shows a convergent transmission wavefront at an applied voltage $V_{+1}$, FIG. 19(B) shows a transmission wavefront having no wavefront change at an applied voltage $V_0$, and FIG. 19(C) shows a divergent transmission wavefront at an applied voltage $V_{-1}$.

FIG. 20: A schematic view showing a phase difference distribution produced by an electrode lens portion of the liquid crystal lens element of the present invention, wherein α indicates a target phase difference, and β indicates a phase difference produced by the electrode lens portion.

Figure 1:
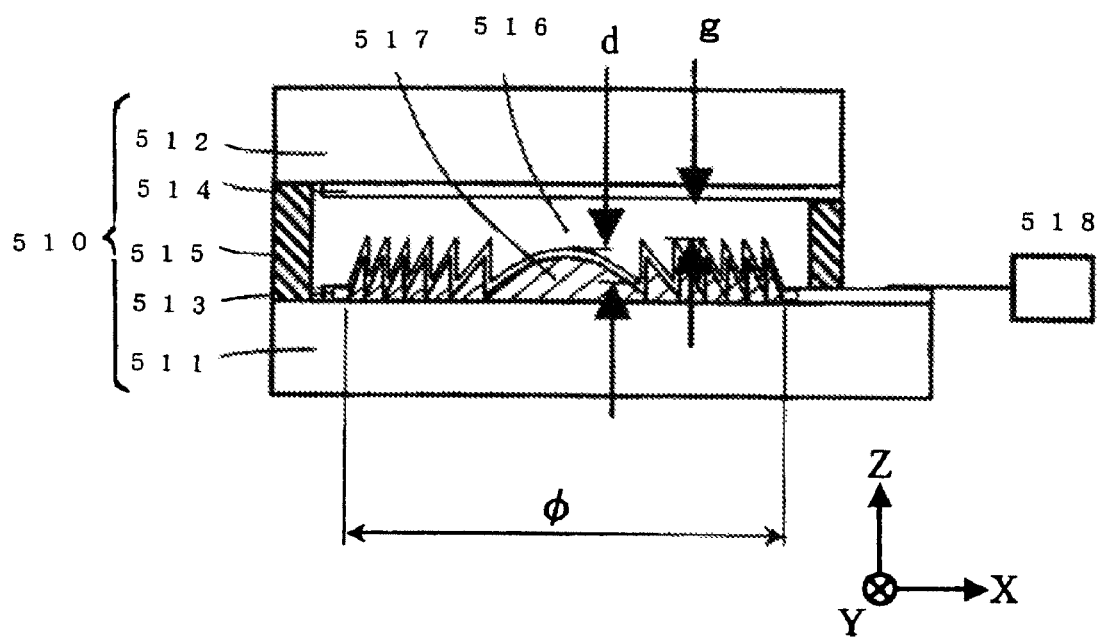
FIG. 1: A side view showing the construction of a liquid crystal lens element of an embodiment according to the present invention.

EXPLANATION OF NUMERALS 10, 70, 80: Liquid crystal lens element
10A: First Fresnel lens portion
10B: Second Fresnel lens portion
10C: (First) electrode lens portion
10D: (Second) electrode lens portion
11, 12, 13, 13A, 13B, 13C, 14: Transparent substrate
15, 16, 17, 18, 19, 19B: Transparent electrode
15A to 18A: Electrode pickup portion
19A: Electrode pickup portion
20, 20B: Complex electrode
21, 22, 23, 23B: Seal
24, 25, 26, 26B: Liquid crystal layer
27, 28: Concave-convex portion
29: Conductive connection means
30, 30A, 30B, 30C, 30D: External signal source
31 to 34: Low resistive electrode
31A to 34A: Electrode pickup portion
35: High resistive plane electrode
40, 50: Complex electrode
45, 55: High resistive plane electrode
41 to 44, 51 to 54: Low resistive electrode
61: Laser diode
62: Polarizing beam splitter
63: Collimeter lens
64: Liquid crystal lens element
65: Quarter wavelength plate
66: Objective lens
67: Cylindrical lens
68: Photodetector
70A: Fresnel lens portion
70B: Electrode lens portion
80A: Liquid crystal lens portion for returning path
80B: Liquid crystal lens portion for outgoing path
501: Laser diode (light source)
502: Diffraction grating
503: Beam splitter
504: Collimeter lens
505: Objective lens
506: Photodetector
507: Phase plate
510, 520, 530: Liquid crystal lens element
511: Transparent substrate (first substrate)
512, 512A, 512B: Transparent substrate (second substrate)
513, 153C, 513D: (First) transparent electrode
514, 514C, 514D: (Second) transparent electrode
514A: Electrode segment
515, 515A, 515B: Seal
516: Liquid crystal layer (liquid crystal)
517: Concave-convex portion
518: Driving power source circuit
519A, 519B, 519C: Terminal electrode for supplying driving power source
551: Resistor
554: Lead-out electrode 554B, 554C, . . . , 554I: Terminal electrode
540: Optical head device
D: Optical device
D1: First recording layer
D2: Second recording layer

BEST MODE FOR CARRYING OUT THE INVENTION

First Embodiment

An embodiment of the present invention is described below with reference to attached drawings.

FIG. 1 shows a liquid crystal lens element 510 according to the first embodiment of the present invention and the liquid crystal lens element 510 comprises transparent substrates 511 and 512 (hereinafter referred to as first and second substrates 511 and 512), transparent electrodes 513 and 514, a seal 515, a liquid crystal layer (liquid crystal) 516, a concave-convex portion 517 and a driving power source circuit 518.

For the liquid crystal layer 516, a nematic liquid crystal having an ordinary refractive index $n_o$ and an extraordinary refractive index $n_e$ (here, $n_o \neq n_e$) is employed. The concave-convex portion 517 is made of a transparent material of refractive index $n_s$, and has a concave-convex-shaped cross section having a depth of d. The concave-convex portion 517 preferably has a saw-tooth-shape or a saw-tooth-shape approximated by steps, which has rotational symmetry about an optical axis (Z axis) of incident light in its region of effective diameter ϕ.

Figure 2A:
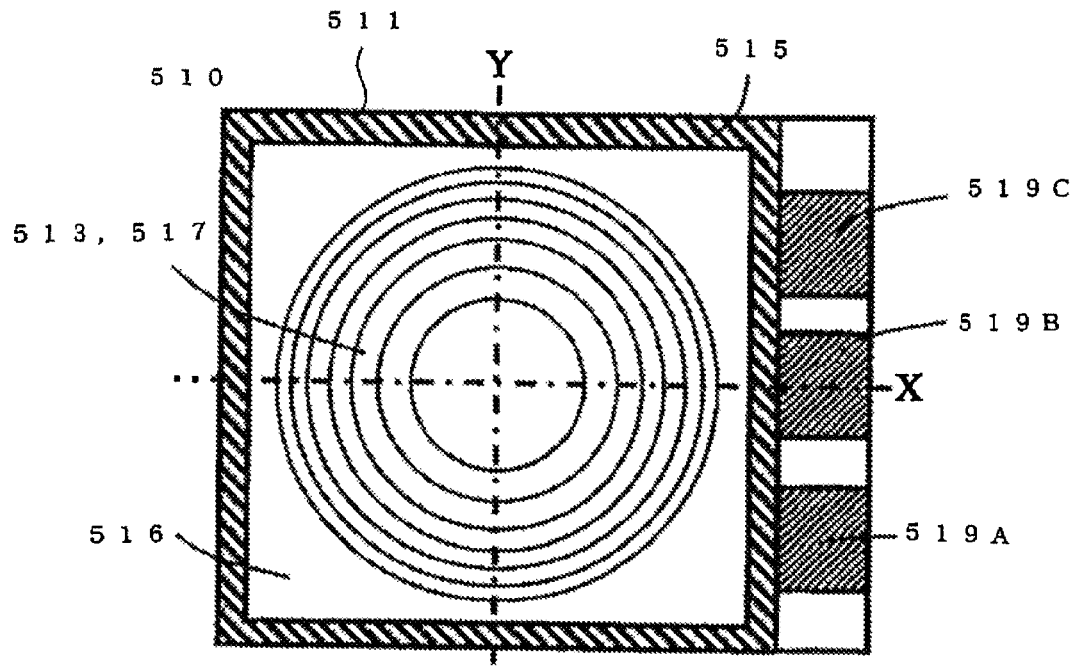
FIGS. 2(A) and (B)
Figure 2B:
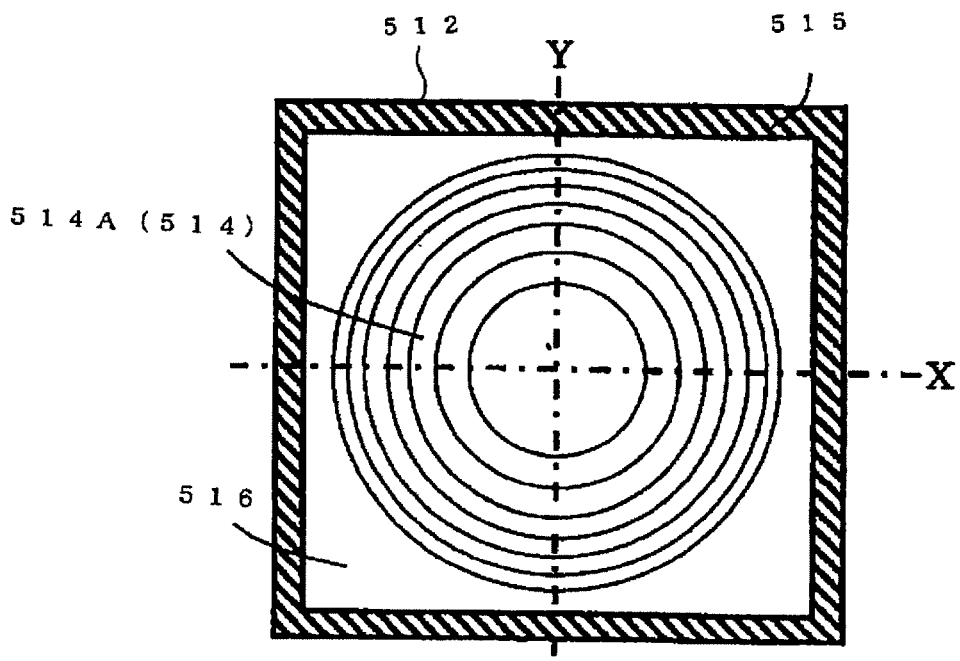
FIG. 2(B) is a plan view showing annular electrode segments constituting a transparent electrode of a second substrate.

Then, FIGS. 2(A) and 2(B) show plan views of the first substrate 511 and the second substrate 512 respectively.

On the first substrate 511, a plurality of concave-convex portions 517 being a concentric saw-tooth-shaped annular portion, are formed, and on a surface (outer face) of the concave-convex portion 517, a transparent electrode 513 constituted by a plurality of concentric saw-tooth-shaped annular portions, are formed.

Meanwhile, on the second substrate 512, electrode segments 514A (transparent electrode 514) being divided annular electrodes, are formed so as to be applied with different voltages. The electrode segments 514A are formed by dividing an electrode so as to correspond to respective radiuses of the concave-convex portion 517 of the first substrate 11.

Further, on the transparent electrode 513 and the transparent electrode 514, terminal electrodes 519A to 519C are provided for supplying drive power from outside of the element. In this embodiment, explanation is made based on an example in which the second electrode is divided into annular electrode segments, but there is no problem even if the electrode of the first substrate is divided into annular shapes.

Then, alignment direction of nematic liquid crystal molecules of the liquid crystal layer 516 is explained in detail. As alignment direction of nematic liquid crystal molecules, for example, there are the following three types.

i) Homogeneous Alignment:

When a dielectric anisotropy Δ∈ being the difference between a specific dielectric constant in an extraordinary refractive index direction and a specific dielectric constant in an ordinary refractive index direction of a liquid crystal, is positive, in FIG. 1, when on surfaces of the transparent electrodes 513 and 514, alignment films (now shown) such as polyimide are applied so as to make alignment directions of liquid crystal molecules substantially in parallel with surfaces of the first and the second substrates 511 and 512 respectively, cured and subjected to rubbing treatment in X axis direction, a homogeneous alignment is formed in which alignment direction of liquid crystal molecules (namely, the direction of extraordinary refractive index $n_e$) is aligned in X axis direction. Here, instead of the method of rubbing treatment of polyimide, SiO oblique vapor deposition film or an optical alignment film may be employed to align liquid crystal molecules. Here, by applying an AC voltage V to the transparent electrodes 513 and 514, substantial refractive index n(V) of the liquid crystal layer 516 changes between $n_1=n_e$ and $n_2=n_o$ for linearly polarized incident light having a polarization plane in X axis direction.

By this construction, since a large difference of substantial refractive index of the liquid crystal layer 516 can be obtained at low voltage, the maximum depth d of the concave-convex portion 517 forming a substrate surface for the transparent electrode 513 of concave-convex shape, can be relatively small value. As a result, a production step for producing the concave-convex portion 517 can be shortened and the thickness of the liquid crystal layer 516 can be reduced, which leads to high speed response.

ii) Hybrid Alignment

In order to obtain this alignment, first of all, on a surface of the transparent electrode 513 on the concave-convex portion 517, an alignment film (not shown) such as polyimide for producing alignment direction of liquid crystal molecules substantially perpendicular to substrate surface, is applied and cured. Here, on a surface of a flat transparent electrode 514, an alignment film (not shown) such as polyimide for making the alignment direction of liquid crystal molecules in parallel with substrate surface, is applied and cured, and thereafter subjected to rubbing treatment in X axis direction. As a result, a hybrid alignment is formed in which alignment direction of liquid crystal molecules is aligned substantially in vertical direction to the substrate surface at the transparent electrode 513 of the concave-convex portion 517, and is aligned substantially in parallel direction with substrate surface at the transparent electrode 514. It is difficult to apply uniform alignment treatment to the surface of concave-convex portion 517 by rubbing, but in this case, since such an alignment treatment to the concave-convex portion 517 becomes unnecessary, it is easy to obtain uniform liquid crystal alignment. Here, by applying AC voltage V to the transparent electrodes 513 and 514, substantial refractive index n(V) of the liquid crystal layer 516 changes between $n_1 \approx (n_e + n_o)/2$ and $n_2 = n_o$ for linearly polarized incident light having a polarization plane in X axis direction.

By this construction, since alignment of the liquid crystal layer 516 is controlled by the alignment film formed on a substrate surface of the flat transparent electrode 514 and subjected to alignment treatment, even without alignment treatment of the alignment film on a substrate surface of the concave-convex shaped transparent electrode 513, alignment direction of the liquid crystal layer 516 is stabilized. As a result, deterioration of efficiency of transmission light caused by defective alignment of substrate surface, can be reduced.

iii) Vertical Alignment:

In order to obtain this alignment, a liquid crystal having a negative dielectric anisotropy Δ∈ in which alignment of liquid crystal is uniformly in vertical direction to electric field direction, is employed, and first of all, on surfaces of the transparent electrode 513 and 514, an alignment films (not shown) such as polyimide aligning alignment direction of liquid crystal molecules substantially perpendicular to substrate surfaces, are applied and cured. Further, only the alignment film of the transparent electrode 514 is subjected to rubbing treatment in X axis direction. As a result, a vertical alignment is constituted in which alignment direction of liquid crystal molecules is aligned substantially in a perpendicular direction to substrate surfaces of the transparent electrodes 513 and 14 of the concave-convex portion 517. Since it is not necessary to apply an alignment treatment to the surface of the concave-convex portion 517, it is easy to obtain uniform liquid crystal alignment. Here, when a voltage V is applied to the transparent electrodes 513 and 514, substantial refractive index n(V) of the liquid crystal layer changes from $n_1 = n_o$ to $n_2 = n_e$ for linearly polarized incident light having a polarization plane of X axis direction.

By this construction, it is possible to obtain a large change of substantial refractive index of the liquid crystal layer 516 by low voltage, it is possible to make the maximum depth d of the concave-convex portion 517 forming a substrate surface of the concave-convex-shaped transparent electrode 513 a relatively small value. As a result, it is possible to shorten production step of the concave-convex portion 517 and to reduce the thickness of the liquid crystal layer 516, which leads to high speed response. Further, since alignment of the liquid crystal layer 516 is controlled by an alignment film subjected to alignment treatment on a substrate surface of the transparent flat electrode 514, alignment direction of the liquid crystal layer 516 becomes stable even without alignment treatment of the alignment film on the substrate surface of the concave-convex-shaped transparent electrode 513. As a result, it is possible to reduce deterioration of efficiency of transmission light due to defective alignment of substrate surfaces.

Then, an example of the process for producing the liquid crystal lens element 510, is described below. First of all, on one of flat surfaces of the first substrate 511, a concave-convex portion 517 made of a transparent material of refractive index $n_s$ and having a cross section of saw-tooth-shape or a saw-tooth-shape approximated by steps, is formed. Further, on a surface of the concave-convex portion 517, a transparent electrode 513 is formed. In this embodiment, explanation is made based on an example in which the transparent electrode 513 is formed on a surface of the concave-convex portion 517, but the transparent electrode 513 may be made between the concave-convex portion 517 and the substrate 511.

Further, as shown in FIG. 2(B), on a substrate 512 on which an electrode 514 divided into annular portions is formed, an adhesive agent containing a gap control agent is patterned by printing to form a seal 515, and the above-mentioned transparent substrate 511 is laminated and press-bonded to form an empty cell. At this time, a gap between convex portions of the concave-convex portion 517 of the first substrate 511 and the substrate 512 is designated as g. From an injection port (not shown) provided in a part of the seal 515, a nematic liquid crystal 516 having an ordinary refractive index $n_o$ and an extraordinary refractive index $n_e$ (here, $n_o \neq n_e$) is injected, the injection port is sealed to seal the liquid crystal 516 in the cell to constitute the liquid crystal lens element 510 of this embodiment. Although omitted in the Figure, a transparent insulation film is preferably formed on a surface of the transparent electrode 514 to have a film thickness of from 10 to about 200 nm to prevent short circuit and an alignment film of liquid crystal is preferably formed.

Thus, at least concave portions of the concave-convex portion 517 are filled with liquid crystal, and an AC power source, not shown, is connected to a drive power source circuit 518. As the connecting method, terminal electrodes 519B and 519C for supplying drive power are formed on the transparent substrate 511 side, and conductive metal particles are contained in the seal 515 in advance and press-bond the seal to form conductivity in the thickness direction of the seal, to thereby form conductivity between the transparent electrode 514 and the terminal electrodes 519B and 19C. Further, by connecting a drive power source circuit 518 to these terminal electrodes 519B and 519C, it is possible to apply a voltage to the liquid crystal layer 516.

Thus, the liquid crystal lens element 510 is completed.

Here, in the process of producing the liquid crystal lens element 510, the concave-convex portion 517 made of a transparent material may be made of an organic material such as a UV-curable resin, a thermosetting resin or a photo-sensitive resin, or an inorganic material such as $SiO_2$, $Al_2O_3$ or $SiO_xN_y$, (here, x and y show the element ratio between O and N). Further, the concave-convex portion 517 may be made of an uniform refractive index material or a birefringent material. The point is, it is sufficient that the concave-convex portion 517 is made of a transparent material having a refractive index $n_s$ between $n_1$ and $n_2$ in the polarizing direction of incident light in which the refractive index of the liquid crystal layer 516 changes according to applied voltage.

Further, the concave-convex portion 517 may be formed by forming a transparent material layer of a predetermined film thickness on a flat surface of the first substrate 511, and by fabricating the transparent material layer into concave-convex shape by photolithography or reactive ion etching, or may be formed by transferring the concave-convex shape to the transparent material layer by using a metal mold. Here, in order to obtain large change of substantial refractive index of the liquid crystal layer 516 in response to applied voltage, alignment direction of molecules of the liquid crystal layer 516 filling the concave portions of the concave-convex portion 517, is preferably uniformly aligned on surfaces of the transparent electrode 513 and 514.

In the liquid crystal lens element 510 of this embodiment thus formed, when an AC voltage of rectangular wave is applied to the transparent electrodes 513 and 514 by employing an AC power source, molecular alignment of liquid crystal changes, and substantial refractive index of the liquid crystal layer 516 changes between $n_1$ and $n_2$ ($n_1 \neq n_2$). As a result, for particular linearly polarized incident light, refractive index difference $\Delta n(V)$ between the liquid crystal and the concave-convex portion 517 changes according to the magnitude of applied voltage, and wavefront of transmission light through the liquid crystal lens element 510 changes. Here, "substantial refractive index" of the liquid crystal layer 516 means an average refractive index of the liquid crystal layer 516 sandwiched between the transparent electrodes 513 and 514 in the polarization direction of incident light, which corresponds to average refractive index represented by (optical path of liquid crystal layer)÷(thickness of liquid crystal layer).

Then, cross sectional shape of the concave-convex portion 517 of saw-tooth shape or a saw-tooth shape approximated by steps, is explained in detail as follows.

The liquid crystal lens element 510 of the present invention is mounted on an optical head device, and configured so that in a transmission wavefront of plane wave incident into the liquid crystal lens element 510, an optical path difference OPD of a light beam passing a point at a radial distance r from a light beam at an optical axis center (coordinate origin: x=y=0), satisfies a power series of formula (2).

$$OPD(r) = a_1 r^2 + a_2 r^4 + a_3 r^6 + a_4 r^8 + \ldots \qquad (2)$$

wherein $r^2 = x^2 + y^2$ $a_1, a_2, \ldots$ ; constant

In such a construction, it is possible to produce a transmission wavefront for correcting a spherical aberration generated due to the difference of cover thickness of optical disk, and to produce a transmission wavefront having a positive or negative power component to prevent generation of aberration due to misalignment with an objective lens.

Here, specific shape of a curve of formula (2) is indicated by a symbol a in FIG. 3. Here, the lateral axis represents a radial position r and the vertical axis represents an optical path difference OPD in a unit of wavelength λ of incident light.

Transmission wavefronts having an optical path difference of an integer times of λ from each other for incident light of wavelength λ, can be regarded as equivalent. Accordingly, the graph β showing an optical bath difference produced by slicing a graph (an optical path difference) indicated by α in FIG. 3 at an interval of wavelength λ and projecting it on a plane of optical path difference zero, is substantially equivalent to graph α. The optical path difference represented by the graph β is entirely within λ (a range of from −λ to zero in the figure), and has a cross section of saw-tooth-shape.

Then, the depth d of the concave-convex portion 517 having a saw-tooth-shaped cross section, becomes as follows.

First of all, explanation is made with respect to a case where all of the electrode segments divided from the transparent electrode 514 of the second substrate 512 have the same electric potential. In this case, a liquid crystal present in a gap g (hereinafter this gap is referred to as "cell gap") between convex portions of the concave-convex portion 517 and the second substrate 512, is applied with substantially uniform voltage when electric potentials applied to the divided electrode segments 514A are equal. For this reason, the refractive index change of the liquid crystal in the cell gap, uniformly shifts wavefront of transmission light, which can be disregarded in this case.

When a voltage V is applied between the transparent electrodes 513 and 514, provided that substantial refractive index of the liquid crystal layer 516 (liquid crystal) for extraordinarily polarized light is designated as n(V), the refractive index difference between the liquid crystal layer 516 made of a transparent material and the concave-convex portion 517 is $\Delta n(V)=n(V)-n_s$. For example, at an applied voltage $V_{+1}$, in order to produce an optical path difference of transmission wavefront corresponding to graph β of FIG. 3, it is sufficient that the depth d of the concave-convex portion 517 shown in FIG. 1 satisfies the relation of formula (3).

$$d=\lambda/|\Delta n(V_{+1})|$$

wherein
λ; wavelength of incident light
$\Delta n(V_{+1})=n(V_{+1})-n_s=n_1-n_s$
$n_1, n_s$; refractive index Here, by changing applied voltage V, refractive index difference $\Delta n(V)$ changes. For example, i) at an applied voltage $V_0$ satisfying $\Delta n(V_0)=0$, transmission wavefront through the liquid crystal lens element 10 does not change. Further, ii) at an applied voltage $V_{-1}$ satisfying $\Delta n(V_{-1})=-\Delta n(V_{+1})$, a transmission wavefront having an optical path difference shown in graph γ of FIG. 3 is produced. This corresponds to a transmission wavefront having an optical path difference symmetric from graph β of FIG. 3 with respect to a plane of optical path difference zero.

Thus, it is possible to produce three types of wavefront states that are a state of no change of transmission wavefront and transmission wavefronts of graphs β and γ of FIG. 3, by applying voltage. Further, when the refractive index $n_s$ is made to be substantially equal to $n_1$ or $n_2$, it is possible to produce two wavefront states that are a state of no change of transmission wavefront and a state of β or γ.

Figure 5:
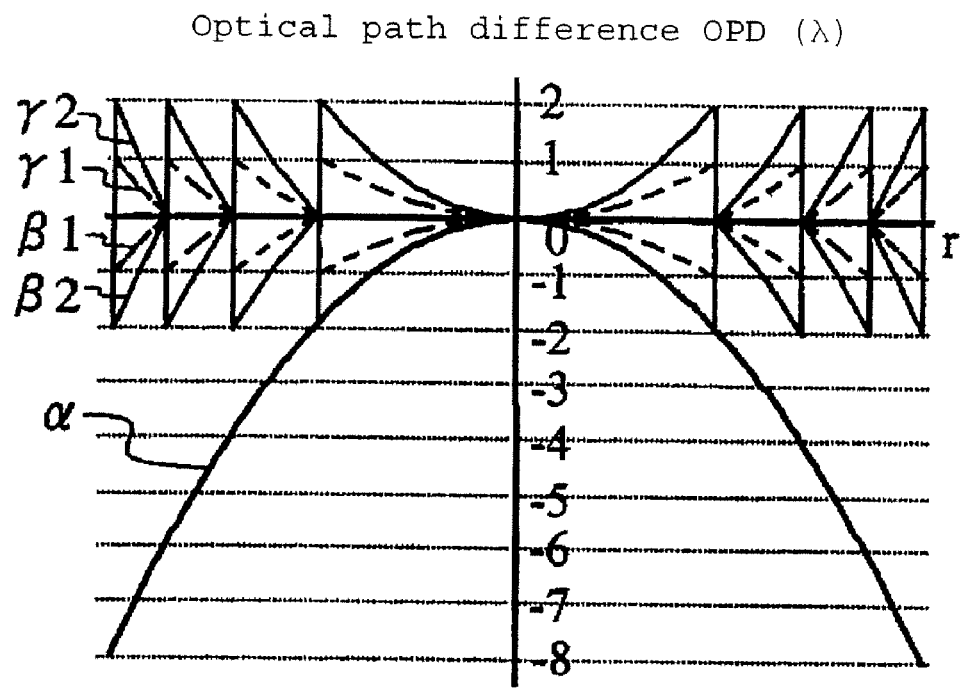
FIG. 5: A graph showing an example of optical path difference of transmission wavefront generated by the is liquid crystal lens of the present invention, wherein a indicates a graph representing an optical path difference in a unit of wavelength $\gamma$ in relation to a radial position r in horizontal axis, $\beta 2$ indicates a graph showing an optical path difference of at least $-2\lambda$ and at most zero obtained by subtracting an integer times of wavelength $2\lambda$ from the graph $\alpha$, $\beta 1$ indicates a graph showing an optical path difference that is a half of the optical path difference of $\beta 2$, $\gamma 1$ indicates a graph showing an optical path difference symmetric from the graph of $\beta 1$ with respect to a plane of optical path difference zero, and $\gamma 2$ indicates a graph showing an optical path difference symmetric from $\beta 2$ with respect to a plane of optical path difference zero.

Here, graph α of FIG. 5 is, in the same manner as graph α of FIG. 3, a graph showing an optical path difference OPD represented by formula (2). Graph β2 of FIG. 5 shows an optical path difference produced by slicing graph α of FIG. 5 at an interval of twice of wavelength λ (namely, 2λ) and projecting it on a plane of optical path difference zero. The graph β2 is substantially equivalent to graph α, and the optical path difference represented by graph β2 is entirely within 2λ (a range of from −2λ to zero in the figure), and has a cross section of saw-tooth shape.

Figure 11:
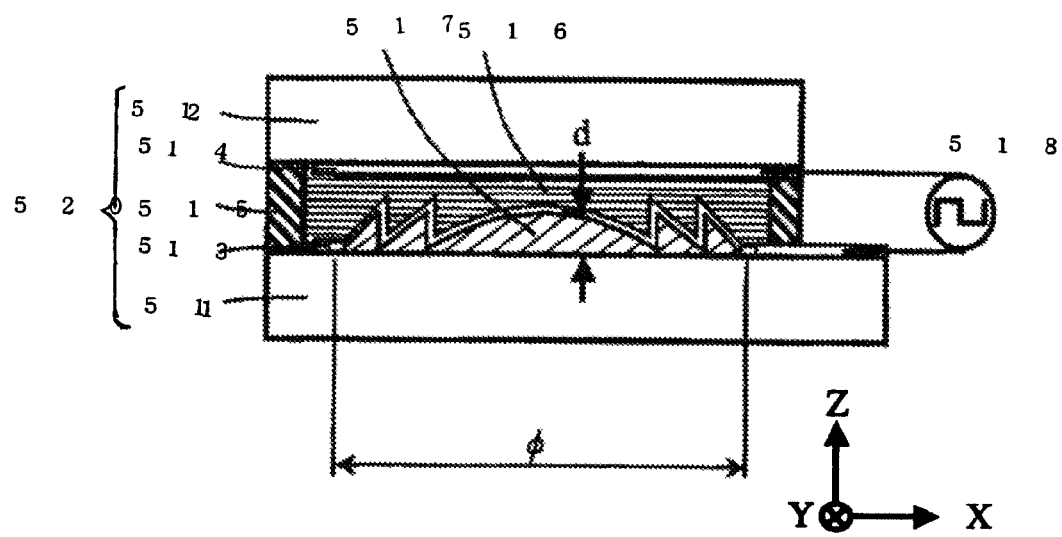
FIG. 11: A side view showing the construction of the liquid crystal lens element of the present invention.

Accordingly, in order to produce an optical path difference of transmission wavefront corresponding to graph β2 of FIG. 5 at an applied voltage $V_{+2}$, the concave-convex portion 517 shown in FIG. 11 may be fabricated to have a depth d satisfying the relation of formula (4).

$$d=2\lambda/|\Delta n(V_{+2})|$$

wherein λ; wavelength of incident light.

$$\Delta n(V_{+2})=n(V_{+2})-n_s=n_1-n_s.$$

Here, by changing applied voltage V, refractive index difference $\Delta n(V)$ changes. For example, i) at an applied voltage $V_0$ satisfying $\Delta n(V_0)=0$, transmission wavefront through the liquid crystal lens element 520 does not change. Further, ii) at an applied voltage $V_{+1}$ satisfying $\Delta n(V_{+1})=n(V_{+2})/2$, a transmission wavefront of an optical path difference shown in graph β1 of FIG. 5 is produced.

iii) At an applied voltage $V_1$ satisfying $\Delta n(V_1)=-\Delta n(V_{+1})$, a transmission wavefront of an optical path difference shown in graph γ1 of FIG. 5 is produced.

iv) At an applied voltage $V_{-2}$ satisfying $\Delta n(V_{-2})=-\Delta n(V_{+2})$, a transmission wavefront of an optical path difference shown in graph γ2 of FIG. 5 is produced.

Thus, by employing a concave-convex portion shown in FIG. 5 which has a cross section of saw-tooth shape or a saw-tooth shape approximated by steps, namely, by employing the concave-convex portion 517 in FIG. 11, it is possible to produce five types of wavefront states that are a state of no transmission wavefront change and wavefront states of graphs β1, β2, γ1 and γ2 of FIG. 5, by applied voltage.

By the way, in each of the wavefront states (β, γ, β1, γ1, β2, γ2) shown in FIG. 3 or 5, a transmission wavefront can be changed into discrete states. However, it is not possible continuously change an intermediate state between these states. Here, to simplify the explanation of this embodiment, explanation is made with respect to an example of the construction of FIG. 3 satisfying formula (3).

Figure 6:
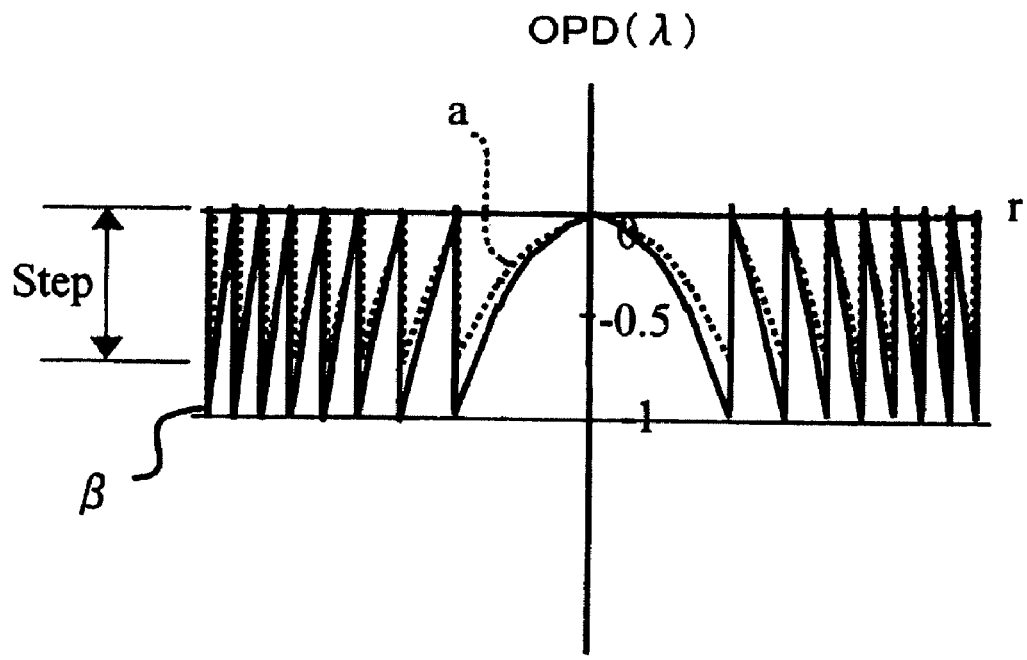
FIG. 6: A graph showing an example of an optical path difference in a case where an applied voltage to the liquid crystal lens element of the present invention is an intermediate voltage.

FIG. 6 shows an example of wavefront shape at an intermediate voltage Va between an applied voltage $V_0$ producing the state of no wavefront change (hereinafter referred to as "zero state") and an applied voltage $V_{+1}$ producing a wavefront shape of graph β (optical path difference: OPD). As shown in the figure, in the wavefront state of graph β, when the amplitude (step) of concave-convex shape of saw-tooth-shaped wavefront equals to a wavelength λ (or equals to an integer times of wavelength λ) transmitted, a continuous wavefront shape can be realized, but in the state of broken line a at a time of applying an intermediate voltage Va, the step is not equal to the wavelength λ. Accordingly, a transmission wavefront becomes discontinuous, and thus, transmittance (diffraction efficiency) is lowered and wavefront aberration is also deteriorated, such being problematic.

In the foregoing, explanation has been made with respect to a case where all electrode segments 514A divided from the transparent electrode 514 on the side of the second substrate 512, being the second transparent electrode of the present invention, are applied with the same electric potential, but in order to solve the problem of discontinuous wavefront at an intermediate voltage, it is preferred to divide the second transparent electrode into annular shapes, and to apply different voltages to the electrode segments 514A.

Figure 7:
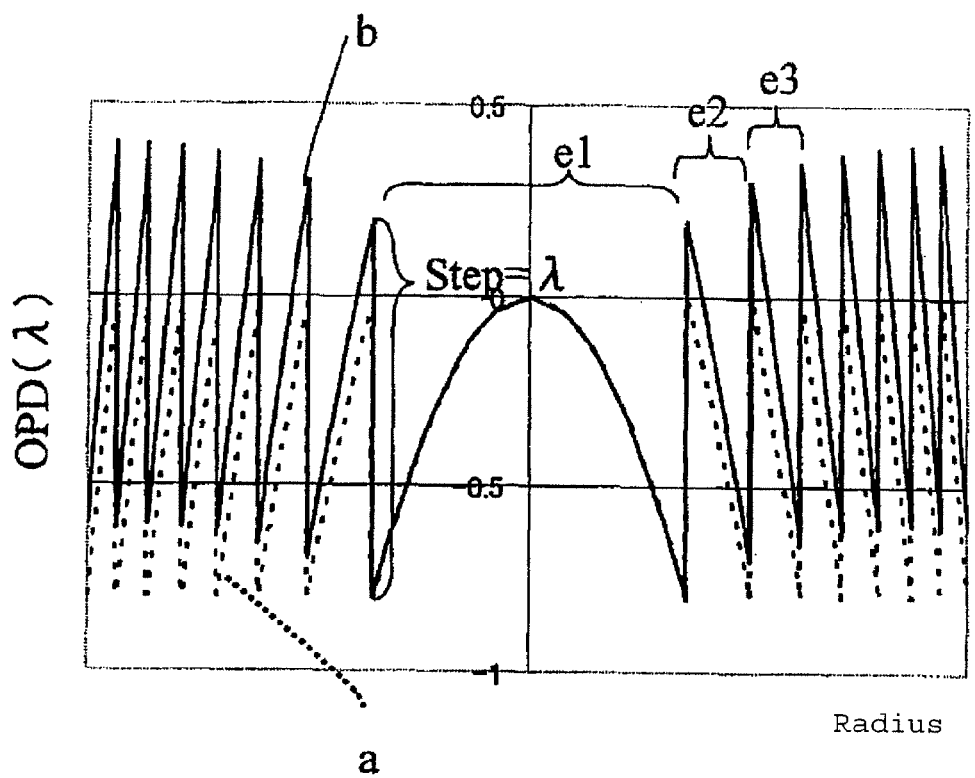
FIG. 7: A graph showing an example of optical path difference in a case where applied voltages to respective annular rings are different in the liquid crystal lens element of the present invention.
Figure 8:
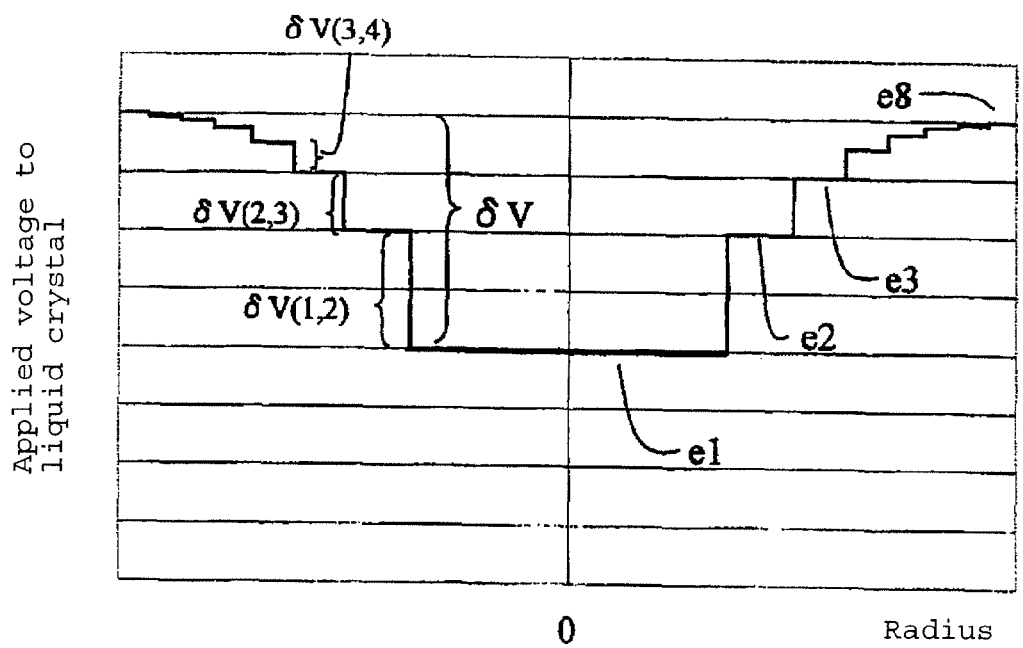
FIG. 8: A graph showing an example of applied voltages in a case where applied voltages to the respective annular rings are different in the liquid crystal lens element of the present invention.

As described above, in the state of graph a shown in FIG. 6, the step does not equal to $\lambda$. Accordingly, as the optical path difference b represented by the solid line in FIG. 7, it is necessary to make the step equal to $\lambda$. It can be realized by applying different voltages to the regions of respective concave-convex annular portions of the liquid crystal. For this purpose, FIG. 8 shows an example of voltage distribution applied to the liquid crystal. As shown in FIG. 8, in order to form a voltage distribution in which the voltage changes stepwise so as to correspond to the respective annular regions, namely, from e1 to e8, the voltage is applied in a manner that the difference between adjacent voltages is reduced from e1 towards e8. When the liquid crystal lens 10 is configured so that voltage difference $\delta V(k, k+1)$ between k-th annular portion $e_k$ from the center of the element and the adjacent k+1-th annular portion $e_{k+1}$, and a voltage difference $\delta V(k-1, k)$ between k−1-th and k-th annular portions, are different, effective refractive index of the liquid crystal in each region changes, and thus, it is possible to make a step between regions of OPD equal to the wavelength $\lambda$. At this time, since the voltage applied to the liquid crystal is not uniform, it is necessary to consider refractive index changes of the liquid crystal at the maximum thickness d in the concave-convex portion 517 and the liquid crystal in the gap (g) between the convex portions and the second transparent electrode 514, to determine an optical path. According to the present inventors, it has discovered that the following conditions are required for voltage distribution making the step between regions of OPD equal to the wavelength. The conditions are the following three points:

1. d=g,

2. $\delta V(k-1, k)=2 \cdot \delta V(k, k+1)$,

3. Applied voltage to the liquid crystal in the outermost annular portion satisfies the relations of formula (3) and formula (4).

Figure 9:
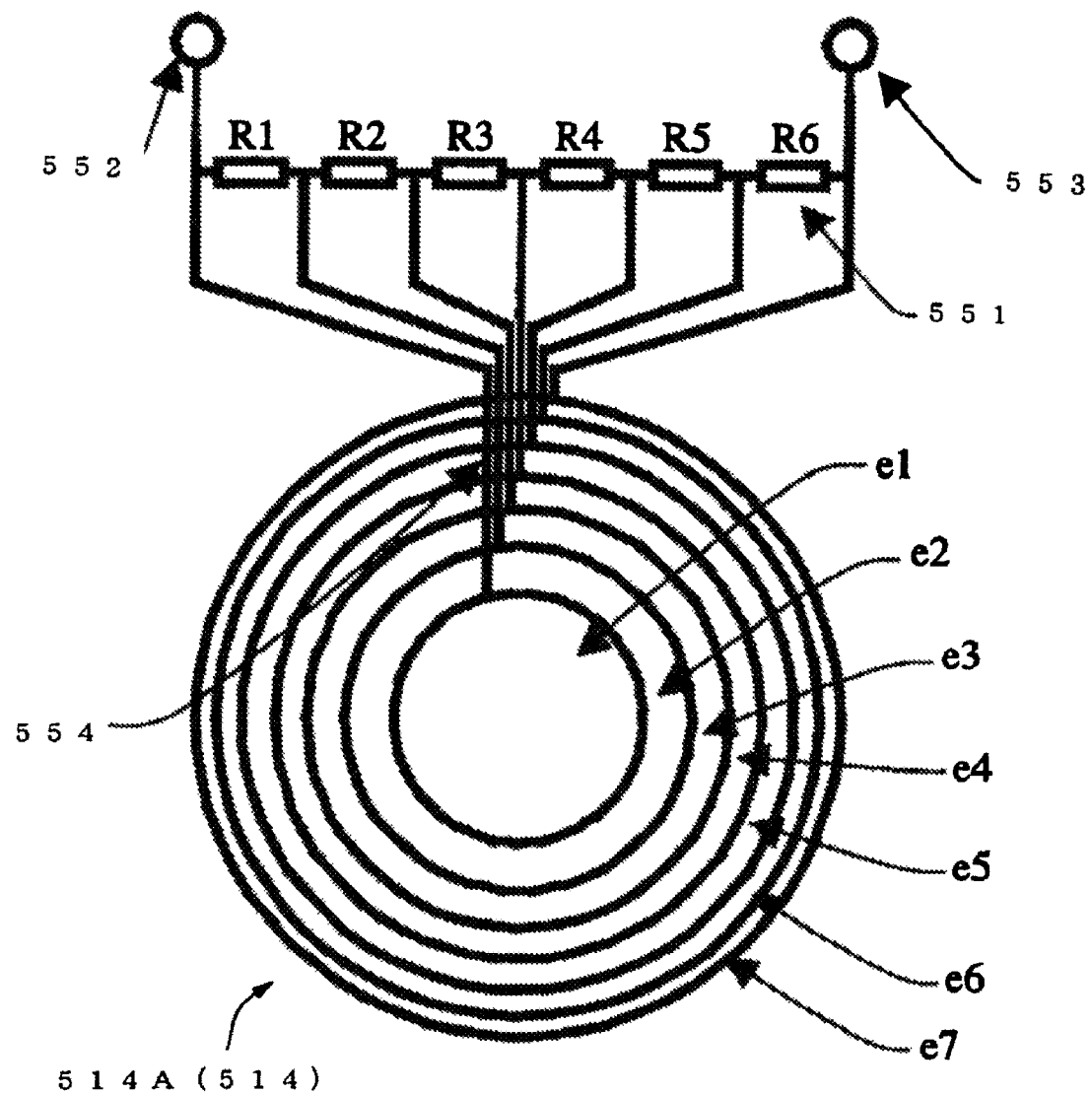
FIG. 9: A schematic plan view showing a connection of annular segments with a resistor in a second electrode of the liquid crystal lens element of the present invention.

For example, in order to easily satisfy the second condition, the divided second electrode segments 514A are, as shown in FIG. 9, electrically connected one another so that the segments ($e_1$ to $e_7$) are electrically connected with adjacent segments via respective resistors 551 (the resistance of the resistors are from $R_1$ to $R_6$). By this construction, without supplying different voltages to the respective segments, it is possible to achieve the second condition by supplying only a voltage applied to the innermost transparent electrode $e_1$ and a voltage applied to the outermost transparent electrode ($e_8$: a case of eight electrode segments), from the terminals 552 and 553.

Namely, voltages applied to the respective electrode segments $e_1$ to $e_8$ are decided by an electric potential difference between the terminals 552 and 553 and the resistances of the respective resistors 551. Accordingly, in order to satisfy the above-mentioned relation $\delta V(k-1, k)=2 \cdot \delta V(k, k+1)$, based on a resistance between an electrode segment annular portion and an adjacently outside electrode segment, a resistance between the electrode segment annular portion and an adjacently inside electrode segment is roughly twice. Namely, provided that k-th resistance and k−1-th resistance from the element center are $R_k$ and $R_{k-1}$ respectively, the resistances are determined so as to satisfy $2 \cdot R_k = R_{k-1}$. In this construction, by applying only two voltages by a drive power source circuit 518 in the outside so as to have an electric potential difference $\delta V$ between the innermost electrode segment $e_1$ and an outermost electrode segment $e_8$, it is possible for electric potential distribution of the segments to satisfy the above-mentioned relation $\delta V(k-1, k)=2 \cdot \delta V(k, k+1)$.

As described above, it is the most preferable to satisfy the relation $\delta V(k-1, k)=2 \cdot \delta V(k, k+1)$ or $2 \cdot R_k = R_{k-1}$, but when $\delta V(k-1, k)=x \cdot \delta V(k, k+1)$ or $y \cdot R_k = R_{k-1}$ is satisfied, it is practically preferred that x and y are between 1.6 and 2.4 since transmittance or wavefront aberration is not significantly deteriorated in the range. Further, x and y are preferably from 1.8 to 2.2 for the same reason.

Further, the maximum thickness d of the concave-convex portion 517 and the gap (g) are the most preferably equal to each other, but provided that d=z·g, z is practically preferably within a range of from 0.8 to 1.2 since transmittance and wavefront aberration are not significantly deteriorated in this range. Further, z is more preferably within a range of from 0.9 to 1.1 for the same reason.

Figure 10:
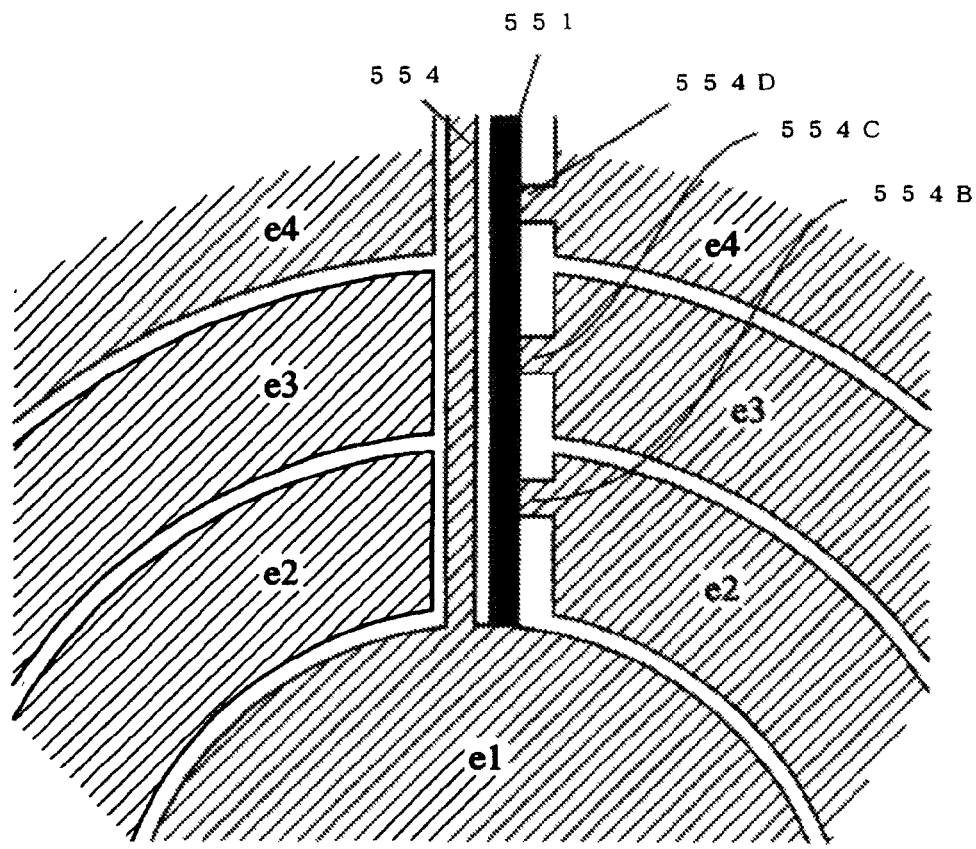
FIG. 10: A schematic plan view showing wire connection state of annular segments and a resistor in the second electrode of the liquid crystal lens element of the present invention.

The resistor 551 can be formed by patterning the same material as the transparent electrode into fine lines, or can be made of a high-resistance thin film on the substrate. As a specific production method for forming the resistor 551, as shown in FIG. 10, terminal electrodes 554B, 554C, ... and 554I for the respective annular segments $e_2$, $e_3$, ... and $e_8$ are connected by a transparent resistor 551 which also forms electrode lead-out lines 554 shown in FIG. 9. Accordingly, it is not necessary to form a plurality of electrode lead-out lines 554 in a region where incident light passes through, and the lead-out line scarcely affects a transmission wavefront, such being preferred. Further, in the liquid crystal lens element 510, e.g. a phase plate, a diffraction grating, a polarizing hologram beam splitter or a correction surface producing a constant fixed aberration may be integrally formed. As a result, in a case of employing the liquid crystal lens element 510 in e.g. an optical head device, it is possible to reduce the number of components, which leads to reduce the size of the device.

Then, an optical head device 540 (to be used for writing/reading an optical disk for DVD) employing the above-mentioned liquid crystal lens element 510 (refer to FIG. 1) according to the present invention, is described with reference to FIG. 13.

The optical head device 540 of this embodiment comprises a laser diode 501 as a light source of wavelength $\lambda$ (=405 nm), a diffraction grating 502, a beam splitter 503, a collimeter lens 504, an objective lens 505, a photodetector 506, and further, a phase plate 507 and the liquid crystal lens element 510 that are disposed in an optical path between the collimeter lens 504 and the objective lens 505. Here, the phase plate 507 preferably be integrated with the liquid crystal lens element 510 since such a construction can reduce the number of components. Further, FIG. 13 shows a case where the liquid crystal lens element 510 is disposed in an optical path between the collimeter lens 504 and the objective lens 505, but it is sufficient that the liquid crystal lens element 510 is disposed in an optical path between the laser diode 501 and the objective lens 505.

Then, functions of this embodiment are described.

Figure 13:
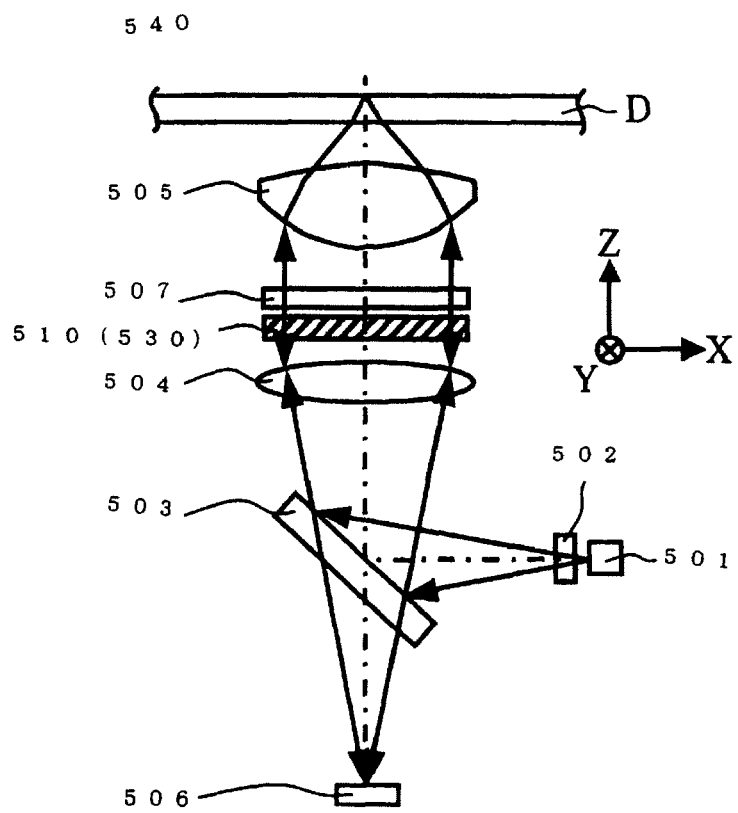
FIG. 13: A construction view showing an optical head device of the present invention employing the liquid crystal lens element of the present invention.

From linearly polarized output light of wavelength $\lambda$ emitted from the laser diode 1 and having a polarization plane in the document face of FIG. 13, three beams for tracking are generated by the diffraction grating 502. The three beams are reflected by the beam splitter 503, each transformed into parallel light by the collimeter lens 505, and incident into the liquid crystal lens element 510. Then, light transmitted through the liquid crystal lens element 510 is transformed into circularly polarized light by the phase plate 507, and converged on an information recording layer of an optical disk D by the objective lens 505.

Here, the objective lens 505 is moved in X axis direction and Y axis direction by an actuator (not shown) for focus servo and tracking servo. Light reflected by the optical disk D is transmitted again through the objective lens 505 and the phase plate 507, transformed into linearly polarized light having a polarization plane in a perpendicular direction to the document face, transmitted through the liquid crystal lens element 510, and by the collimeter lens 504, a part of the light is transmitted through the beam splitter 503 and converged on a photo-receiving plane of the photodetector 506.

Then, writing/reading operations of an optical head device 540 employing the liquid crystal lens element 510 of the present invention to/from an optical disk D having two layers (0-th layer: L0, 1-st layer: L1) having different cover thicknesses, are described as follows. Here, in this embodiment explanation is made based on an example in which the objective lens 505 is designed to minimize spherical aberration for an optical disk D having a cover thickness of 87.5 μm.

(i) A case of double layer optical disk L0 layer (covert thickness 100 μm):

At a time of writing/reading to/from an information recording layer having a cover thickness of 100 μm in the optical disk D, a AC voltage $V_1$ is applied between the transparent electrodes so that a transmission wavefront through the liquid crystal lens element 510 becomes slightly divergent spherical wave. Here, an electric potential difference $\delta V=0$ is satisfied between electrode segments $e_1$ to $e_8$ of the second electrode segments 14A. In this condition, since the refractive index of the liquid crystal layer 516 becomes larger than that of the concave-convex portion 517, as shown in FIG. 4(A), a negative power, namely, a transmission wavefront corresponding to concave lens, is generated. Namely, the transmission light is efficiently converged on an information recording layer having a cover thickness of 100 μm by the objective lens 505.

(ii) A case of double layer optical disk L1 layer (covert thickness 75 μm):

On the other hand, at a time of writing/reading to/from an information recording layer having a cover thickness of 75 μm in a double layer optical disk D, an AC voltage $V_{-1}$ is applied between the electrodes so that a transmission wavefront through the liquid crystal lens element 510 becomes slightly convergent spherical wave. At this time, since the refractive index of the liquid crystal layer 516 becomes smaller than that of the concave-convex portion 517, as shown in FIG. 4(C), a transmission wavefront having a positive power, namely, corresponding to convex lens, is generated. Namely, by the objective lens 505, the transmission light is efficiently converged on the information recording layer having a cover thickness 75 μm. Accordingly, by switching an applied voltage to the liquid crystal lens element 510 among $V_0, V_{+1}$ and $V_{-1}$, stable writing/reading to/from a single layer DVD optical disk and a double layer DVD optical disk having different cover thicknesses, is realized.

(iii) A case of double layer optical disk L0 layer having a cover thickness deviation (cover thickness >100 μm):

In the above-mentioned setting of the liquid crystal lens for writing/reading to/from an information recording layer having a cover thickness of 100 μm, for example, for an optical disk having a cover thickness 5 μm thinner than nominal value (95 μm cover thickness), there is a case where spherical aberration is generated and suitable writing/reading properties can not be obtained. To cope with this problem, in order to form transmission wavefront through the liquid crystal lens element 510 to be a slightly convergent spherical wave (a spherical wave having slightly longer convergent focal length than that at a time of writing/reading to/from an information recording layer having a cover thickness of 100 μm), a voltage $V_1$ is applied between liquid crystal electrodes in the outermost segment region, so that an electric potential difference between the innermost electrode segment (for example, $e_1$ in FIG. 9) and the outermost electrode segment (for example, $e_8$ in FIG. 9) becomes $\delta V \neq 0$. By this construction, it is possible to realize a wavefront having an optical path difference b of FIG. 7. Namely, transmission light is efficiently converged on an information recording layer having a cover thickness deviation, by the objective lens 505.

Thus, according to the optical head device 540 according to this embodiment, the liquid crystal lens element 510 not only can correct spherical aberration generated due to the difference of cover thickness of an optical disk D, but also can add a switching function of power components corresponding to focal point change and fine adjustment function. Accordingly, for example, when the liquid crystal lens element 510 is used as it is disposed separately from the objective lens 505, and when the objective lens 505 moves in a radial direction of the optical disk D for tracking and disaligned to the liquid crystal lens element 510, little deterioration of aberration is generated. As a result, as compared with a conventional liquid crystal lens element correcting only spherical aberration, more stable writing and/or reading is realized.

Figure 12:
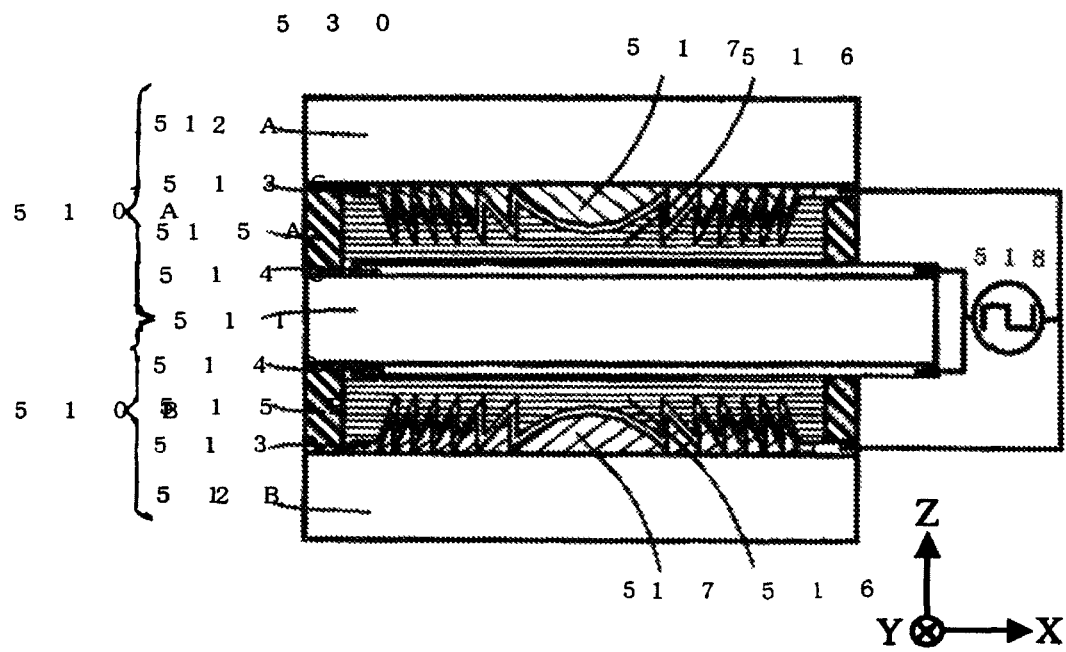
FIG. 12: A side view showing another example of the construction of the liquid crystal lens element of the present invention in which liquid crystal lens elements are laminated so that their alignment directions of liquid crystal molecules are perpendicular to each other.

Here, in this embodiment, explanation is made with respect to an optical head device 540 employing the liquid crystal lens element 510 functioning for double layer optical disks, which uses a laser diode of an wavelength λ in a 400 nm wavelength band as a light source, but even if the liquid crystal lens element 510 is employed in e.g. an optical head device functioning for single layer and double layer DVD optical disks using a laser diode of wavelength in a 650 nm wavelength band as a light source, the same functions and effects can be obtained. Further, at a time of writing/reading optical disks having different cover thicknesses 1.2 mm, 0.6 mm and 0.1 mm of different standards to use the disks for CD, DVD and BD, by a single optical head, the liquid crystal lens element of the present invention is effective. Further, instead of the liquid crystal lens element 510, if the liquid crystal lens element of the present invention in which the second transparent electrode is divided is employed for the liquid crystal lens element having an optical path difference shown in FIG. 5, it is possible to switch transmission wavefront among five types. Further, since the five types of wavefronts are finely adjustable, an aberration generated between optical disks having different cover thicknesses or generated due to variation of cover thickness in an optical disk, can be more finely corrected. Further, instead of the liquid crystal lens element 510, if the liquid crystal lens element 530 shown in FIG. 12 is employed, the liquid crystal lens element 530 has a correction function not only for polarized light in the outgoing path but also for perpendicular polarized light in the returning path, and thus, convergence to the photodetector is improved. Further, not only for single layer and double layer optical disks, but also for further multilayer information recording layers that may be produced in the future, the liquid crystal lens element of 5 modes or 7 modes of the present invention, can correct aberrations generated due to cover thickness by switching voltage applied between two-terminal transparent electrodes.

Second Embodiment

An example of the construction of a liquid crystal lens element according to the second embodiment of the present invention is described below.

Figure 14:
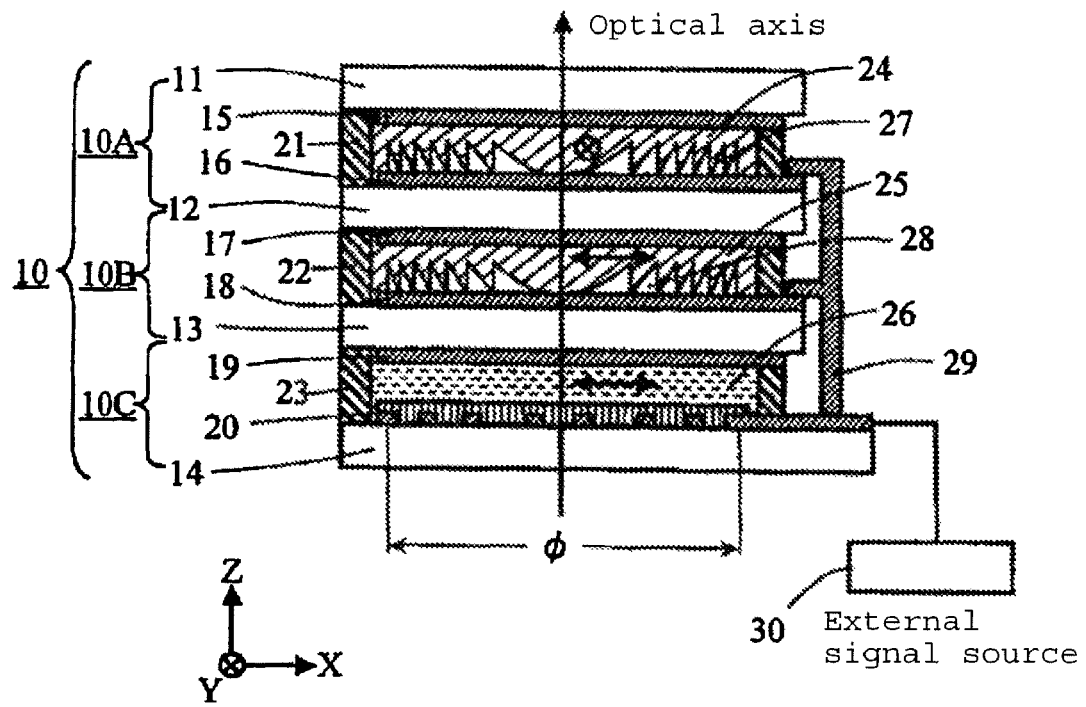
FIG. 14: A cross section view showing a liquid crystal lens element according to the second embodiment of the present invention.

FIG. 14 is a cross sectional view showing the second embodiment of the liquid crystal lens element of the present invention. A liquid crystal lens element 10 according to this embodiment comprises, as its general construction, a first Fresnel lens portion 10A, a second Fresnel lens portion 10B and an electrode lens portion 10C, and they are integrally formed by laminating four transparent substrates 11 to 14 and three liquid crystal layers 24 to 26.

In the following embodiments, a liquid crystal lens element includes at least one Fresnel lens portion and at least one electrode lens portion, and a Fresnel lens portion corresponds to entire construction of the liquid crystal lens element of the first embodiment. Accordingly, the construction of each of the following embodiments can be constituted by adding an electrode lens portion to the construction of the first embodiment.

Figure 15:
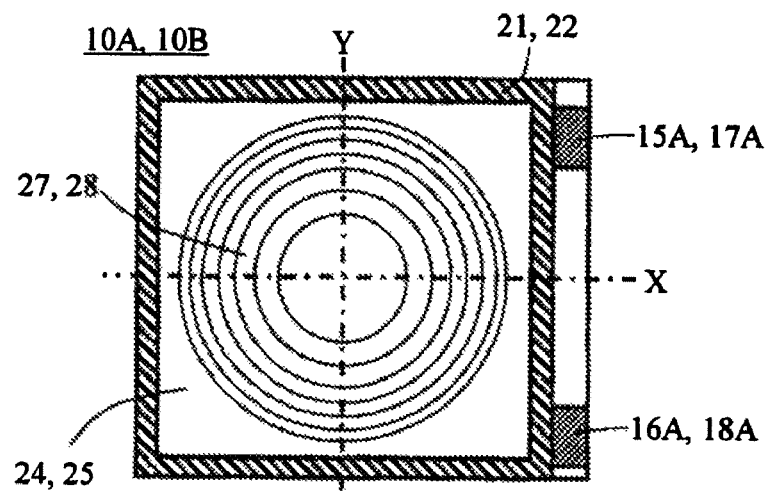
FIG. 15: A top view of a Fresnel lens portion of the liquid crystal lens element according to the second embodiment of the present invention.
Figure 16:
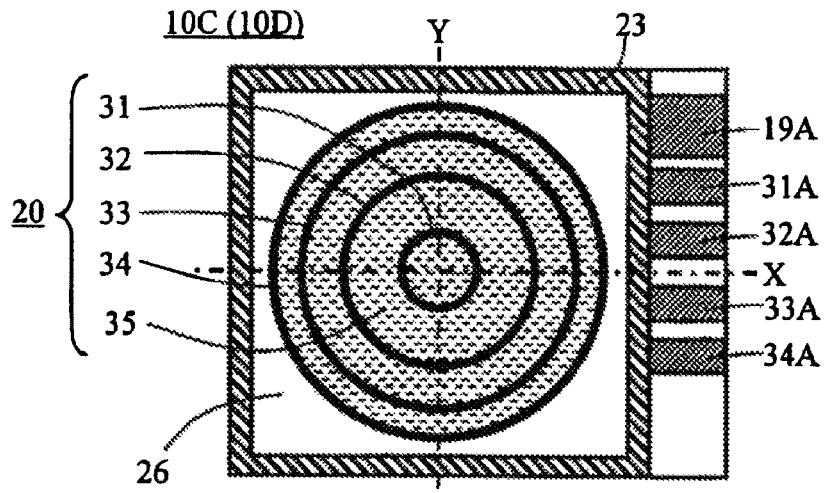
FIG. 16: A top view of an electrode lens portion of the liquid crystal lens element according to the second embodiment of the present invention.

FIG. 15 is a top view showing a Fresnel lens portion 10A (or 10B) of the liquid crystal lens element according to the second embodiment of the present invention. FIG. 16 is a top view showing the electrode lens portion 10C according to the second embodiment of the liquid crystal lens element of the present invention.

The first Fresnel lens portion 10A comprises transparent substrates 11 and 12, a first liquid crystal layer 24 sandwiched between the transparent substrates 11 and 12 and by a seal 21, a first concave-convex portion 27, and transparent electrodes 15 and 16 opposed to each other to apply a voltage to the first liquid crystal layer 24. In the same manner, the second Fresnel lens portion 10B comprises transparent substrates 12 and 13, a second liquid crystal layer 25 sandwiched between the transparent substrates 12 and 13 and by a seal 22, a second concave-convex portion 28 and transparent electrodes 17 and 18 opposed to each other to apply a voltage to the second liquid crystal layer 25.

Meanwhile, the electrode lens portion 10C comprises transparent substrates 13 and 14, a third liquid crystal layer 26 sandwiched between the transparent substrates 13 and 14 and by a seal 23, a transparent electrode 19 and a complex electrode 20 for applying a voltage to the third liquid crystal layer 26.

The transparent electrodes 15, 17 and 16, 18 are connected with an external signal source 30 via electrode lead-out portions 15A, 17A and 16A, 18A respectively and via conductive connection means 29. The transparent electrode 19 is connected with the external signal source 30 via an electrode lead-out portion 19A and a connection wire, not shown. The complex electrode 20 comprises, as shown in FIG. 16, low-resistance electrodes 31 to 34 arranged concentrically around an optical axis, and an uniform high-resistance plane electrode 35. Among these, low-resistance electrodes 31 to 34 are connected with an external signal source 30 via electrode lead-out portions 31A to 34A and connecting wires, not shown.

The concave-convex portions 27 and 28 each has a cross section of saw-tooth shape or a saw-tooth shape approximated by steps, made of an uniform refractive index transparent material, and has a rotational symmetry about an optical axis (Z axis) of incident light in the region of effective diameter p. Detail of the concave-convex portions 27 and 28 are described later.

Then, an example of process for producing this liquid crystal lens element 10 is described below.

First of all, on one surface of the transparent substrate 11 and on both surfaces of each of the transparent substrates 12 and 13, respective transparent electrodes 15 to 19 are formed. Further, on upper surfaces of the transparent electrodes 16 and 18, concave-convex portions 27 and 28 each having a cross section of a saw-tooth shape or a saw-tooth shape approximated by steps, are formed with uniform refractive index transparent material of refractive index $n_s$. The concave-convex portions 27, 28 may be formed by forming an uniform refractive index transparent material layer of a predetermined film thickness on the transparent electrode 16, 18 and fabricating it into concave-convex shape by photolithography or reactive ion etching, or it may be formed by transferring the shape of the concave-convex portion to the uniform refractive index transparent material layer by using a metal mold. On one of the surfaces of the transparent substrate 14, as shown in FIG. 16, low-resistance electrodes 31 to 34 are formed, and thereafter, high-resistance plane electrodes 35 are formed to constitute a complex electrode 20.

Then, surfaces of the transparent electrode 15 and the concave-convex portion 27, are subjected to parallel alignment treatment so that the extraordinary refractive index direction of the first liquid crystal layer 24 is directed to Y direction, and surfaces of the transparent electrodes 17 and 19, the concave-convex portion 28 and the complex electrode 20, are subjected to parallel alignment treatment so that extraordinary refractive index directions of the second and third liquid crystal layers 25 and 26 are directed to X direction. For the alignment treatment, a method of spin coating the substrate surfaces with alignment films containing e.g. polyimide as the main component, and rubbing them with e.g. a cloth, a method of forming SiO oblique vapor deposition films on the substrate surfaces, or a method of spin coating the substrate surfaces with light alignment films and irradiating them with polarized ultraviolet rays, may be used.

Then, an adhesive agent, not shown, containing a gap control agent, is patterned by printing to form seals 21 to 23, and the above-mentioned transparent substrates 11 to 14 are laminated and press-bonded to form empty cells. From injection ports (not shown) provided at a part of seals 21 to 23, a liquid crystal having an ordinary refractive index $n_o$ and an extraordinary refractive index $n_e$ (here, $n_o \neq n_e$) is injected, the injection ports are sealed to seal the liquid crystal in the cells, to constitute the liquid crystal lens element 10 of this embodiment.

Then, operation principle of the liquid crystal lens element of the present invention in the second embodiment, is described below.

The liquid crystal lens element 10 of the present invention is constituted by first Fresnel lens portions 10A and 10B having liquid crystal alignment directions perpendicular to each other, and an electrode lens portion 10C having a liquid crystal alignment direction in parallel with second Fresnel lens portion 10B. The Fresnel lens portions 10A and 10B function as Fresnel lenses each of whose focal point is discretely variable by changing a voltage applied between the transparent electrodes 15 and 16 or between the transparent electrodes 17 and 18 to change substantial refractive index of the liquid crystal layer 24 or 25.

Meanwhile, the electrode lens portion 10C functions as a lens whose focal point is continuously variable by changing substantial refractive index distribution of the liquid crystal layer 26 according to voltage distribution formed in the complex electrode 20.

Hereinafter, the Fresnel lens portions 10A and 10B and the electrode lens portion 10C are described in detail in this order.

(1) Explanation of Fresnel Lens Portions 10A and 10B

In order to produce a transmission wavefront containing a positive or a negative power component by using the liquid crystal lens 10 of the present invention, the liquid crystal lens element is configured so that in a transmission wavefront incident into the liquid crystal lens 10, phase difference φ of a light beam passing a point at a distance r in a radial direction from a light beam at an optical axis center (coordinate origin: x=y=0), is represented by the power series of formula (5). Here, formula (5) is substantially equivalent to formula (2), but defined again as a phase difference.

$$\phi(r)=a_1 r^2+a_2 r^4+a_3 r^6+a_4 r^8+ \quad (5)$$

wherein
$r^2=x^2+y^2$
$a_1, a_2, \ldots$; constant

Figure 17:
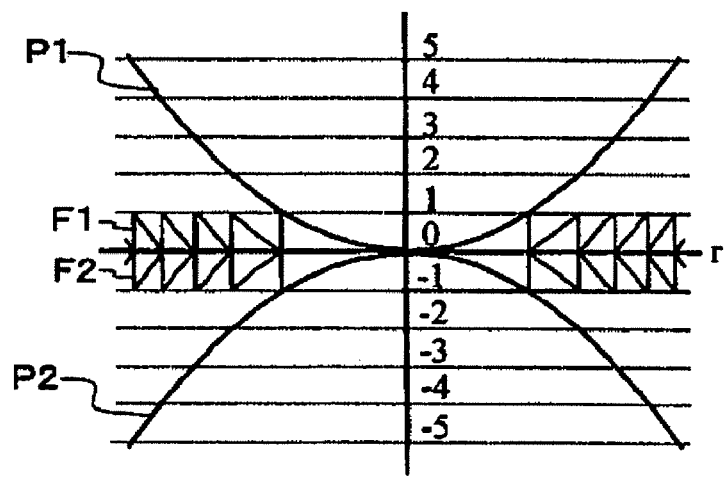
FIG. 17: A graph showing a phase difference of transmission wavefront produced by the liquid crystal lens element of the present invention, wherein P1 and P2 are each a graph showing phase difference in a unit of wavelength λ in relation to radial position r in horizontal axis, and F1 and F2 are each a graph of phase difference of at least zero and at most λ obtained by adding or subtracting an integer times of wavelength λ from P1 and P2 respectively.

Here, specific examples of curve of phase difference $\phi$ in a unit of wavelength $\lambda$ of incident light in relation to a radial position r in lateral axis, are indicated by symbols P1 and P2 in FIG. 17.

In a case of coherent incident light of wavelength $\lambda$ in which the phase is uniform, transmission wavefronts having a phase difference of an integer times of $\lambda$ can be regarded as equivalent to each other. Accordingly, graphs F1, F2 showing a phase difference produced by slicing the graphs indicated by P1, P2 in FIG. 17 at an interval of wavelength $\lambda$ and translating to a plane of phase difference zero, are substantially equivalent to graphs P1, P2. Phase difference distributions represented by the graphs F1, F2 are all within $\lambda$, and each has a cross section of saw-tooth shape.

In order to obtain a phase difference corresponding to graphs F1, F2 by the liquid crystal lens element 10, it is sufficient that the shape of the concave-convex portions 27, 28 provided in the Fresnel lens portions 10A, 10B are fabricated into shapes analogous to the graphs F1, F2. Here, it is sufficient that the concave-convex portions 27, 28 are each made of an uniform refractive index transparent material, which may be an organic material such as a UV-curable resin, a thermosetting resin or a photosensitive resin, or an inorganic material such as $SiO_2$, $Al_2O_3$ or $SiO_xN_y$ (here, x and y show element ratio between O and N). Since these materials have extremely large volume resistivities as compared with materials constituting the transparent electrodes 15 to 18, and not sufficiently smaller than the material of liquid crystal, these materials can be regarded as dielectric materials.

Figure 18:
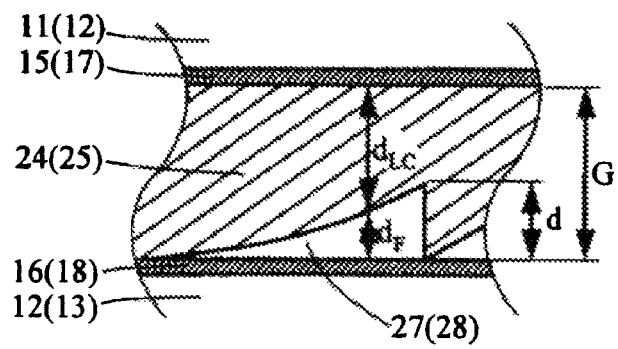
FIG. 18: An enlarged view of the Fresnel lens portion in a cross sectional view of the liquid crystal lens element of the present invention.

FIG. 18 is an enlarged view of a Fresnel lens portion in a cross sectional view of the liquid crystal lens element of the present invention.

Provided that the distance between the transparent electrodes 15 (or 17) and 16 (or 18) formed on surfaces of the transparent substrates 11, 12 (or 12, 13), is designated as G, a film thickness $d_F$ of the concave-convex portion 27 (or 28) is distributed from zero to d, and a layer thickness $d_{LC}$ of the liquid crystal layer 24 (or 25) is distributed from G to G−d. Here, the distance G ($=d_F+d_{LC}$) is a constant value.

Since the concave-convex portion 27 is disposed between the transparent electrodes 15 and 16, effective voltage $V_{LC}$ applied to liquid crystal layer 24 changes according to the specific dielectric constant $\in_F$ of the material constituting the concave-convex portion 27. Specifically, provided that an AC voltage V is applied between the electrodes 15 and 16, $V_{LC}/V$ is represented by formula (6).

$$V_{LC}/V=1/\{1+(\in_{LC}/\in_F)\times(d_F/d_{LC})\} \quad (6)$$

Here, since the film thickness $d_F$ of the concave-convex portion 27 is distributed from zero to d according to the cross sectional shape of saw-tooth shape or a saw-tooth shape approximated by steps forming the Fresnel lens, $d_F/d_{LC}$ is distributed from zero to d/(G−d). As a result, effective voltage $V_{LC}$ applied to the liquid crystal layer 24 is spatially distributed according to the shape of the concave-convex portion 27.

Further, since the liquid crystal has dielectric anisotropy in which the specific dielectric constant $\in_{//}$ in the long axis direction of liquid crystal molecules and the specific dielectric constant $\in_\perp$ in the short axis direction of liquid crystal molecules are different, as applied voltage increases, alignment direction of liquid crystal molecules changes and according to the change of the alignment direction of liquid crystal molecules, specific dielectric constant $\in_{LC}$ of the liquid crystal layer 24 changes. Accordingly, in formula (6), according to the change of the specific dielectric constant $\in_{LC}$ in response to the change of $V_{LC}$, the spatial distribution of effective voltage $V_{LC}$ applied to the liquid crystal layer 24 according to the shape of the concave-convex portion 27, is determined. Here, since $V_{LC}$ changes according to the film thickness $d_F$, hereinafter, an applied voltage is referred to as $V_{LC}[d_F]$. Here, at a position where the film thickness $d_F$ is zero, $V_{LC}[0]$ equals to an applied voltage V between electrodes.

By the way, since the voltage $V_{LC}$ applied to the liquid crystal layer 24 is different according to the shape of the concave-convex portion 27, substantial refractive index $n(V_{LC}[d_F])$ of the liquid crystal layer 24 for extraordinarily polarized light is spatially distributed. For example, in FIG. 18, the optical path between the electrodes 15 and 16 at a point of the concave-convex portion 27 where the film thickness is $d_F$, is $n_s \times d_F+n(V_{LC}[d_F])\times d_{LC}$, and the phase difference $\phi_{dF}$ with respect to the optical path $n(V)\times G$ at the Fresnel lens center position ($d_F=0$) without the concave-convex portion 27, is represented by formula (7).

$$\phi_{dF}=\{n_s \times d_F+n(V_{LC}[d_F])\times(G-d_F)\}-n(V)\times G \quad (7)$$

Here, the film thickness $d_F$ is distributed from zero to d, and the phase difference $\phi_{dF}$ is distributed from zero to $\phi_d$ of formula (8).

$$\phi_d=\{n_s \times d+n(V_{LC}[d])\times(G-d)\}-n(V)\times G=\{n(V_{LC}[d]-n(V)\}\times G-(V_{LC}[d])\times n_s\}\times d \quad (8)$$

For example, at an applied voltage $V_{+1}$, in order to produce the phase difference of a transmission wavefront corresponding to graph F1 of FIG. 17, the film thickness d of the concave-convex portion and the distance G between the transparent electrodes are determined so that the phase difference $\phi_d$ becomes substantially $\lambda$ (namely, from 0.75$\lambda$ to 1.25$\lambda$), and the concave-convex portion 27 has a cross sectional shape whose film thickness is from zero to $d_F$.

Here, by changing applied voltage V, the phase difference of formula (7) changes. For example, (i) when the film thickness $d_F$ of the concave-convex portion 27 is distributed from zero to d, an applied voltage $V_0$ is present at which the phase difference of formula (7) becomes sufficiently smaller value than the wavelength $\lambda$ of incident light. At this time, transmission wavefront through the liquid crystal lens element 10 does not change. Here, the sufficiently small phase difference is specifically at most $\lambda/5$, more preferably at most $\lambda/10$. Further, (ii) at an applied voltage $V_{-1}$ at which the phase difference $\phi_d$ becomes substantially $-\lambda$ (namely, from $-0.75\lambda$ to $-1.25\lambda$), a transmission wavefront having the phase difference shown in graph F2 of FIG. 17 can be produced. This corresponds to a transmission wavefront having a phase difference symmetric from graph F1 of FIG. 17 is respect to a plane of phase difference zero.

Accordingly, by switching applied voltage among $V_{+1}$, $V_0$ and $V_{-1}$, transmission wavefront can be selected from three types of transmission wavefronts.

Here, when a plane wave is incident into the liquid crystal lens 10 at applied voltages $V_{+1}$, $V_0$ and $V_{-1}$, the plane wave is transformed into a transmission wavefront shown in FIG. 19(A), FIG. 19(B) and FIG. 19(C) respectively, to be output.

Namely, a lens function exhibiting positive power, no power and negative power in response to an applied voltage between the transparent electrodes 15 and 16 or between the transparent electrodes 17 and 18, can be obtained. By selections of e.g. refractive indexes and specific dielectric constants of the liquid crystal and the concave-convex portion 27, the film thickness d of the concave-convex portion 27 and the distance G between transparent electrodes, design of obtainable electro-optical characteristics of phase difference becomes highly flexible, and thus, low voltage drive can be achieved or various types of transmission wavefronts can be produced.

The foregoing descriptions are about a case where incident light into the Fresnel lens portion is extraordinarily polarized light, but in a case of ordinarily polarized light, effective refractive index of the liquid crystal for the polarized incident light always equals to the ordinary refractive index of the liquid crystal regardless of applied voltage. Accordingly, in the liquid crystal lens element 10, a phase difference $\phi_d$ at a point where the film thickness is $d_F$ with respect to the position of minimum thickness ($d_F$=0) of the concave-convex portion 27, is represented by formula (9) for ordinarily polarized light, which is proportional to the difference between the refractive index $n_s$ of the concave-convex portion 27 and the ordinary refractive index $n_o$ of the liquid crystal.

$$\phi_d = (n_s - n_o) \times d \quad (9)$$

Here, the refractive index $n_s$ of the concave-convex portion 27, and the ordinary refractive index $n_o$ of the liquid crystal are preferably equal. By such a construction, regardless of the magnitude of applied voltage, $\phi_d$ becomes zero for ordinarily polarized light, and thus, transmission wavefront does not change.

Further, instead of the liquid crystal lens element producing F1 and F2 being phase differences produced by slicing the phase differences indicated by P1 and P2 of FIG. 17 at an interval of wavelength λ, the liquid crystal lens element may have a construction which produces a phase difference $\phi_d$ corresponding to substantially mλ (m=2 or 3). In this case, the liquid crystal lens element produces a transmission wavefront corresponding to a phase difference produced by slicing P1 or P2 of FIG. 17 at an interval of wavelength m·λ (here, m=2 or 3).

Further, in this embodiment, element structure and operation principle are described with respect to the case of liquid crystal lens element 10 producing a phase difference of rotational symmetry represented by formula (5), but a liquid crystal lens element producing a phase difference corresponding to correction of rotational asymmetric coma aberration or astigmatism other than the phase difference of formula (5), can also be produced by fabrication of an uniform refractive index transparent material into a concave-convex shape and filling of liquid crystal in the concave portions in the same principle.

Further, in a case where the absolute value of phase difference to be corrected is at most the wavelength λ of incident light, it is not necessary to make the cross sectional shapes of the concave-convex portions 27 and 28 of the liquid crystal lens element 10 made of an uniform refractive index transparent material, to be each a saw-tooth shape, and the cross sectional shape may be shape equal to a wavefront to deal with. In this case, the phase difference continuously changes according to the magnitude of applied voltage.

Further, in this embodiment, an uniform refractive index transparent material of refractive index $n_s$ is used as the material for forming the concave-convex portion, but a birefringent material such as polymer liquid crystal in which alignment direction of molecules is uniformly in one direction in a substrate plane, may also be employed. In this case, it is preferred that the extraordinary refractive index of the birefringent material is made to be $n_s$, and its ordinary refractive index is made equal to the ordinary refractive index $n_o$ of the liquid crystal, and molecule alignment direction (the direction of extraordinary refractive index) of the birefringent material is made to be equal to the alignment direction of liquid crystal molecules. By such a construction, since the ordinary refractive indexes of the liquid crystal and the birefringent material are equal regardless of the magnitude of applied voltage for ordinarily polarized incident light, wavefront of transmission light does not change.

Further, in this embodiment, a construction is shown in which an AC voltage is applied to the liquid crystal layers 24, 25 via the transparent electrodes 15, 16 and transparent electrodes 17, 18 respectively. In the present invention, besides this construction, for example, at least one of the transparent electrodes 15, 17 and at least one of the transparent electrodes 16, 18 are spatially divided to form segment electrodes to which different AC voltages can be applied independently. By this construction, further various phase difference distribution can be produced.

(2) Explanation of Electrode Lens Portion 10C

Then, the electrode lens portion 10C provided in the liquid crystal lens element 10 of the present invention is described below.

The electrode lens portion 10C is intended to add a continuously changeable power component to light having a polarization component equal to extraordinary refractive index direction of the liquid crystal layer 26. For this purpose, a complex electrode 20 provided on one side of the electrode lens portion 10C, is, as shown in FIG. 16, provided with a high-resistance plane electrode 35 and low-resistance electrodes 31 to 34 for producing a voltage distribution corresponding to desired power component in the high-resistance plane electrode 35.

FIG. 20 is a schematic view showing a phase difference distribution produced by the electrode lens portion 10C. When different voltages are applied to the low-resistance electrodes 31 to 34, in the high-resistance plane electrode 35, a continuously changing voltage distribution is formed according to voltage difference among the low-resistance electrodes 31 to 34. Since an alignment of liquid crystal molecules changes according to voltage distribution, an effective refractive index distribution is formed in the liquid crystal layer 26, and thus, phase difference distribution is generated.

The points A, B, C and D shown in FIG. 20 correspond to the positions of the low-resistance electrodes 31, 32, 33 and 34 respectively, and a phase difference β substantially equals to a desired power α, is generated. Here, "substantially equal" means that it is sufficient that standard deviation RSM of the difference between the desired power α and the phase difference β, is at most one twentieth of wavelength λ of incident light, and it is preferred to configure the shapes of the low-resistance electrodes 31 to 34 or the applied voltage so as to satisfy this condition, to obtain sufficient imaging performance.

It is sufficient that the high-resistance plane electrode 35 is made of a transparent material having sufficiently high sheet resistance as compared with the low-resistance electrodes 31 to 34, and it may be made of a composition containing an oxide of a material such as zinc, lead, tin or indium. The low-resistance electrodes 31 to 34 may also be made of a transparent composition containing an oxide of a material such as zinc, lead, tin or indium, and if there is optically no problem, they may be made of a metal film of e.g. aluminum, gold, silver or chromium.

Further, in the construction example of FIG. 16, the low-resistance electrodes 31 to 34 are connected with the electrode lead-out portions 31A to 34A (not shown) to be connected with the external signal source 30, but in the liquid crystal lens element 10, the low-resistance electrodes 31 to 34 may be connected with each other via proper thin film resistors to divide a voltage applied by the external signal source 30 to distribute the divided voltages to the low-resistance electrodes 31 to 34. By this construction, it is possible to reduce the number of signals of the external signal source 30, such being preferred.

Further, in this embodiment, operation principle has been described with respect to the case of the electrode lens portion 10C for producing a power component by using a complex electrode 20 shown in FIG. 16, but besides power component, by changing the structure of the complex electrode 20, a rotational-symmetric spherical aberration can also be produced by the same principle. Further, it is also possible to obtain a phase difference distribution containing power and spherical aberration components.

As described above, by employing the liquid crystal lens element of the present invention, it is possible to switch generation of power discretely without depending on polarization, and further, for polarized light polarized in a direction equal to liquid crystal alignment direction of the electrode lens portion, continuously changing power can be obtained.

Further, in this embodiment, an example has been shown which employs a liquid crystal having a positive dielectric anisotropy in which the liquid crystal molecules are aligned in parallel with substrate surfaces at a time of no voltage application and the liquid crystal molecules are aligned in a perpendicular direction to the substrate surfaces according to the magnitude of applied voltage, but other liquid crystal alignments or other liquid crystal materials may also be employed. For example, a liquid crystal may also be employed, which has a negative dielectric anisotropy in which liquid crystal molecules are aligned perpendicularly to the substrate surfaces at a time of no voltage application and the liquid crystal molecules are aligned in a direction in parallel with substrate surfaces according to an applied voltage V.

Further, the first and second Fresnel lens portions and the electrode lens portion constituting the liquid crystal lens element of the present invention, are not necessarily be integrally formed so long as they are disposed proper positions with respect to the optical axis. However, in such a construction, there occurs a problem that a space occupied by the liquid crystal lens element increases or position adjustment becomes complicated, and accordingly, as shown in FIG. 14, all of the components are particularly preferably laminated to be integrated together. In this case, in order to sandwich three liquid crystal layers, it is preferred to employ at least four substrates, but in order to reduce the thickness of the liquid crystal lens element, it is preferred to use four transparent substrates for the lamination.

Further, on a surface of the liquid crystal element of the present invention, optical components such as a phase plate, a diffraction grating, a birefringent hologram element or a wavelength-dependent diffraction element may be appropriately laminated to be integrated, whereby the number of optical components constituting an optical head device decreases, which simplifies assembly of the optical head device, such being preferred. Further, these optical components may be formed into a transparent substrate or bonded to the substrate.

Third Embodiment

Then, a liquid crystal lens element according to the third embodiment of the present invention is described with reference to FIG. 21.

Figure 21A:
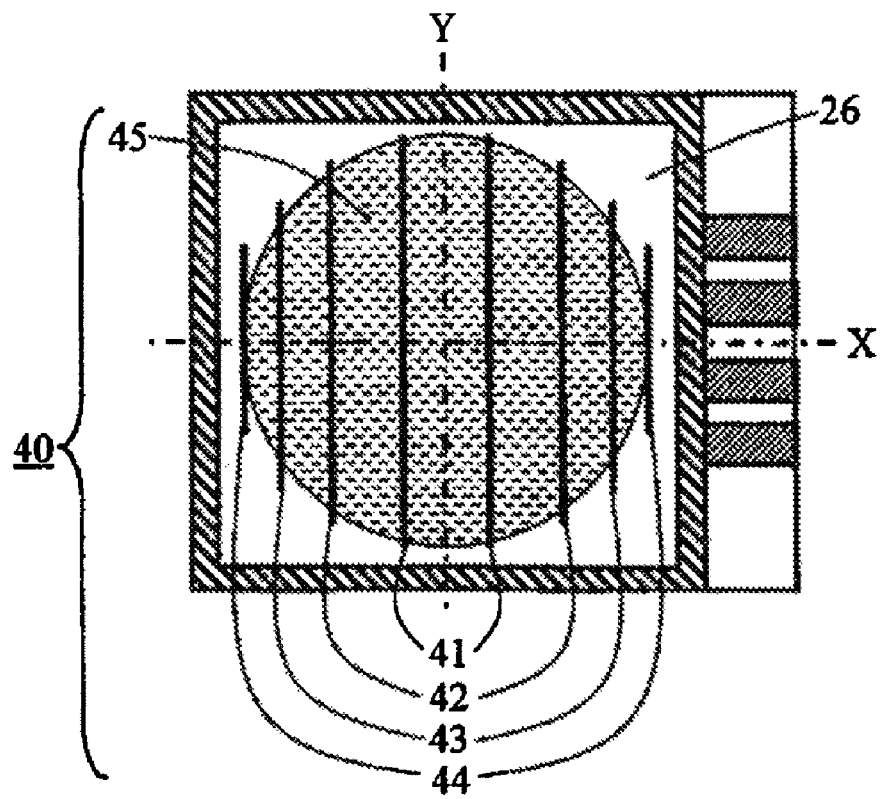
FIGS. 21(A) and 21(B): Top views each showing a is complex electrode constituting an electrode lens portion of a liquid crystal lens element according to a third embodiment of the present invention.
Figure 21B:
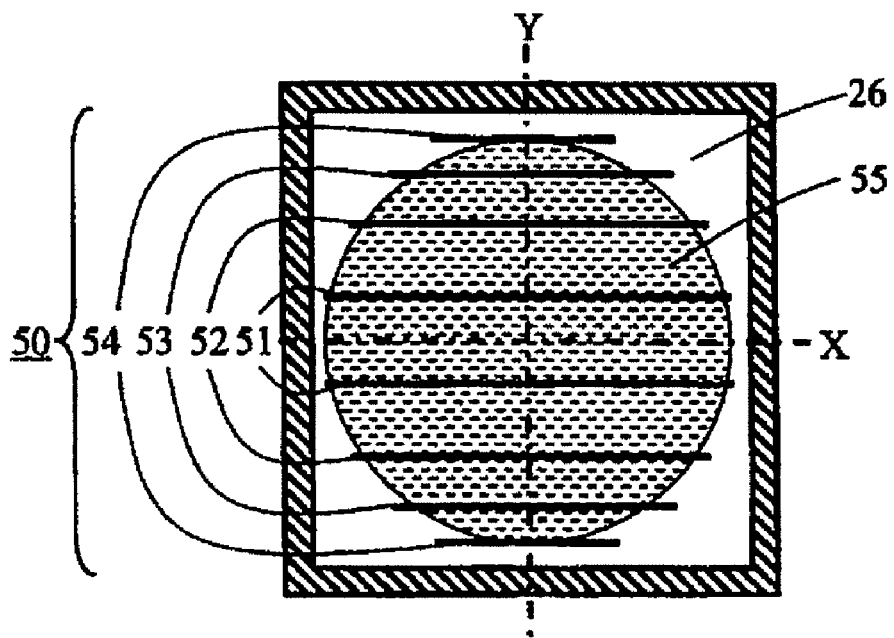

FIG. 21 is a top view of a complex electrode provided in the third embodiment of the liquid crystal lens element of the present invention. The liquid crystal lens element of this embodiment has a construction, in the liquid crystal lens element 10 according to the second embodiment shown in FIG. 14, a transparent electrode 19 and a complex electrode 20 provided in the electrode lens portion 10C are replaced by complex electrodes 40 and 50 shown in FIG. 21. Accordingly, in this embodiment, since portions other than the electrode lens portion 10C are the same as those of the second embodiment, explanation to these portions are omitted and only the electrode lens portion 10C is described.

Complex electrodes 40 and 50 provided in the electrode lens portion 10C of this embodiment, are a pair of complex electrodes for applying a voltage to the liquid crystal layer 26, and by applying appropriate voltage to low-resistance electrodes 41 to 44 and 51 to 54 arranged in stripe shapes, electric field distributions are generated in high-resistance plane electrodes 45 and 55.

Here, a phase distribution produced by the electrode lens portion of this embodiment is described with reference to FIG. 20. When different voltages are applied to the low-resistance electrodes 41 to 44, a continuously changing electric potential distribution is formed in the high-resistance plane electrode 45 according to voltage differences among the low-resistance electrodes 41 to 44. When the positions of the low-resistance electrodes 41 to 44 arranged in a stripe shape correspond to A, B, C and D shown in FIG. 20 respectively, it is possible to obtain a voltage distribution producing a phase difference β substantially equal to a desired power α in X direction. Meanwhile, with respect to Y direction, a voltage distribution produced in the complex electrode 40 does not change in Y direction. Further, when the positions of the low-resistance electrodes 51 to 54 arranged in a stripe shape in Y direction correspond to A, B, C and D of FIG. 20, it is possible to obtain a voltage distribution producing a phase difference β substantially equal to a desired power α in Y direction.

Accordingly, an effective voltage applied to the liquid crystal layer 26 disposed between the two complex electrodes 40 and 50 producing a voltage distribution changing in X direction and Y direction, has a distribution equivalent to that produced by the transparent electrode 19 and the complex electrode 20 (refer to FIG. 14) in the second embodiment. Accordingly, an effective refractive index distribution is produced in the liquid crystal layer 26, and it is possible to obtain a phase reference β substantially equal to a desired power α.

Here, the material and production method of the low-resistance electrodes 41 to 44 and 51 to 54 and the high-resistance plane electrodes 45 and 55, may be the same as those of the complex electrode 20 of the second embodiment. Further, the low-resistance electrodes 41 to 44 or the low-resistance electrodes 51 to 54 may be connected to each other by a thin film resistor at a time of connecting these low-resistance electrodes to the external signal source 30, to reduce the number of signal lines, which enables to drive by smaller number of signal lines, such being preferred.

Fourth Embodiment

Then, an optical head device employing the liquid crystal lens element of the present invention is described below.

Figure 22:
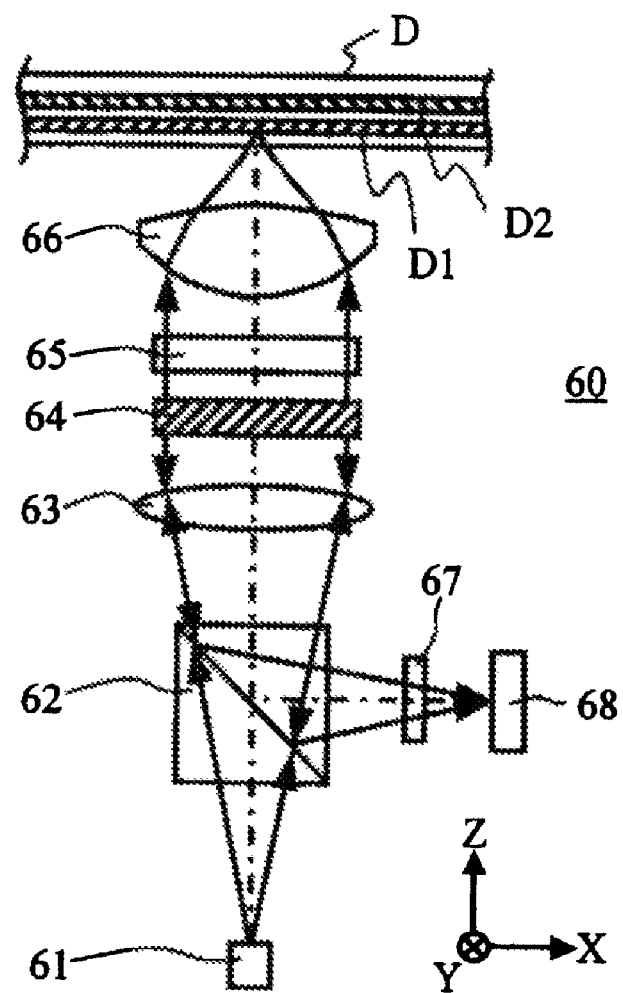
FIG. 22: A construction view showing an example of the optical head device of the present invention.

FIG. 22 is a schematic view showing an example of an optical head device 60 employing the liquid crystal lens element of the present invention, which is an optical head device for writing and/or reading an information to/from a double layer optical disk D, and comprises a laser diode 61, a polarizing beam splitter 62, a collimeter lens 63, a liquid crystal lens element 64 according to the present invention, a quarter wavelength plate 65, an objective lens 66, a cylindrical lens 67 and a photodetector 68. Here, for the double layer optical disk D, e.g. a DVD or a high-density optical disk having a first recording layer D1 and a second recording layer D2, is used.

The wavelength of the laser diode 61 may be any one of 780 nm band, 660 nm band and 405 nm band according to the type of the optical disk D, and a plurality of laser diodes having different wavelengths may be disposed at respective positions. The liquid crystal lens element 64 may have an embodiment such as the above-mentioned second embodiment or the third embodiment. Accordingly, explanation of the structure, the production method and the operation principle of the liquid crystal lens element 64 are omitted.

Further, in the optical head device of the present invention, besides the optical components shown in FIG. 22, optical components such as a diffraction grating, a hologram element, a polarization-dependent selection element, a wavelength-selection element or a wavefront-conversion means, or mechanical components may be appropriately employed in combination.

Then, functions of the present invention are described.

Linearly polarized light polarized in X direction emitted from a laser diode 61 as a light source, is transmitted through a polarizing beam splitter 62, transmitted through a collimeter lens 63, a liquid crystal lens element 64, and a quarter wavelength plate 65, converted into circularly polarized light, and converged on a first recording layer D1 or a second recording layer D2 provided in an optical disk D by an objective lens 66. Thereafter, light reflected by the optical disk D is transmitted again through the objective lens 66 and the quarter wavelength plate 65, and thereafter, transformed into linearly polarized light having a polarization direction in Y direction, transmitted through the liquid crystal lens element 64 and the collimeter lens 63, reflected by the polarizing beam splitter 62, transformed to have an astigmatism by a cylindrical lens 67, and incident into a photodetector 68.

Then, operations of writing and/or reading an information to/from recording layers D1 and D2 having different cover thicknesses using an optical head device 60 employing as the liquid crystal lens element 64 the liquid crystal lens element 10 according to the second embodiment of the present invention, are described below. Here, in the below, the objective lens 66 is assumed to be designed to minimize an aberration for an intermediate cover thickness between the first recording layer D1 and the second recording layer D2.

For example, at a time of converging light on a recording layer having a cover thickness different from designed cover thickness, a spherical aberration proportional to a cover thickness difference produced by subtracting the design thickness from the recording layer thickness of the cover thickness, is generated, which makes it difficult to write/read an information. The spherical aberration can be corrected by making light incident into the objective lens 66 a divergent light or a convergent light produced by adding a power component to a plane wave. Namely, for the first recording layer D1 having a negative cover thickness difference, the light is made to be a convergent light by adding a positive power component, while for the second recording layer D2 having a positive cover thickness difference, the light is transformed into divergent light by adding a negative power. The light is subsequently converged by the objective lens 66, and thus, spherical aberration is corrected and it becomes possible to properly read/write an information.

(i) A case of writing and/or reading to/from first recording layer D1 (cover thickness difference is negative):

At a time of writing and/or reading to/from the first recording layer D1, as described above, in order to make a transmission wavefront through the liquid crystal lens element 10 slightly convergent spherical wave, an AC voltage $V_{+1}$ is applied between the transparent electrodes 15 and 16 and between the transparent electrode 17 and 18. Accordingly, alignment directions of liquid crystal molecules in the liquid crystal layers 24 and 25 change, and as shown in FIG. 19(A), a transmission wavefront having a positive power, namely, corresponding to convex lens is produced. Accordingly, it is possible to correct a spherical aberration of light converged on the first recording layer D1.

(ii) A case of writing and/or reading to/from second recording layer D2 (cover thickness difference is positive):

At a time of writing and/or reading to/from the second recording layer D2, in order to make a transmission wavefront through the liquid crystal lens element 10 a slightly divergent spherical wave, an AC voltage $V_{-1}$ is applied between the transparent electrodes 15 and 16 and between the transparent electrodes 17 and 18. Accordingly, alignment directions of the liquid crystal layers 24 and 25 change, and as shown in FIG. 19(C), a transmission wavefront having a negative power, namely, corresponding to concave lens, is produced. Accordingly, it is possible to correct a spherical aberration of light converged on the second recording layer D2.

Thus, by changing a voltage applied to the liquid crystal layer, it is possible to correct spherical aberration for two recording layers having different cover thicknesses.

The liquid crystal lens element of the present invention can correct a spherical aberration regardless of polarization of light incident into the liquid crystal lens element so long as its first and second Fresnel lens portions perform the same operation for two perpendicular linearly polarized light beams. However, when there is a production-induced deviation of the liquid crystal lens element, for example, when the thicknesses of the liquid crystal layers 24 and 25 are different, double refraction occurs and appropriate power can not be obtained for some type of polarized incident light. Accordingly, polarization of light incident into the liquid crystal lens element is preferably linearly polarized light polarized in a direction equal to the alignment direction of liquid crystal molecules in any of the liquid crystal layers provided in the Fresnel lens portion.

As described above, in the optical head device 60 shown in FIG. 22 as an example, outgoing light being light incident into an optical disk D, and returning light being light reflected by the optical disk D, have perpendicular polarizations. Accordingly, when polarization direction of outgoing light and alignment direction of liquid crystal molecules in the second Fresnel lens portion are equal, and when polarization direction of returning light and alignment direction of liquid crystal molecules in the first Fresnel lens portion are equal, it is possible to correct a spherical aberrations of the outgoing path and the returning path. Further, when the refractive index of the concave-convex portions 27 and 28 equals to the ordinary refractive index of the liquid crystal, a wavefront does not change for light component polarized in the ordinary refractive index direction, such being preferred.

Then, a case where a variation occurs to cover thicknesses of the first and second recording layers D1 and D2 due to e.g. production-induced variation of an optical disk D, is described.

By employing Fresnel lens portions 10A and 10B, accurate correction is possible for the difference of standard cover thicknesses between the first and second recording layers D1 and D2. However, since the Fresnel lens portions 10A and 10B can produce only predetermined discrete power components, it is difficult to cope with specific variation of cover thickness such that the cover thickness for a recording layer is different from its standard thickness. Meanwhile, it is difficult for the electrode lens portion to produce equivalent or larger power than that produced by the Fresnel lens portion.

To cope with this problem, in the liquid crystal lens element 10 of the present invention, it is convenient that a spherical aberration generated by switching the first recording layer and the second recording layer is corrected mainly by a discrete power produced by the Fresnel lens portion, and a spherical aberration generated due to the variation of cover thicknesses of recording layers is mainly corrected by a continuous power produced by the electrode lens portion.

Fifth Embodiment

Figure 23:
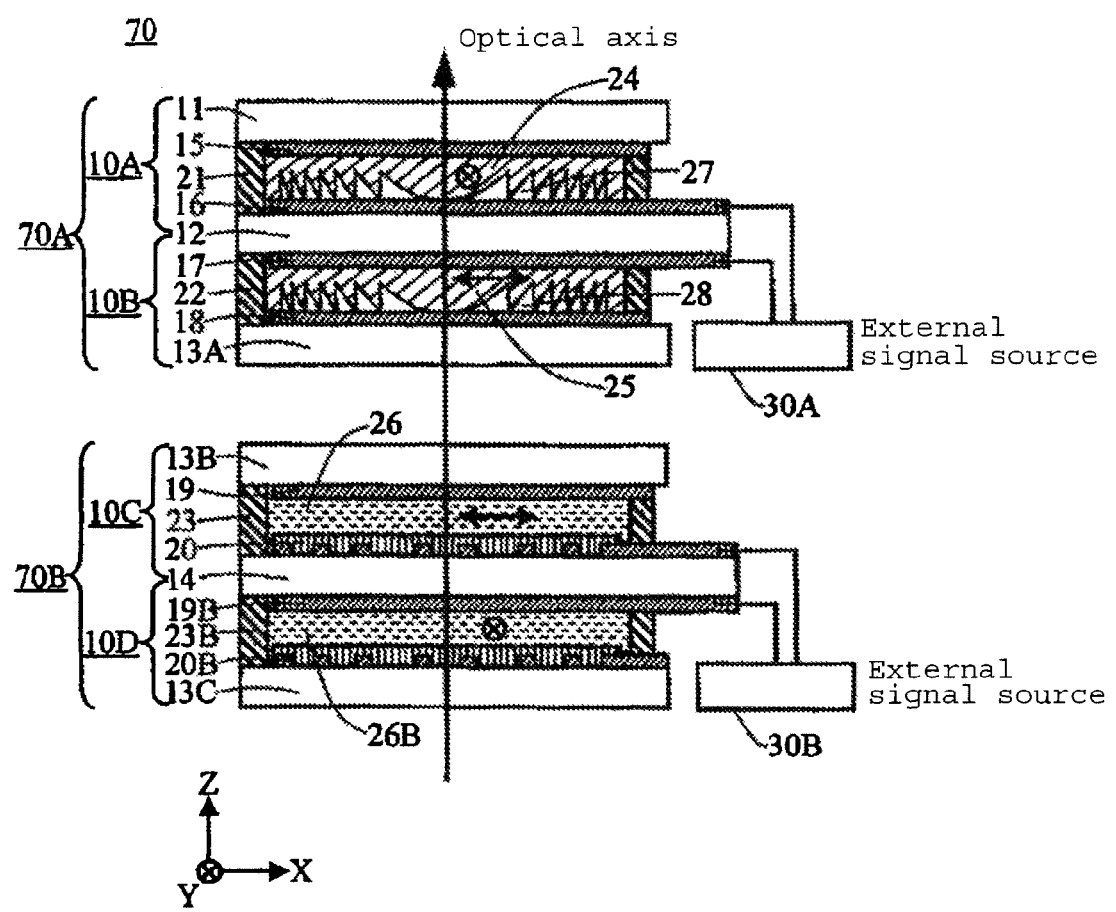
FIG. 23: A cross section view showing a fifth embodiment of the liquid crystal lens element of the present invention.

An example of the construction of a liquid crystal lens element 70 according to the fifth embodiment of the present invention, is described below. FIG. 23 is a cross sectional views showing the fifth embodiment of the liquid crystal lens element of the present invention. Here, in FIG. 23, constituents in common with those of FIG. 14 are designated as the same reference numerals to avoid duplication of explanation.

The liquid crystal lens element 70 according to the fifth embodiment is different from the liquid crystal lens element 10 according to the second embodiment of the present invention shown in FIG. 14, in that the electrode lens portion comprises an electrode lens portion 10D (second electrode lens portion) in addition to the electrode lens portion 10C (first electrode lens portion) of the second embodiment.

Further, the liquid crystal lens element 70 according to this embodiment comprises a Fresnel lens portion 70A in which the first Fresnel lens portion 10A and the second Fresnel lens portion 10B are integrated, and an electrode lens portion 70B in which the first electrode lens portion 10C and the second electrode lens portion 10D are integrated. Further, the Fresnel lens portion 70A and the electrode lens portion 70B are separated and they are independently connected to external signal sources 30A and 30B respectively, and the liquid crystal lens element 70 is different from the liquid crystal lens element 10 according to the second embodiment in this respect.

General construction of other portions are the same as those of the liquid crystal lens element 10 according to the second embodiment, and the transparent substrates 13A, 13B and 13C are the same as the transparent substrate 13.

Here, the second electrode lens portion 10D comprises, in the same manner as the first electrode lens portion 10C, transparent substrates 13C and 14, a fourth liquid crystal layer 26B sandwiched between these transparent substrates and a seal 23B, a transparent electrode 19B and a complex electrode 20B for applying a voltage to the fourth liquid crystal layer 26B. The electrode lens portion 10D functions as a continuous-focal-length-variable lens by changing substantial refractive index distribution of the liquid crystal layer 26B for linearly polarized incident light polarized in Y direction according to voltage distribution formed in the complex electrode 20B.

Transparent electrodes 15, 17 and 16, 18 are connected with an external signal source 30A via electrode lead-out portions 15A, 17A and 16A, 18A respectively. Meanwhile, transparent electrodes 19 and 19B are connected with an external signal source 30B via an electrode lead-out portion 19A. The complex electrode 20B has the same construction as the complex electrode 20, and comprises, as shown in FIG. 16, low-resistance electrodes 31 to 34 arranged concentrically around an optical axis, and a uniform high-resistance plane electrode 35. Among these, the low-resistance electrodes 31 to 34 are connected with an external signal source 30B via electrode lead-out portions 31A to 34A.

Here, the fourth liquid crystal layer 26B in the second electrode lens portion 10D and the third liquid crystal layer 26 in the first electrode lens portion 10C, have different liquid crystal alignment directions. Namely, in the fourth liquid crystal layer 26B, surfaces of the transparent electrode 19B and the complex electrode 20B are subjected to alignment treatment so that extraordinary refractive index direction is directed to Y direction.

Accordingly, the electrode lens portion 70B becomes a lens whose focal point is continuously variable according to applied voltage from the external signal source 30B regardless of polarization state of incident light. As a result, by constituting the liquid crystal lens element 70 according to this embodiment, regardless of polarization state of incident light, it is possible to obtain a lens function whose focal point is discretely variable and a lens function whose focal point is continuously variable.

In the optical head device 60 shown in FIG. 22, if the liquid crystal lens element 70 is employed instead of the liquid crystal lens element 64, the functions and effects explained in the fourth embodiment can be obtained. Particularly, since the electrode lens portion 70B functions as a lens whose focal point is continuously variable not only for polarized incident light in the outgoing path polarized in X direction but also for polarized incident light in the returning path polarized in Y direction, it is possible to effectively correct also spherical aberration in the returning path. As a result, accuracy of focus servo is improved and more stable writing/reading of double layer optical disks becomes possible.

Sixth Embodiment

Figure 24:
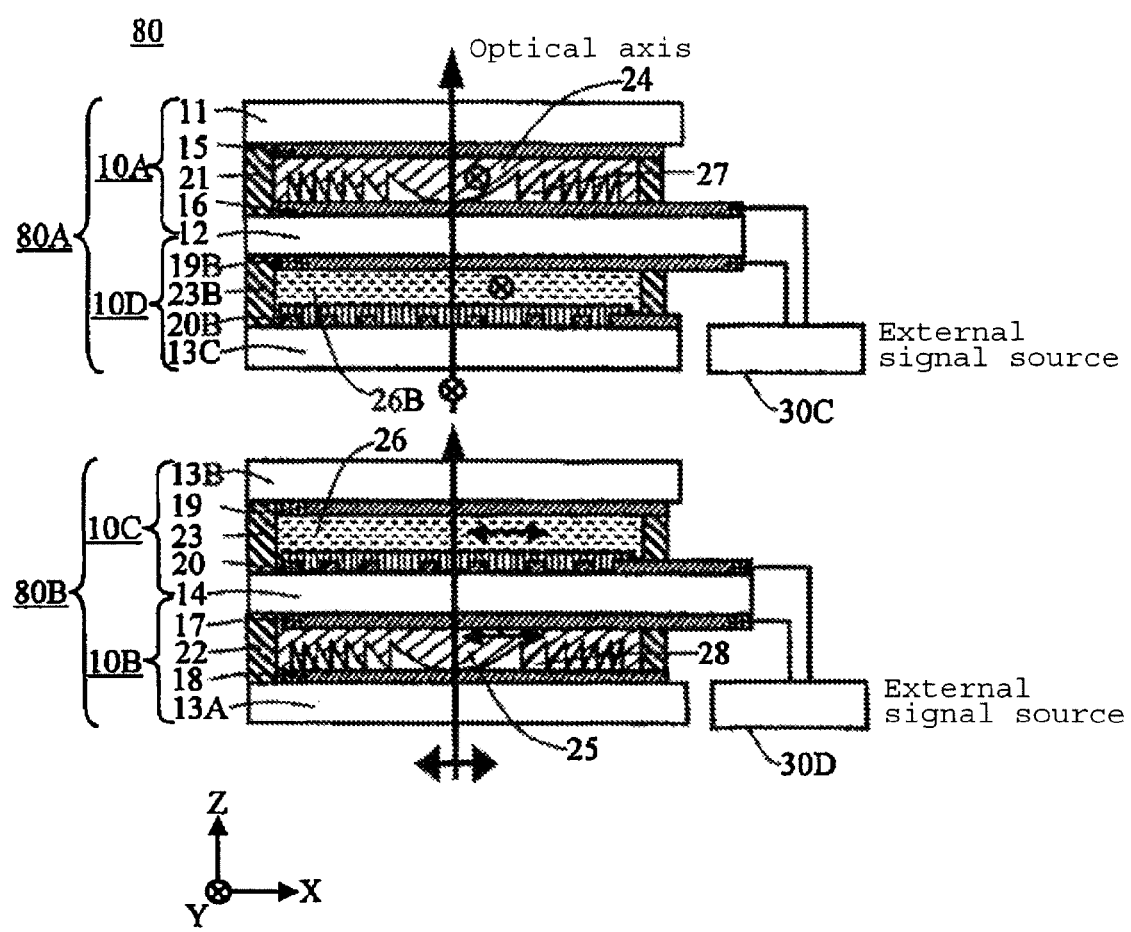
FIG. 24: A cross sectional view showing a sixth embodiment of the liquid crystal lens element of the present invention.

An example of the construction of a liquid crystal lens element 80 according to the sixth embodiment of the present invention, is described below. FIG. 24 is a cross sectional view showing the sixth embodiment of the liquid crystal lens element of the present invention. In FIG. 24, constituents in common with those of FIG. 23 are designated as the same reference numerals.

The liquid crystal lens element 80 according to this embodiment comprises, differently from the liquid crystal lens element 70 according to the fifth embodiment of the present invention shown in FIG. 23, a liquid crystal lens portion 80A for returning path, in which the first Fresnel lens portion 10A and the second electrode lens portion 10D are integrally formed to exhibit lens function for polarized incident light polarized in Y direction, and a liquid crystal lens portion 80B for outgoing path, in which the second Fresnel lens portion 10B and the first electrode lens portion 10C are integrally formed to exhibit a lens function for polarized incident light polarized in X direction. The liquid crystal lens portion 80A for returning path and the liquid crystal lens portion 80B for outgoing path, are separated and they are connected with external signal power sources 30C and 30D independently. General constructions of other portions are same as those of the liquid crystal lens element 70 according to the fifth embodiment.

Accordingly, for polarized incident light polarized in X direction, the liquid crystal lens portion 80B for outgoing path for X direction functions, and becomes a lens whose focal point is discretely and continuously variable according to applied voltage by the external signal source 30D. Further, for polarized incident light polarized in Y direction, the liquid crystal lens portion 80A for returning path functions, and becomes a lens whose focal point is discretely and continuously variable according to applied voltage by the external signal source 30D.

Here, in the optical head device 60 shown in FIG. 22, if the liquid crystal lens element 80 is employed instead of the liquid crystal lens element 64, functions and effects described in the fifth embodiment can be obtained.

Figure 25:
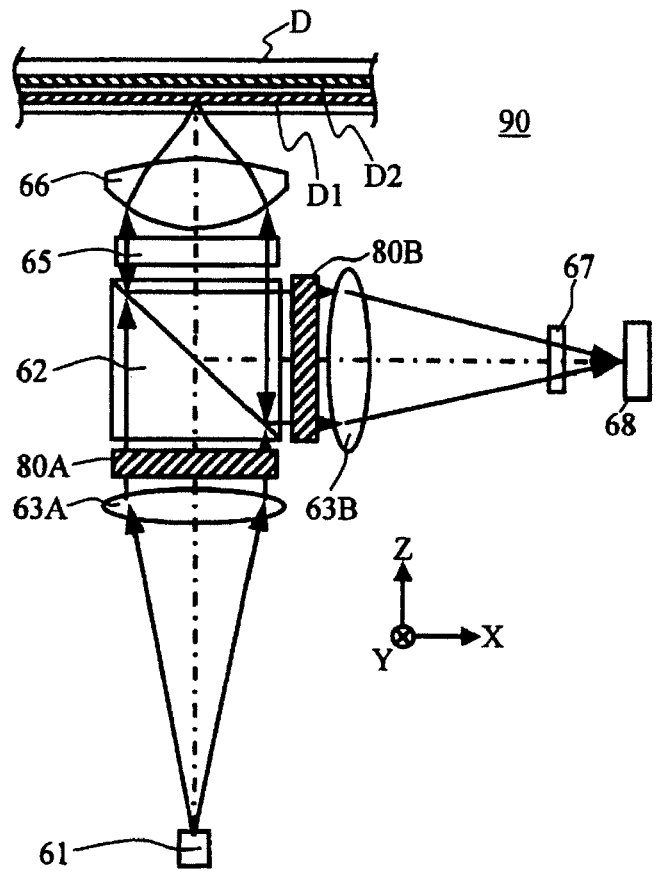
FIG. 25: A schematic view showing another example of the optical head device of the present invention.

Further, FIG. 25 shows and optical head device 90 having a construction that in the optical path of the optical head device, a liquid crystal lens portion 80B for outgoing path is disposed in the optical path in the outgoing path and the liquid crystal lens portion 80A for returning path is disposed in an optical path in the returning path. In FIG. 25, constituents in common with those of FIG. 22 are designated as the same reference numerals to avoid duplication of explanation.

The optical head device 90 of FIG. 25 is different from the optical head device 60 in that collimeter lenses 63A and 63B are employed for outgoing path and returning path respectively, and a polarizing beam splitter 62 is disposed in an optical path between the collimeter lenses 63A, 63B and a quarter wavelength plate 65. Further, in the optical head device 90, a liquid crystal lens portion 80A having a lens function for linearly polarized light (polarized in a direction in the document face) in the outgoing path, and a liquid crystal lens portion 80B having a lens function for linearly polarized light (polarized in a direction perpendicular to document face) in the returning path, are disposed between the collimeter lens 63A and the polarizing beam splitter 62 and between the collimeter lens 63B and the polarizing beam splitter 62 respectively. As a result, as compared with the optical head device 60, there is a characteristic that outgoing path and returning path do not go through a liquid crystal layer having no lens function, and thus, it is easy to obtain high transmittance.

Seventh Embodiment

Then, an example of the construction of the liquid crystal lens element according to the seventh embodiment of the present invention, is described below.

The liquid crystal lens element of this embodiment is different from other embodiments in the construction of the Fresnel lens portion.

Namely, in the first Fresnel lens portion 10A and the second Fresnel lens portion 10B of the liquid crystal lens element shown in FIGS. 14, 23 and 24, a nematic liquid crystal having a negative dielectric anisotropy is employed for the first liquid crystal layer 24 and the second liquid crystal layer 25. Then, alignment direction of liquid crystal molecules is perpendicular or at an angle close to perpendicular to the substrate surfaces when the element is off-state in which no voltage is applied to the liquid crystal layer, and the first concave-convex portion 27 and the second concave-convex portion 28 are made of an uniform refractive index material having a refractive index $n_F$ equal or close to the ordinary refractive index $n_o$ of the liquid crystal layer. Thus, in order to make alignment direction of liquid crystal molecules perpendicular or at an angle close to perpendicular to the substrate surfaces, it is sufficient to form a vertical alignment film for liquid crystal on substrate surfaces facing the liquid crystal layer.

Meanwhile, surfaces of the alignment films are preferably subjected to alignment treatment so that the alignment direction of liquid crystal molecules incline in a predetermined direction when the element is on-state in which a voltage is applied to the liquid crystal layer. Specifically, alignment treatment is applied so that liquid crystal molecules incline in Y direction in the first liquid crystal layer 24 and in X direction in the second liquid crystal layer 25.

By constituting such a construction, when the element is in off-state, since refractive indexes of the liquid crystal layer and the concave-convex portion become substantially equal regardless of polarization state of incident light, transmission wavefront does not change regardless of the shape of the concave-convex portion. Further, since refractive index difference caused by the difference of wavelength-dispersion of refractive index difference between the liquid crystal layer and the concave-convex portion, is slight, transmission wavefront is scarcely changed even if wavelength of incident light is changed. On the other hand, when the element is in on-state, alignment direction of liquid crystal molecules changes according to the shape of the concave-convex portion and applied voltage, and thus, substantial refractive index of the liquid crystal layer changes for linearly polarized incident light polarized in a direction of alignment treatment (namely, extraordinarily polarized light). As a result, a transmission wavefront change according to applied voltage and the shape of concave-convex portion, is produced.

For example, in a case where the center of the concave-convex portion of the Fresnel lens is concave, when the element is in off-state, as shown in FIG. 19(B), no transmission wavefront change is produced, while when the element is in on-state, as shown in FIG. 19(A), a convergent transmission wavefront corresponding to convex lens can be produced. Namely, a two-focal-position-selectable lens between power and no power, is obtained by selecting on/off of applied voltage.

Here, in the first liquid crystal layer 24 and the second liquid crystal layer 25, since projective components of inclined directions of liquid crystal molecules on XY plane are perpendicular to each other when the element is in on-state, and thus, provided that the shapes of the concave-convex portions 27 and 28 are equal and the layer thicknesses of the liquid crystal layers 24 and 25 are equal in the first and second Fresnel lens portions, and that the same applied voltage of on-state is applied between the transparent electrodes 15 and 16 and between the transparent electrodes 17 and 18 from an external signal source, a single divergent wavefront is produced regardless of polarization state of incident light. Here, the liquid crystal lens element comprising the Fresnel lens portion of this embodiment as a constituent, may have any of the constructions shown in FIGS. 14, 23 and 24 in terms of the combination with the electrode lens portion.

Then, writing/reading operations of a single layer high density optical disk having a second recording layer D2 and a double layer high density optical disk having a first recording layer D1 and a second recording layer D2 by using an optical head device employing the liquid crystal lens element of this embodiment instead of the liquid crystal lens element 64 of FIG. 22, are described as follows. Here, the objective lens 66 is designed to minimize an aberration for the second recording layer D2 having a cover thickness of 100 μm. Further, wavelength of the laser diode 61 is 405 nm band. The construction of other portions are the same as those of the optical head device of the fourth embodiment.

At a time of writing/reading to/from the second recording layer D2 having a cover thickness of 100 µm, no voltage is applied to the Fresnel lens portion of the liquid crystal lens element to make the portion be in off-state, whereby aberration performance of the objective lens 66 is maintained and stable converging performance is realized. Meanwhile, at a time of writing/reading to/from the first recording layer D1 having a cover thickness of 75 µm, a voltage is applied between the transparent electrode 15 and 16 and between the transparent electrode 17 and 18 of the Fresnel lens portion of the liquid crystal lens element to make the element be in on-state to produce convergent light containing a positive power, whereby spherical aberration is corrected and stable converging performance is realized.

Further, a spherical aberration generated due to variation of cover thicknesses of the first recording layer D1 and the second recording layer D2 caused by e.g. production-induced variation of a high-density optical disk, is, in the same manner as the fourth or the fifth embodiment, corrected by continuous power generated according to voltage applied to the electrode lens portion.

Since the liquid crystal lens element of the present invention corrects spherical aberration generated due to the difference of cover thickness by changing focal length according to applied voltage, there is a merit that deterioration of aberration scarcely occurs even in a case where the liquid crystal lens element is disposed separately from an objective lens and the objective lens is misaligned to the liquid crystal lens element at a time of tracking. As a result, it is possible to realize stable writing/reading of single layer and double layer high density optical disks.

The liquid crystal lens element of the fourth embodiment provides three-focal-point-selection lens function in which functions of "convex lens", "no lens function" and "concave lens" are selectable by switching voltages applied between the transparent electrodes 15 and 16 and between the transparent electrodes 17 and 18 of the Fresnel lens portion among $V_{+1}$, $V_{+0}$ and $V_{-1}$, respectively. Meanwhile, the liquid crystal lens element of this embodiment provides two-focal-point-selection lens function in which functions of "no lens function" and "convex lens" are selectable by switching off/on of applied voltage respectively. As compared with the three-focal-point selection of the fourth embodiment, in the two-focal-point selection of this embodiment, necessary optical path change between electrodes becomes about a half, and thus, it is possible to reduce the distance G between the transparent electrodes. Namely, since it is possible to reduce the film thickness of the liquid crystal layer and the film thickness d of the concave-convex portion, response speed at a time of switching focal point becomes faster. Further, the thinner the film thickness d of the concave-convex portion is, the shorter the production step of the concave-convex portion becomes and the more stable the alignment of liquid crystal molecules on the surface of the concave-convex portion becomes, which provides merits that unnecessary scattered light generated due to unevenness of alignment of liquid crystal molecules is reduced, and it becomes easy to obtain a high efficiency.

Further, in the arrangement and construction of an optical head device in which light is incident into the liquid crystal lens element, in a case where the liquid crystal lens of this embodiment is employed, also for light of wavelength for DVD or CD different from the wavelength used for a high-density optical disk, there is no change of transmission wavefront regardless of wavelength of incident light when the liquid crystal element is in off-state at a time of no voltage application, and thus, there is no deterioration in performance of an optical head device for DVD or CD, such being preferred.

EXAMPLES

Specific examples of the above-mentioned embodiments are described below with reference to drawings.

Example 1

A specific example of the liquid crystal lens element 510 shown in the first embodiment is described below with reference to FIG. 1.

First of all, the production method of the liquid crystal lens element 510 is described.

On a glass substrate being a first substrate (transparent substrate) 11, $SiO_xN_y$ (here, x and y show element ratio between O and N) film is formed by sputtering method. In this case, for example, by using a Si target and an arcing gas of Ar gas mixed with oxygen and nitrogen, a transparent uniform refractive index film of $SiO_xN_y$ of refractive index $n_s$ (=1.64) is formed to have a film thickness of d (=3.5 µm).

Further, in order to correspond to the shape of graph β of FIG. 3, a resist is patterned by photolithography using a photomask, and thereafter, the $SiO_xN_y$ film is fabricated by a reactive ion etching method. As a result, in a region of effective diameter φ (=5.0 mm), a concave-convex portion 517 is fabricated to have a cross section of saw-tooth shape approximated by step shape of 8 steps and having a rotational symmetry about an optical axis (Z axis) of incident light, whose cross section is shown in FIG. 1.

Subsequently, a transparent conductive film (ITO film) is formed on the surface of the concave-convex portion 517, to be a transparent electrode 513. Further, a polyimide film (not shown) is applied on the transparent electrode 513 so as to have a film thickness of about 50 nm, and baked, and the surface of the polyimide film is subjected to rubbing alignment treatment in X axis direction, to be an alignment film.

Further, on a glass substrate being a second substrate (transparent substrate) 512, a transparent conductive film (ITO film) is formed to be a transparent electrode 514, and as shown in FIG. 2(B), the transparent electrode 514 is divided into annular segments $e_1$, $e_2$, $e_3$, ..., $e_7$, and the segments $e_1$, $e_2$, $e_3$, ..., $e_7$ are each connected with adjacent segments via resistors 551 ($R_1$ to $R_6$) as shown in FIG. 9. These resistors $R_1$ to $R_6$ have such resistances that based on a resistance between an annular electrode segment and adjacently outside electrode segment, a resistance between said an annular electrode segment and adjacently inside electrode segment is substantially twice as large. Namely, the resistances are configured so that provided that k-th and k−1-th resistances from the center of the element are $R_k$ and $R_{k-1}$ respectively, a relation of $2 \cdot R_k = R_{k-1}$ is satisfied. These resistors are formed in a region where incident light passes through, by connecting annular segment electrodes 554B, 554C, ... with a transparent resistor 551 as shown in FIG. 10.

Further, on this structure, a polyimide film (not shown) is applied to have a film thickness of about 50 nm and baked, and a surface of the polyimide film is subjected to rubbing alignment treatment in X axis direction to form an alignment film. Further, on the alignment film, an adhesive agent containing a gap control agent of 7 µm in diameter, is patterned by printing to form a seal 515, and bonded to the first substrate 511 to form an empty cell of d=g in which the distance between transparent electrodes is at most 7 µm and at least 3.5 µm (gap g=3.5 µm).

Thereafter, a nematic liquid crystal is injected through an injection port (not shown) of the empty cell, and the injection port is sealed to form a liquid crystal lens element 510 shown in FIG. 1. For the liquid crystal, a nematic liquid crystal having a positive dielectric anisotropy in which the ordinary refractive index is $n_o$ (=1.50) and the extraordinary refractive index is $n_e$ (=1.75), is employed. Further, the liquid crystal has a homogeneous alignment in which the alignment of liquid crystal molecules is uniformly in X axis direction in parallel with the surfaces of the transparent electrodes 513 and 514, and the liquid crystal fills concave portions of the concave-convex portion 517.

By connecting a drive power source circuit 518 to the transparent electrodes 513 and 514 of the liquid crystal lens element 510 thus obtained, a voltage is applied to the liquid crystal layer 516. When electric potential difference $\delta V$ between annular segment electrodes is set to be zero and applied voltage to the liquid crystal is increased from 0 V, substantial refractive index of the liquid crystal layer 516 in X axis direction changes from $n_1 = n_e$ (=1.75) to $n_2 = n_o$ (=1.50). As a result, for linearly polarized incident light having a polarization plane of X axis, the refractive index difference between the liquid crystal layer 516 and the concave-convex portion 517 changes from $$\Delta n_{max} (=n_1-n_s)=0.11$$

to $$\Delta n_{min} (=n_2-n_s)=-0.14,$$

and thus, transmission wavefront changes according to the thickness distribution of the liquid crystal layer 516 filling concave portions of the concave-convex portion 517.

Here, for example, when an objective lens of NA 0.85 designed to have zero aberration for an optical disk of cover thickness 87.5 μm at a wavelength $\lambda$ (=405 nm) for use, is used for a double layer optical disk having cover thicknesses of 100 μm and 75 μm, a spherical aberration is produced. However, at a voltage of $V_{+1}=0$ at a time of no voltage application, the refractive index difference $\Delta n(V_{+1})$ between the liquid crystal and the concave-convex portion 517 becomes, as described above, $$\Delta n(V_{+1})=n_1-n_s=0.11,$$

and thus, in order to produce the above-mentioned transmission wavefront by the concave-convex portion 517 and the liquid crystal filling the concave portions, maximum depth d of the concave-convex portion 517 is determined so as to satisfy a condition $0.75\lambda \leq \Delta n(V_{+1}) \cdot d \leq \lambda$. In this example, since the concave-convex portion 517 having a substantially saw-tooth-shaped cross section is approximated by step shape of 8 steps, d=3.5 μm.

A transmission wavefront of wavelength $\lambda$ (=405 nm) incident into the liquid crystal lens element 510 thus obtained, becomes a divergent wavefront shown in FIG. 4(A) at a time of no voltage application ($V_{+1}=0$), and the element shows a concave lens function having a negative focal length (f). Then, when the applied voltage is increased, at about $V_0=1.8$ V, $\Delta n(V_0)=0$ is satisfied and a transmission wavefront is, as shown in FIG. 4(B), transmitted through the element remaining the same wavefront of incident wavefront (no power). When the applied voltage is further increased, at about $V_{-1}=4.4$ V, $\Delta n(V_{-1})=-\Delta n(V_{+1})$ is satisfied, and the transmission wavefront becomes a convergent wavefront shown in FIG. 4(C) and the element shows a convex lens function having a positive focal length f. At this time, calculation values of efficiencies of transmission wavefront (transmission efficiencies) shown in FIGS. 4(A), 4(B) and 4(C) produced at switched applied voltages $V_{+1}$, $V_0$ and $V_{-1}$, are 95%, 100% and 95% respectively.

Here, explanation is made with respect to a case where the cover thickness of an optical disk D is deviated from the center thicknesses 100 μm and 75 μm of the standards.

An electric potential difference $\delta V$ is applied is between the center and the outer circumference of annular segment electrodes. The electric potential difference produces different electric potentials in the respective segments as shown in FIG. 8 by the above-mentioned resistor. For example, a voltage difference $\delta V(k, k+1)$ between k-th annular portion $e_k$ from the element center and adjacent k+1-th annular ring $e_{k+1}$, and a voltage difference $\delta V(k-1, k)$ between k-1-th annular ring $e_{k-1}$ and k-th annular ring $e_k$, satisfy a relation $\delta V(k-1, k)=2 \cdot V(k, k+1)$. Thus, by changing voltage applied to adjacently inside liquid crystal by $\delta V$, optical path difference of transmission light becomes as indicated by the solid line b of FIG. 7, and steps of optical path difference between adjacent segments becomes a wavelength $\lambda$. Accordingly, light transmitted through the liquid crystal lens element 510 becomes substantially continuous wavefront shape, and thus, it is possible to finely adjust focal length.

Then, a case of employing the liquid crystal lens element 510 in the optical head device 540 of the fourth embodiment shown in FIG. 13, is described. Here, the construction of the optical head device 540 has been described in the above-mentioned embodiments, and thus, its explanation is omitted.

For an optical disk having the center cover thicknesses 100 μm and 75 μm of the standards, by setting $\delta V=0$ and setting applied voltages to the liquid crystal is $V_{+1}$ and $V_{-1}$, incident light is efficiently converged on an information recording layer by the objective lens 5. Further, for an optical disk whose cover thicknesses are deviated from the above-mentioned center thicknesses of the standards, by changing $\delta V$, it is possible to minimize aberration amount (optimize read-out signal) and to converge light efficiently on an information recording layer.

Example 2

Then, a specific example of the liquid crystal lens element 10 of the present invention shown in the second embodiment, is described below with reference to FIG. 14.

First of all, the method of producing the liquid crystal lens element 10 is described.

On one surface or both surfaces of the transparent substrates 11 to 13 made of a glass, a transparent conductive film (ITO film) is formed, and patterned to be transparent electrodes 15 to 19. Further, on the transparent electrodes 16 and 18, a SiON film being an uniform refractive index material of refractive index $n_s$ (=1.52) and a specific dielectric constant $\in_s$ (=4), is formed by vapor deposition to have a film thickness of d (=2.9 μm). Subsequently, in order to correspond to the shape of graph F1 of FIG. 17, the SiON film is fabricated by photolithography technique and etching technique, to form concave-convex portions 27 and 28 each having a saw-tooth-shaped cross section and a rotational symmetry about an optical axis (Z axis) of incident light as shown in FIG. 14.

Meanwhile, on a surface of the transparent substrate 14 made of a glass, an ITO film having a sheet resistance of 40Ω/□ is formed, and thereafter, as shown in FIG. 16, patterned to be low-resistance electrodes 31 to 34. Further, a tin oxide film having a sheet resistance of $10^6$Ω/□ is formed and patterned to form a high-resistance plane electrode 35 to constitute a complex electrode 20. Thereafter, on all surfaces of the transparent substrates on which electrodes are formed, a liquid crystal alignment film made of polyimide is applied and baked, and thereafter, the surfaces of the transparent electrodes 15 and 16 are subjected to rubbing treatment in Y axis direction, and surfaces of the transparent electrodes 17 to 19 and the complex electrode 20 are subjected to rubbing treatment in X axis direction. Further, on surfaces of the transparent substrates 11, 12 and 13 on which the transparent electrodes 15, 17 and 19 are formed, an adhesive agent containing a gap control agent of 15 μm in the diameter is patterned by printing to form seals 21 to 23, and the transparent substrates 11 to 14 are laminated and press-bonded to form empty cells each having a transparent electrode distance of 15 μm.

Thereafter, a nematic liquid crystal having a positive dielectric anisotropy which has an ordinary refractive index $n_o$ (=1.52) and an extraordinary refractive index $n_e$ (=1.70), is injected through injection ports (not shown) of the empty cells, to form liquid crystal layers 24, 25 and 26. Thereafter, the injection ports are shielded with a UV-curable resin, and conductive connection means 29 are connected to form a liquid crystal lens element 10 shown in FIG. 14.

The liquid crystal lens element 10 thus obtained is electrically connected to an external signal source 30, so that voltages can be applied to the liquid crystal layers 24, 25 and 26. Then, when applied voltage is increased from 0 V, substantial refractive index in the rubbing directions of the liquid crystal layers 24 to 26 change from $n_e$ (=1.70) to $n_o$ (=1.52). However, effective voltage $V_{LC}$ applied to the liquid crystal is different according to the shapes of the concave-convex portions 27 and 28 as represented by formula (6), namely, is different according to the position, and a phase difference $\phi_d$ generated by the liquid crystal lens element 10 changes according to the film thickness $d_F$ of the concave-convex portions 27 and 28 as represented by formula (7).

Figure 26:
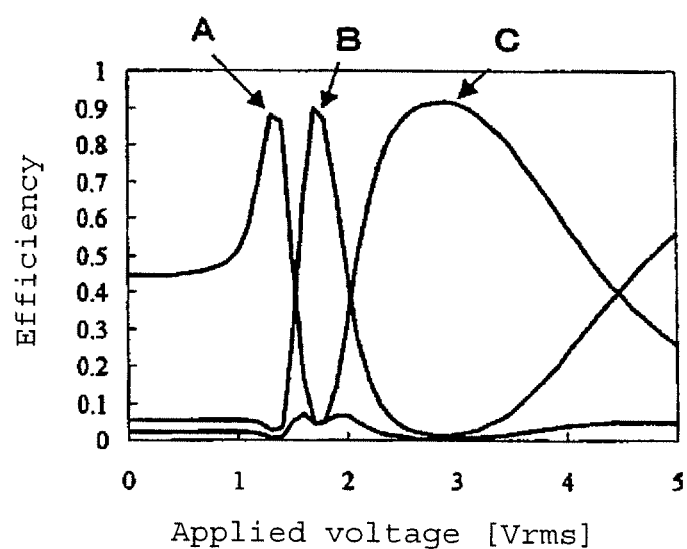
FIG. 26: An explanation view showing a Fresnel lens efficiency of the liquid crystal lens element in the optical head device of the present invention.

Then, FIG. 26 is an explanation view showing Fresnel lens efficiency of the liquid crystal lens element 10 of Example 2. Horizontal axis of FIG. 26 represents a voltage applied between the transparent electrodes 15 and 16 or between the transparent electrodes 17 and 18 by using the external signal source 30, and in this example, a voltage to the electrode lens portion 10C, namely, a voltage between the transparent electrode 19 and the complex electrode 20 is 0 V.

In FIG. 14, when linearly polarized light polarized in X direction is incident, since liquid crystal molecules in the liquid crystal layer 24 is aligned in Y direction, there occurs no substantial refractive index difference between the liquid crystal layer 24 and the concave-convex portion 27, and thus, light is transmitted regardless of applied voltage. On the other hand, a phase difference generated between the liquid crystal layer 25 and the concave-convex portion 28 changes according to voltage as represented by formula (7) and according to film thickness $d_F$ of the concave-convex portion 28.

At an applied voltage 1.35 V, $n(V_{LC}[d_F])>n_s$ is satisfied, and thus, the phase difference between the minimum thickness portion and maximum thickness portion of the concave-convex portion 28 becomes λ, and as shown in FIG. 19(A), incident plane wave is transformed into a slightly convergent wavefront as +1-st Fresnel diffraction wave. +1-st Fresnel diffraction efficiency is, as represented by graph A of FIG. 26, maximized at an applied voltage 1.35 V.

In the same manner, at an applied voltage 2.85 V, $n(V_{LC}[d_F]) \approx n_s$ is satisfied, and −1-st Fresnel diffraction efficiency is maximized at an applied voltage is 2.85 V as represented by graph C of FIG. 26.

On the other hand, at an applied voltage 1.74 V, $n(V_{LC}[d_F]) \approx n_s$ is satisfied, and a wavefront is scarcely changed and 0-th Fresnel diffraction is maximized at an applied voltage 1.74 V as represented by graph B of FIG. 26.

As described above, when the applied voltage is changed among 1.35 V, 1.74 V and 2.85 V, the liquid crystal lens element of the present invention functions as "convex lens", "no lens function" and "convex lens" respectively.

Then, when linearly polarized light polarized in Y direction is incident, substantial refractive index of the liquid crystal layer 25 becomes $n_o = n_s$, and thus, there is no lens function. The above-mentioned concave-convex portions 27 and 28 are identical, and the liquid crystal layers 24 and 25 have the same liquid crystal material whose alignment directions are perpendicular to each other, and thus, when the voltage is changed among 1.35 V, 1.74 V and 2.85 V in the same manner as above, the element functions as "convex lens", "no lens function" and "concave lens" respectively.

Accordingly, by employing the liquid crystal lens element of the present invention, it is possible to switch lens function for linearly polarized light beams polarized in X direction and Y direction according to the magnitude of applied voltage.

Then, without applying a voltage between the transparent electrodes 15 and 16 and between the transparent electrodes 17 and 18, a voltage is applied to the electrode lens portion 10C, namely, between the transparent electrode 19 and the complex electrode 20.

For example, when linearly polarized light polarized in X direction which is equal to alignment direction of liquid crystal molecules in the liquid crystal layer 26, is incident, appropriate voltages $V_A$, $V_B$, $V_C$ and $V_D$ satisfying a relation $0(V) < V_A < V_B < V_C < V_D$, are applied to the low-resistance electrodes 31 to 34. Accordingly, as shown in graph β of FIG. 20, a phase difference of at most 1.5λ can be obtained. On the other hand, if appropriate voltages satisfying $0(V) < V_D < V_C < V_B < V_A$ are applied, an inverted phase difference of graph β of FIG. 20 can be obtained. Accordingly, by voltage control of low-resistance electrodes 31 to 34, a wavefront containing a power having a phase difference of at most ±1.5λ can be continuously changed.

As described above, by employing the liquid crystal lens element of the present invention, it is possible to obtain a focal-point-selectable Fresnel lens functioning equally for linearly polarized light beams having perpendicular polarization directions. Further, by controlling a voltage applied to the complex electrode, it is possible to continuously change a wavefront of linearly polarized light agreeing with the liquid crystal is layer 26.

Example 3

Then, the liquid crystal lens element 10 shown in Example 2 is incorporated into an optical head device 60 shown in FIG. 22 as a liquid crystal lens element 64. Here, cover thickness of the first recording layer D1 provided in the double layer optical disk D is 75 μm, and the cover thickness of the second recording layer D2 is 100 μm.

In this optical head device 60, a light source 61 is a laser diode of wavelength 405 nm, light emitted from the light source is transformed into parallel light by a collimeter lens 63, and incident into the liquid crystal lens element 10. An objective lens 66 has a NA of 0.85, and a pupil diameter of 3 mm, and is designed to minimize wavefront aberration for a cover thickness of 87.5 μm.

Here, when a voltage $V_0 = 1.74$ V at which the liquid crystal lens element shows no lens function, is applied, wavefront aberration of light convergent to each of the recording layers becomes at least 0.1 λrms by an influence of spherical aberration proportional to the difference of cover thickness, and thus, light-convergent performance is significantly deteriorated.

In a case where a voltage $V_{+1}=1.35$ V is applied between the transparent electrodes 15 and 16 and between transparent electrodes 17 and 18 to converge light on the first recording layer D1, and a case where a voltage $V_{-1}=2.85$ V is applied between the transparent electrodes to converge light on the second recording layer D2, spherical aberration is corrected to be at most 0.01 λrms, and thus, convergent performance is improved.

Figure 27:
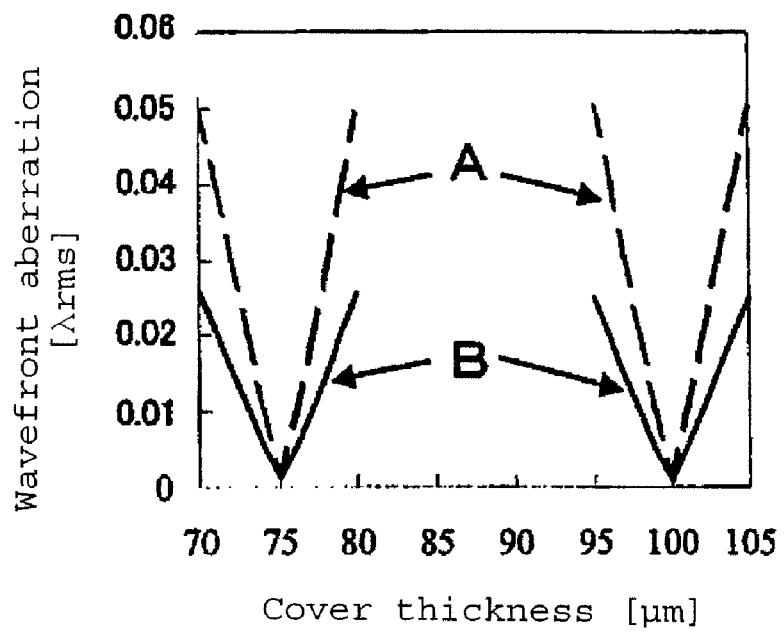
FIG. 27: An explanation view showing a cover thickness dependence of wavefront aberration in the optical head device of the present invention.

Then, in order to inspect correction performance of spherical aberration due to production-induced variation of cover thickness of double layer optical disk D, double layer optical disks D are produced so that their cover thicknesses are between 70 to 80 μm and between 95 to 105 μm, and a voltage applied to the liquid crystal lens element 10 of this example is appropriately optimized to correct spherical aberration. FIG. 27 is a view showing the dependence of wavefront aberration on cover thickness in the optical head device 60 in this case.

As shown in FIG. 27, in the liquid crystal lens element 10, aberration correction is carried out by Fresnel lens portions 10A and 10B designed to minimize wavefront aberrations for cover thicknesses 75 μm and 100 μm respectively, and graph A shows a case of not using lens function of the electrode lens portion 10C, and graph B shows a case where the power generated by the electrode lens 10C is optimized.

As shown in FIG. 27, by employing the liquid crystal lens element 10 of the present invention, since it is possible to reduce residual wavefront aberration for a cover thickness range of from 70 to 80 μm or from 95 to 105 μm, to be at most λ/30 rms, even in a case where production-induced variation of cover thickness of recording layer occurs, it is possible to correct wavefront aberration to maintain convergent performance.

Example 4

Then, specific example of the liquid crystal lens element 70 of the present invention shown in the seventh embodiment, is described below with reference to FIG. 23. Here, since constituents in common with those of the liquid crystal lens element 10 are the same, their explanations are omitted.

Main differences of this Example 4 from the liquid crystal lens element 10 of Example 2 (refer to FIG. 14) reside in the constructions of the first Fresnel potion 10A and the second Fresnel lens portion 10B and a point that the electrode lens portion is constituted by the first electrode lens portion 10C and the second electrode lens portion 10D.

First of all, production method of the first Fresnel lens potion 10A and the second Fresnel lens portion 10B are described below.

With respect to the first Fresnel lens potion 10A, transparent substrate 11 and 13A on one surfaces of which transparent electrode 15 and 18 made of ITO film are formed, and a transparent substrate 12 on both surfaces of which transparent electrode films 16 and 17 made of ITO are formed, are employed, and on the transparent electrodes 16 and 18, a SiON film being an uniform refractive index material of refractive index $n_s$ (=1.52) and a specific dielectric constant $\in_s$ (=4) is formed to have a film thickness of d (=1.5 μmm). Subsequently, into the SiON film, concave-convex portions 27 and 28 as shown in FIG. 23 each having a saw-tooth-shaped cross section and rotational symmetry about an optical axis (Z axis) of incident light so as to correspond to the shape of graph F1 of FIG. 17 by photolithography technique and etching technique. Further, on surfaces of the transparent electrodes 15 and 17 and on surfaces of the concave-convex portions 27 and 28, vertical alignment films (not shown) for liquid crystal, made of polyimide, is applied and baked, and thereafter, the surfaces of the transparent electrodes 15 and the concave-convex portion 27 are subjected to rubbing alignment treatment in Y axis direction, and surfaces of the transparent electrode 17 and the concave-convex portion 28 are subjected to rubbing alignment treatment in X axis direction. Further, on surfaces of the transparent substrates on which the transparent electrodes 16 and 18 are formed, an adhesive agent containing a gap control agent of 7 μm in diameter is patterned by printing to form seals 21 and 22, and the transparent substrates 11, 12 and 13A are laminated together and press-bonded to form empty cells in each of which the distance between transparent electrodes is 7 μm.

Thereafter, a nematic liquid crystal having a negative dielectric anisotropy in which the ordinary refractive index is $n_o$ (=1.52) and the extraordinary refractive index is $n_e$ (=1.70), is injected through injection ports (not shown) of the empty cells, to form the liquid crystal layers 24 and 25. Thereafter, the injection ports are sealed by a UV-curable resin to constitute a Fresnel lens portion 70A shown in FIG. 23, and the transparent electrodes are electrically connected with an external signal source 30A so that a voltage can be applied to the liquid crystal layers 24 and 25.

Then, the first electrode lens portion 10C and the second electrode lens portion 10D are described below with reference to FIG. 23 and FIG. 16.

The first electrode lens portion 10C and the second electrode lens portion 10D each comprises as main constituents a transparent substrate 13B on one surface of which a transparent electrode 19 made of ITO film is formed, a transparent substrate 14 on one surface of which a transparent electrode 19B made of ITO film is formed and on the other surface of which a complex electrode 20 is formed, and a transparent substrate 13C on one surface of which a complex electrode 20B is formed.

In the process for producing the first electrode lens portion 10C and the second electrode lens portion 10D, particularly, the complex electrodes 20 and 20B are formed by forming ITO films having a sheet resistance of 40Ω/□ on the respective transparent substrates 14 and 13C, and the ITO films are each patterned to form low resistance electrodes 31 to 35 (refer to FIG. 16), a tin oxide film having a sheet resistance of $10^6$ Ω/□ is formed thereon and patterned to form a high-resistance plane electrode 35 (refer to FIG. 16). Further, on surfaces of the transparent electrodes 19 and 19B and the above-mentioned complex electrodes 20 and 20B, a horizontal alignment films for liquid crystal, made of polyimide are applied and baked, and surfaces of the transparent electrode 19 and the complex electrode portion 20 is subjected to rubbing alignment treatment in X axis direction, and surfaces of the transparent electrode 19B and the complex electrode portion 20B are subjected to rubbing alignment treatment in Y axis direction. Thereafter, a nematic liquid crystal having a positive dielectric anisotropy in which the ordinary refractive index is $n_o$ (=1.52) and the extraordinary refractive index is $n_e$ (=1.70), is injected through injection ports (not shown) of empty cells to form liquid crystal layers 26 and 27. Thereafter, the injection ports are sealed by a UV-curable resin to constitute an electrode lens portion 70B shown in FIG. 23, and an outer signal source 30B is electrically connected with each electrode so that the same voltage can be applied to the liquid crystal layers 26 and 27.

In the liquid crystal lens element 70 thus produced, when an AC applied voltage produced by the external signal sources 30A and 30B is increased from 0 V, since the liquid crystal layers 24 and 25 are each liquid crystal of vertical alignment having negative dielectric anisotropy and the liquid crystal layers 26 and 27 are each liquid crystal of horizontal alignment having positive dielectric anisotropy, substantial refractive index of the liquid crystal layers 24 and 25 in the rubbing direction changes from $n_o$ (=1.52) to $n_e$ (=1.70), and substantial refractive index of the liquid crystal layers 26 and 27 in the rubbing direction changes from $n_e$ (=1.70) to $n_o$ (=1.52).

Figure 28:
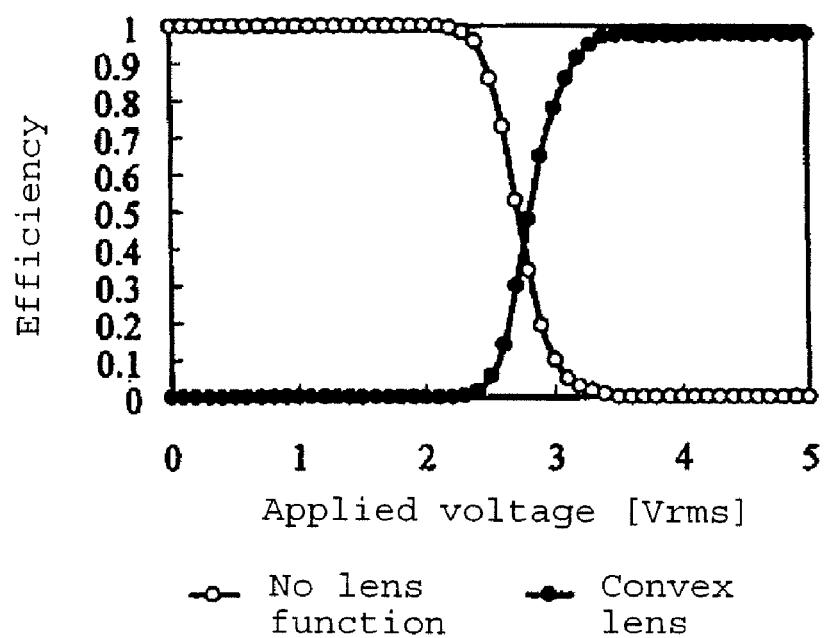
FIG. 28: An explanation view showing a Fresnel lens diffraction efficiency of the liquid crystal lens element of Example 4 that is a seventh embodiment of the liquid crystal lens element of the present invention.
Figure 29:
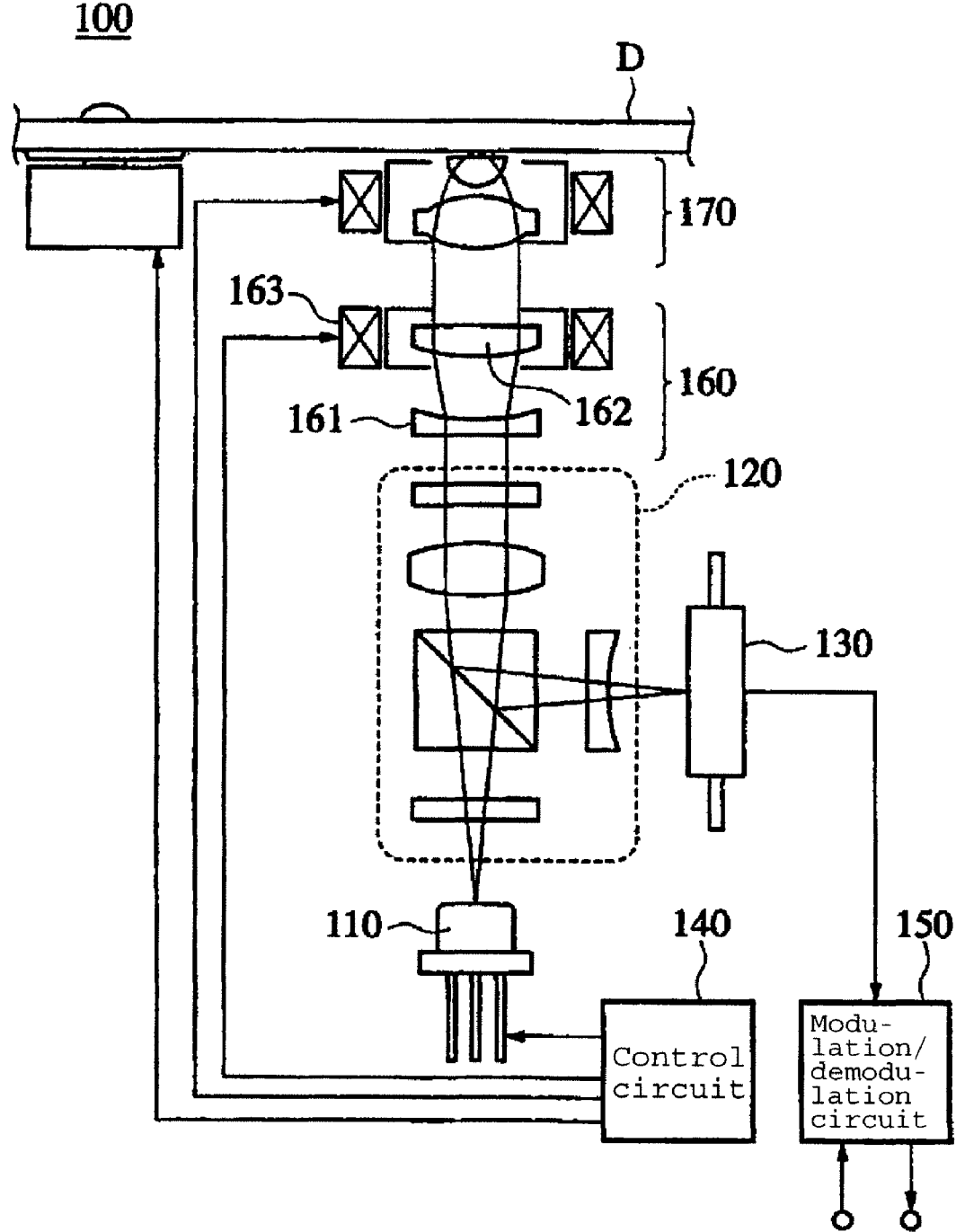
FIG. 29: A construction view showing a conventional optical head device employing a movable lens group as a spherical aberration correction element.
Figure 30:
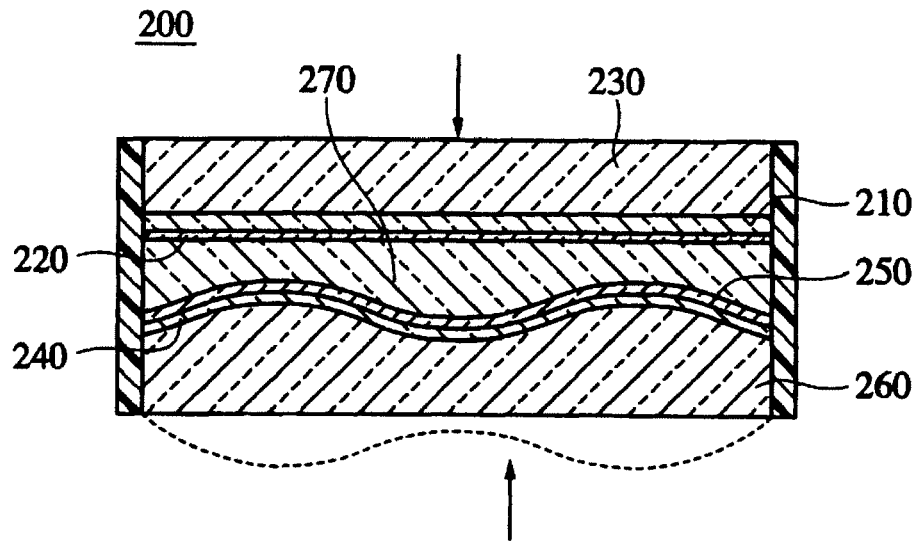
FIG. 30: A side view showing an example of the construction of a conventional liquid crystal lens element.
Figure 31:
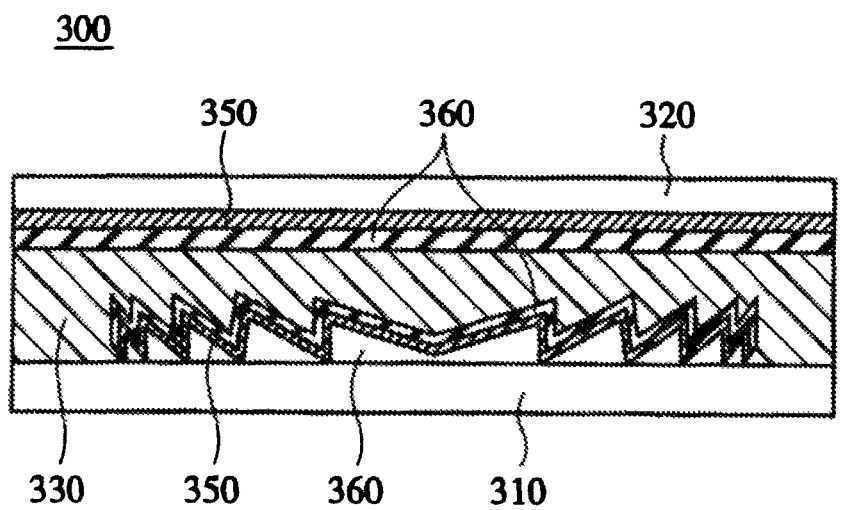
FIG. 31: A side view showing an example of the construction of conventional optical modulation element (liquid crystal diffraction lens).
Figure 32:
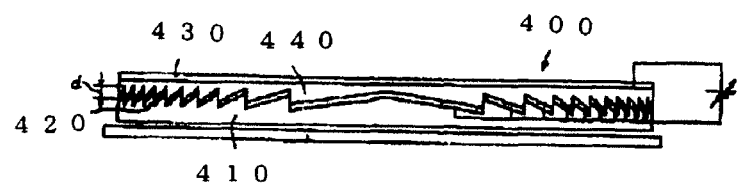
FIG. 32: A cross sectional view showing an example of the construction of a conventional liquid crystal diffraction lens.

FIG. 28 is an explanation view showing a Fresnel lens efficiency of the liquid crystal lens element 70 of this Example 4. Lateral axis of FIG. 28 represents a voltage applied between the transparent electrodes 15 and 16 and between the transparent electrodes 17 and 18 of the Fresnel lens portion 70A by employing an external signal source 30A, and in this case, no voltage is applied to the electrode lens portion 70B.

(I) When the element is in off-state at a time of no voltage application, the liquid crystal layer and the concave-convex portion has the same refractive index regardless of polarization of incident light, and thus, transmission wavefront does not change. Namely, the element shows "no lens function".

(II) On the other hand, when the element is in on-state at a time of voltage application, when linearly polarized light polarized in X direction is incident, since the liquid crystal layer 24 is aligned in Y direction, there is no substantial refractive index difference between the liquid crystal layer 24 and the concave-convex portion 27, and thus, light is transmitted regardless of the magnitude of applied voltage. On the other hand, the liquid crystal layer 25 is aligned in X direction, and thus, a phase difference generated between the liquid crystal layer 25 and the concave-convex portion 28 changes according to applied voltage and according to the film thickness $d_F$ of the concave-convex portion 28. At an applied voltage 3.5 V, the phase difference between the least thickness portion and the largest thickness portion of the concave-convex portion becomes λ, and as shown in FIG. 19(A), efficiency of +1-st Fresnel diffraction wave is maximized and an incident plane wave is transformed into a convergent wavefront corresponding to a convex lens.

Further, when linearly polarized light polarized in Y direction is incident, since the liquid crystal molecules of the liquid crystal layer 25 is aligned in X direction, no substantial refractive index between the liquid crystal layer 25 and the concave-convex portion 28 is produced, and thus, light is transmitted regardless of the magnitude of applied voltage. On the other hand, since liquid crystal molecules of the liquid crystal layer 24 is aligned in Y direction, a phase difference generated between the liquid crystal layer 24 and the concave-convex portion 27 changes according to applied voltage and according to film thickness $d_F$ of the concave-convex portion 27. At an applied voltage 3.5 V, a phase difference between the least thickness portion and the largest thickness portion of the concave-convex portion becomes λ, and as shown in FIG. 19(A), efficiency of +1-st Fresnel diffraction wave is maximized, and an incident plane wave is transformed into a convergent wavefront corresponding to a convex lens. Here, a term "rms" of a unit of applied voltage "Vrms" of FIG. 26 and FIG. 28 means an AC effective voltage.

As described above, when an applied voltage is switched between 0 V (off-state) and 3.5 V (on-state), the liquid crystal lens element of the present invention functions as "no lens function" and "convex lens". Accordingly, by employing the liquid crystal lens element of the present invention, for linearly polarized light beams polarized in X direction and Y direction, namely, regardless of polarization state of incident light, lens function of the element can be switched according to on/off of applied voltage.

Then, without applying a voltage between the transparent electrodes 15 and 16 and between the transparent electrodes 17 and 18 of the Fresnel lens portion 70A, a voltage is applied between the transparent electrode 19 and the complex electrode 20 and between the transparent electrode 19B and the complex electrode 20B of the electrode lens portion 70B. Since alignment directions of liquid crystal molecules of the liquid crystal layer 26 and the liquid crystal layer 26B are perpendicular, for linearly polarized light beams polarized in X direction and Y direction, it is possible to continuously change a wavefront containing a power by voltage control of the low-resistance electrodes 31 to 34.

As described above, by employing the liquid crystal lens element 70 of the present invention, it is possible to obtain a two-focal-point-switching lens functioning regardless of polarization state of incident light. Further, by controlling a voltage applied to the electrode lens portion, it is possible to continuously change a wavefront containing a power regardless of polarization state of incident light.

Then, the liquid crystal lens element 70 of the present invention is disposed in the optical head device 60 of FIG. 22 instead of the liquid crystal lens element 64, and employed for writing/reading a single layer high density optical disk and a double layer high density optical disk.

(I) First of all, at a time of writing/reading a second recording layer D2 having a cover thickness of 100 µm, the Fresnel lens portion 70A of the liquid crystal lens element 70 is set to be in its off-state, and at a time of writing/reading a first recording layer D1 having a cover thickness of 75 µm, a voltage of 3.5 V is applied to the Fresnel lens portion 70A of the liquid crystal lens element 70 from an external signal source 30A to turn the Fresnel lens portion 70A into its on state.

Here, A of FIG. 27 shows calculation result of residual RMS wavefront aberration in a case where cover thicknesses of the first recording layer D1 and the second recording layer D2 vary ±5 µm. For cover thicknesses 100 µm and 75 µm, RMS wavefront aberration becomes at most 0.01 λrms, and when the cover thicknesses vary ±5 µm, RMS wavefront aberration of about 0.05 λrms is generated.

(II) Further, FIG. 27(B) shows calculation results of residual RMS wavefront aberration in a case where a voltage is applied to the electrode lens portion 70B of the liquid crystal lens element 70 from an external signal source 30B according to variation of cover thicknesses of the first recording layer D1 and the second recording layer D2, to carry out correction of aberration. Even when the cover thicknesses vary ±5 µm, RMS wavefront aberration can be reduced to an RMS wavefront aberration of at most 0.03 λrms.

(III) Further, even in a case where a misalignment of about ±0.3 mm occurs between the objective lens 66 and the liquid crystal lens element 70 at a time of tracking, the RMS wavefront aberration shown in FIG. 27 is scarcely deteriorated. Accordingly, by employing an optical head device 60 having the liquid crystal lens element 70 of the present invention, stable writing/reading of single layer and double layer high density optical disks is realized.

In the above, various types of embodiments of the present invention has been described, but the present invention is not limited to the embodiments described in the above-mentioned embodiments, but it is expected that a person skilled in the art modifies or applies these embodiments based on Claims, descriptions of the specification and common technical knowledge, and such a modification and application are included in the scope of protection.

INDUSTRIAL APPLICABILITY

The present invention provides a liquid crystal lens element capable of finely adjusting focal length according to applied voltage. This liquid crystal lens element can be used as a liquid crystal lens element for correcting a spherical aberration containing a power component particularly generated at a time of writing and/or reading an optical disk having double layer information recording layers having different cover thicknesses. Further, since no aberration is produced when the liquid crystal lens element and the objective lens are misaligned, the liquid crystal lens element can be disposed separately from the objective lens.

Further, by employing the liquid crystal lens element of the present invention, limitation of arrangement of the liquid crystal lens element becomes looser, and thus, an optical head device of small sized and capable of stably writing/reading an optical disk can be provided.

The entire disclosures of Japanese Patent Application No. 2004-227613 filed on Aug. 4, 2004 and Japanese Patent Application No. 2004-268142 filed on Sep. 15, 2004 including specifications, claims, drawings and summaries are incorporated herein by reference in their entireties.

What is claimed is:

1. A liquid crystal lens element comprising:
a first substrate;
a second substrate disposed so as to be opposed to the first substrate; and
a liquid crystal layer sandwiched between the first and the second substrates and configured to change focal point of light transmitted through the liquid crystal layer according to a magnitude of applied voltage to the liquid crystal layer,
wherein on one of the surfaces of the first substrate, a first transparent electrode is formed and a concave-convex portion made of a transparent material and having a cross section of a saw-tooth shape or a saw-tooth shape approximated by steps is formed so as to form a plurality of annular shapes concentric around an optical axis of incident light, and on one of the surfaces of the second substrate, a second transparent electrode is formed, and at least one of the first and second transparent electrodes is divided into annular electrode segments, a dividing position of the at least one of the first and second transparent electrodes into the annular electrode segments agrees with dividing positions of the concave-convex portion of the first substrate into the annular shapes, and the annular electrode segments are each electrically connected with adjacent annular electrode segments via a resistive element.

2. A liquid crystal lens element comprising:
a first substrate;
a second substrate disposed so as to be opposed to the first substrate; and
a liquid crystal layer sandwiched between the first and the second substrates and configured to change focal point of light transmitted through the liquid crystal layer according to a magnitude of applied voltage to the liquid crystal layer,
wherein on one of the surfaces of the first substrate, a first transparent electrode is formed and a concave-convex portion made of a transparent material and having a cross section of a saw-tooth shape or a saw-tooth shape approximated by steps is formed so as to form a plurality of annular shapes concentric around an optical axis of incident light, and on one of the surfaces of the second substrate, a second transparent electrode is formed, and at least one of the first and second transparent electrodes is divided into annular electrode segments, a dividing position of the at least one of the first and second transparent electrodes into the annular electrode segments agrees with dividing positions of the concave-convex portion of the first substrate into the annular shapes, and based on a resistance between each of the annular electrode segments and a respective one of the annular electrode segments adjacently outside of each of the annular electrode segments, a resistance between each of the annular electrode segments and a respective one of the electrode segments adjacently inside of each of the electrode segments is twice as large.

3. An optical head device comprising:
a light source;
an objective lens for converging light emitted from the light source on an optical recording medium;
a beam splitter for splitting light converged by the objective lens and reflected by the optical recording medium;
a photodetector for detecting the split light; and
the liquid crystal lens element as defined in claim 1 disposed in an optical path between the light source and the objective lens.

4. A liquid crystal lens element for changing focal point of light transmitted through the liquid crystal layer according to the magnitude of voltage applied to the liquid crystal layer, which comprises a first Fresnel lens portion, a second Fresnel lens portion and an electrode lens portion; wherein the first Fresnel lens portion comprises a pair of transparent substrates, a first liquid crystal layer sandwiched between the transparent substrates, a pair of electrodes formed on surfaces of the respective transparent substrates so as to be opposed to each other to apply voltage to the first liquid crystal layer, and a first concave-convex portion having a rotational symmetry about an optical axis of light and having a cross section of saw-tooth shape or a cross section of saw-tooth shape approximated by steps, the first concave-convex portion being made of a transparent material and formed on an upper surface of at least one of the pair of electrodes opposed to each other; the second Fresnel lens portion comprises a pair of transparent substrates, a second liquid crystal layer sandwiched between the transparent substrates, a pair of electrodes formed on surfaces of the respective transparent substrates so as to be opposed to each other to apply voltage to the second liquid crystal layer, and a second concave-convex portion having a rotational symmetry about the optical axis of light and having a cross section of saw-tooth shape or a cross section of saw-tooth shape approximated by steps, the second concave-convex portion being made of a transparent material and formed on an upper surface of at least one of the pair of electrodes opposed to each other; the electrode lens portion comprises a pair of transparent substrates, a third liquid crystal layer sandwiched between the transparent substrates, and a pair of electrodes for applying voltage to the third liquid crystal layer, and disposed on surfaces of the transparent substrates so as to be opposed to each other, wherein at least one of the electrodes is a complex electrode constituted by a low resistant electrode and a high resistant plane electrode; wherein the first, the second and the third liquid crystal layers are made of a nematic liquid crystal having a parallel alignment at a time of no voltage application or at a time of voltage application, an ordinary refractive index direction of the first liquid crystal layer and an extraordinary refractive index directions of the second liquid crystal layer and the third liquid crystal layer agree with each other.

5. The liquid crystal lens element according to claim 4, wherein both of the electrodes disposed in the electrode lens portion so as to be opposed to each other, are the complex electrodes, one of the complex electrodes comprises a high-resistance plane electrode and a plurality of low-resistance electrodes arranged in a stripe shape, the other one of the complex electrodes comprises the high-resistance plane electrode and a plurality of low-resistance electrodes arranged in a stripe shape so as to be perpendicular to the arrangement direction of the above low-resistance electrodes.

6. The liquid crystal lens element according to claim 4, wherein the refractive index of the transparent material forming the first and second concave-convex portions is equal to the ordinary refractive index of the first liquid crystal layer and the second liquid crystal layer.

7. The liquid crystal lens element according to claim 4, which is integrated with a phase plate producing a phase difference of an odd number times of $\pi/2$ of the wavelength of the light.

8. The liquid crystal lens element according to claim 4, wherein the electrode lens portion of the liquid crystal lens element comprises a first electrode lens portion and a second electrode lens portion; the first electrode lens portion comprises a pair of transparent substrates, the third liquid crystal layer sandwiched between the transparent substrates, and electrodes disposed on surfaces of the transparent substrates so as to be opposed to each other to apply a voltage to the third liquid crystal layer, at least one of which is a complex electrode comprising a low-resistance electrode and a high-resistance plane electrode; the second electrode lens portion comprises a pair of transparent substrates, the fourth liquid crystal layer sandwiched between the transparent substrates, and electrodes disposed on surfaces of the transparent substrates so as to be opposed to each other to apply a voltage to the fourth liquid crystal layer, at least one of which is a complex electrode comprising a low-resistance electrode and a high-resistance plane electrode; wherein the first, the second, the third and the fourth liquid crystal layers are each made of a nematic liquid crystal having a parallel alignment at a time of no voltage application or at a time of voltage application; and wherein an ordinary refractive index direction of the first liquid crystal layer, extraordinary refractive index directions of the second and the third liquid crystal layers and an ordinary refractive index direction of the fourth liquid crystal layer agree with one another.

9. The liquid crystal lens element according to claim 8, wherein one of the electrodes disposed in the electrode lens portion so as to be opposed to each other is the complex electrode, and the complex electrode comprises a high-resistance plane electrode and a plurality of low-resistance electrodes of concentric shape about an optical axis of the light.

10. The liquid crystal lens element according to claim 8, wherein both of the electrodes disposed in the electrode lens portion so as to be opposed each other, are the complex electrodes, and one of the complex electrodes comprises a high-resistance plane electrode and a plurality of low-resistance electrodes arranged in a stripe shape, and the other one of the complex electrodes comprises a high-resistance plane electrode and a plurality of low-resistance electrode arranged in a stripe shape so as to be perpendicular to the arrangement direction of the above low-resistance electrodes.

11. An optical head device comprising a light source, an objective lens for converging light emitted from the light source on an optical recording medium, a photodetector for detecting light converged on the optical recording medium and reflected, and the liquid crystal lens element as defined in claim 4 disposed in an optical path between the light source and the objective lens.

12. An optical head device comprising a light source, an objective lens for converging light emitted from the light source on an information recording layer of an optical recording medium, a photodetector for receiving light reflected by the information recording layer, and a beam splitter for splitting a light flux in an outgoing path from the light source towards the optical recording medium and a light flux in a returning path in which light reflected by the information recording layer propagates towards the photodetector, which further comprises the liquid crystal lens element as defined in claim 7 comprising a liquid crystal lens element for outgoing path, in which the first Fresnel lens portion and the second electrode lens portion are laminated and integrated, and a liquid crystal lens element for returning path, in which the second Fresnel lens portion and the first electrode lens portion are laminated and integrated, wherein the liquid crystal lens element for outgoing path is disposed in an optical path between the light source and the beam splitter, and the liquid crystal lens element for returning path is disposed in an optical path between the beam splitter and the photodetector.

13. An optical head device comprising:
a light source;
an objective lens for converging light emitted from the light source on an optical recording medium;
a beam splitter for splitting light converged by the objective lens and reflected by the optical recording medium;
a photodetector for detecting the split light; and
the liquid crystal lens element as defined in claim 2 disposed in an optical path between the light source and the objective lens.

14. An optical head device comprising:
a light source;
an objective lens for converging light emitted from the light source on an optical recording medium;
a photodetector for detecting light converged on the optical recording medium and reflected; and
the liquid crystal lens element as defined in claim 1 disposed in an optical path between the light source and the objective lens.

15. An optical head device comprising:
a light source;
an objective lens for converging light emitted from the light source on an optical recording medium;
a photodetector for detecting light converged on the optical recording medium and reflected; and
the liquid crystal lens element as defined in claim 2 disposed in an optical path between the light source and the objective lens.

* * * * *